United States Patent [19]

Gullo

[11] 4,044,290

[45] Aug. 23, 1977

[54] DRUM CONTROL SYSTEM

[75] Inventor: Robert Gullo, Staten Island, N.Y.

[73] Assignee: Typographic Innovations Inc., New York, N.Y.

[21] Appl. No.: 482,025

[22] Filed: June 21, 1974

[51] Int. Cl.[2] .......................... G05B 5/00; H02H 7/08; B41B 13/00

[52] U.S. Cl. .......................................... 318/640; 354/5; 354/7; 354/11; 354/13; 354/15

[58] Field of Search .................................... 354/5, 7–9, 354/11–16; 318/640, 685; 178/6.7 R

[56] References Cited

U.S. PATENT DOCUMENTS

| | | | |
|---|---|---|---|
| 2,682,814 | 7/1954 | Higonnet | 354/9 |
| 2,772,613 | 12/1956 | Williams | 354/9 |
| 2,945,167 | 7/1960 | Gunther | 318/640 |
| 3,044,374 | 7/1962 | Friedman | 354/14 |
| 3,183,806 | 5/1965 | O'Brien | 354/8 |
| 3,715,645 | 2/1973 | Viret et al. | 318/640 X |
| 3,856,394 | 12/1974 | Linde | 354/5 X |

*Primary Examiner*—John Gonzales
*Attorney, Agent, or Firm*—Hubbell, Cohen, Stiefel & Gross

[57] ABSTRACT

A drum control system for providing a predetermined incremental lateral spacing on a drum surface to be accessed in response to a request signal therefor in which the degree of rotation of the drum is controlled in response to the request signal to provide the predetermined incremental lateral spacing by selectively optically reading one of a plurality of optically readable encoded discs each of which has a plurality of circumferentially extending bands, with each of the bands being encoded to correspond to a different uniform proportionate degree of incremental rotation of the drum. The discs are optically read by associated selectively energized optical readers, such as photocells, when the band to be read is illuminated by a substantially simultaneously selectively energized light source. The plurality of discs are preferably arranged in pairs in which a common light source illuminates both discs of the pair with the appropriate associated photocell being selectively energized so that only one disc of the pair is optically read. The light sources and photocells are commonly mounted on a incrementally movable platform which may be indexed to commonly optically align the light source-photocell associated with the band to be read, each of the bands on a given disc preferably being radially spaced apart. The disc may preferably be mounted on a common shaft with the drum and held in place by a threaded resilient clamp which secures the disc in a given predetermined axial position on the shaft as well as enables the provision of the desired spacing between adjacent discs. The drum as well as the indexible light source-photocell platform, are preferably commonly mounted on another incrementally movable platform for simultaneous movement therewith with this platform being axially movable in the direction of the longitudinal axis of the drum, preferably bidirectionally, in response to a request signal for a different predetermined axial position or line feed on the drum surface relative to a fixed access location with the request signal being dynamically variable or programmable, such as from a computer. The system may be employed in a phototypesetting system, such as with a conventional Alphatype or Alphasette incremental model in which predetermined codes normally associated therewith may be swung, such as by means of an attachment to the conventional Alphatype recorder, to provide the code signals which control the operation of the programmable line feed circuitry as well as the indexing and lamp-photocell selection circuitry.

54 Claims, 19 Drawing Figures

-8T
-4T
-2T
-1T
16T
8T
4T
1266
1214
FROM 1216
1212
1210
1208
1206
1204
1202
1200
1106h1
1106h2
1106h3
1106h4
1106f1
1106f2
1106f3
1106f4
1106f5
1106f6
1106e1
1106e2
1106e3
1106e4
1106e5
1106e6
1106e7
1106e8
1106e9
1106e10
1106d1
1106d2
1106d3
1106d4
1106c1
1106c2
1106c3
1106c4
1106b1
1106b2
1106b3
1106b4
1106b5
1106b6
1106a1
1106a2
1106a3
1106a4
1106a5
1106a6
1106a7
1106a8
1106a9
1106a10
1106a11
1106a12
1230
1232
1234
1236
1238
1240
1242
1244
1246
1248
1250
1252
1254
1256
1258
1260
1262
1264
0
0.5
1.0
1.5
2.0
2.5
3.0
3.5
4.0
4.5
5
10
15
20
25
30
35
1UØ 1UI
2UØ 2UI
4UØ 4UI
8UØ 8UI
1TØ 1TI
2TØ 2TI
4TØ 4TI
FROM OUTPUTS OF CONV. 7 STAGE ALPHATYPE INTERNAL LINE FEED BINARY COUNTER(BOARD 26 OF ALPHATYPE 4P,5P - FIG 13),

DRUM CONTROL SYSTEM

BACKGROUND OF THE INVENTION

1. Field of the Invention

The present invention relates to systems for controlling the provision of a predetermined space on a drum surface.

2. Description of the Prior Art

Systems for providing control of the line feeding and lateral spacing of a drum, such as a conventional drum utilizable in a conventional phototypesetting system, such as the type provided with the Alphasette or the Alphatype 4p or 5p incremental phototypesetting system, manufactured by Alphatype Corp. of Skokie, Illinois and, described, by way of example in U.S. Pat. No. 2,905,068, are well known. In such an arrangement, the drum is normally keyed to a common shaft with a lateral spacing control composite disc which conventionally contains four circumferential radially spaced apart bands, with each of the bands being circumferentially divided into a plurality of transparent windows spaced apart by opaque areas which are normally and preferably equal in size to the transparent windows which are optically read by a single light source in combination with a single photocell. In such a conventional arrangement, the discs each have different available disc sizes which determines the spacing, that is the lateral movement of the drum in a given line with these disc sizes being conventionally established to provide eighteen different sizes or lateral space widths for phototype setting, such as a 9½ disc, a 15 disc, or an 18 disc, by way of example. The appropriate disc size or set size for a given job is dependent on the type font selected for the particular image and the physical appearance desired by the photocomposer. In addition, in such prior art phototype setting systems, such as the Alphatype or Alphasette, a full disc mode and a half disc mode is conventionally provided with a full disc unit and full disc mode being defined as an opaque area plus a clear area and, in the half disc mode, the opaque area also being counted so that a half disc unit is equivalent to either an opaque area or a clear area. Thus, by way of example, a 15 disc size could be utilized to also provide equivalent spacing obtainable from a 7½ disc by utilizing a 15 disc in the half mode. As was previously mentioned, these discs are conventionally optically read by a conventional lamp and photocell arrangement to provide information to conventional counting circuitry. In such a prior art arrangement in which each of the discs is normally provided with only two zones or bands of different sizes, 240 different distinctive discs are now presently utilized to provide all of the requisite combinations to provide the normally utilized 18 zones or bands for phototype setting. Thus, prior to initating the job, with the prior art systems, the user physically selects and mates the discs, one on top of the other, which would be required to provide all of the zones required for a given job and then mechanically selects the proper zones or bands to be optically read by position setting on a rotary switch. Such a prior art arrangement does not readily allow for flexibility or changes during the course of the job. Thus, with respect to the rotary switches, such as the type utilized to manually select line feed, as well as the above, the rotary switch bank utilized for line feed selection is normally fixed for the job and cannot be changed unless the job is halted and the switch is manually changed and, accordingly, cannot be continuously varied throughout the job, such as dynamically by means of a computer to provide a programmable line feed. Other prior art lamp-photocell drum control circuits, by way of example, are described in U.S. Pat. Nos. 2,989,904; 3,726,193; 2,736,249; 3,602,116; 3,307,459; 3,357,327; 3,464,331, 2,780,151; 3,274,909; 3,450,014; and 3,138,803. These systems, however, once again, do not provide a satisfactory flexible system in which the, by way of example, the number of optically readable discs required for drum control is minimized while the number of possible different disc or set sizes corresponding to different lateral spacing increments is maximized. These disadvantages of the prior art are overcome by the present invention.

SUMMARY OF THE INVENTION

A drum control system is provided for providing a predetermined incremental lateral spacing on a drum surface to be accessed in response to a request signal therefor. The system includes a motor for rotatably driving the drum about the longitudinal axis thereof as well as a control network for controlling the degree of rotation of the drum in response to the request signal to provide a predetermined incremental lateral spacing. Such rotation is controlled in accordance with a plurality of optically readable encoded discs, each of the discs having a plurality of radially spaced apart circumferentially extending bands, each band comprising a plurality of optically readable sense marks, with the discs being coaxially rotatably mounted for simultaneous incremental rotation with the drum in response to the request signal. Each of the sense marks in a given band corresponds to a predetermined uniform proportionate degree of incremental rotation of the drum and each of the disc circumferential bands is encoded to correspond to a different uniform proportionate degree of incremental rotation of the drum. The discs are preferably arranged in pairs spaced apart from each other with correspondingly equally radially spaced bands optically aligned with each other, a common light source preferably being mounted so as to be optically common with both discs of the pair and optically alignable for illumination of the bands when energized. In addition, each disc preferably has an associated optical reader, such as a photocell, optically aligned with the common light source and associated therewith and being selectively energizable and responsive to the sense marks on whichever associated band the optical reader is aligned with at a given time when the optical reader is selectively energized and the common light source illuminates this band for providing an output signal indicative of the proportionate degree of incremental rotation of the disc. The control network includes gating and relay circuitry for substantially simultaneously selectively energizing the optical reader associated with the disc band corresponding to the requested incremental lateral spacing and the common light source associated therewith in respone to the request signal by enabling the appropriate gating-relay network associated with the requisite light source-optical reader combination. The system also includes a brake operatively connected to the drum drive for halting the rotatable drive of the drum in response to a braking signal which is provided from a comparator which receives the request signal and the selectively energized optical reader output signal to provide the braking signal to the brake when the selectively energized optical reader output signal corresponds to the requested incremental lateral spacing. A first common incrementally movable platform is provided on which the light sources and the associated optical readers are mounted for simultaneous movement therewith, each of the light sources and optical readers being optically aligned with a common radial location on the disc so as to simultaneously access a common radial radially location on the disc. This light-source-photocell platform has a plurality of incremental index positions, one being associated with each of the radially located bands on the disc, in which the associated light source and optical reader are commonly optically aligned with the band located at each of these incremental index positions. A control circuit is provided for controlling the indexing or incremental movement of this platform to align the associated optical reader-light source with the band corresponding to the requested incremental lateral spacing for the drum in the shortest time by sensing the initial position of the platform and determining the direction and movement of the platform toward the incremental index position corresponding to the requested band to be read in the shortest time which is defined as the optimum minimum number of steps. This light source-photocell platform and the drum are also preferably commonly mounted on a second incrementally movable platform for simultaneous movement therewith with this other common platform being axially incrementally movable, preferably bidirectionally, in the direction of the longitudinal axis of the drum by means of a programmable relay network in conjunction with a bidirectional motor for incrementally axially moving this other common platform in response to a request signal for a different predetermined axial position on the drum surface relative to a fixed access location. Dynamic braking may be employed to halt the movement of this other common platform by dynamically braking the bidirectional motor, such as by providing the dynamic braking signal from a capacitor which charges only during axial advance of the drum when the motor is in the forward direction and only discharges to provide the dyanmic braking signal, having a predetermined duration, to the motor dependent on the discharge time constant when the programmed axial advance or line feed has been completed. Accordingly, any desired line feed may be programmed and may be dynamically varied during the course of a given job. This axial advance or line feed may be reversed in response to the receipt of a predetermined code signal and, the bidirectional motor may once again be returned to the forward direction when the drum axial position reaches a predetermined location.

The previously mentioned indexing light source-photocell platform is preferably incrementally advanced by means of a bidirectional rotary solenoid combination in conjunction with a rotary-to-linear conversion gearing arrangement, such as beveled gears and a rock-and-pinion arrangement, to incrementally advance the light source-photocell platform. With respect to the incremental movement of the other platform, a carriage advance device is preferably operatively connected to the platform for axially incrementally moving it in a predetermined axial direction with the bidirectional motor driving the carriage advance in a predetermined direction dependent on the state of the motor, and with the gating-relay network associated with this bidirectional motor capable of dynamically incrementally varying the quantity of incremental axial movement of this platform for controlling the operation thereof in response to the dynamically variable request signal for a different predetermined axial position of the drum relative to a fixed access location so that line feed to the drum may be dynamically varied in accordance with a dynamic variation in the axial position request signal. The line feed or axial position control circuitry is preferably readily interfaceable with a conventional phototypesetting system, such as a conventional Alphatype 4p or 5p for replacing the normally provided rotary switch bank which provides a preset fixed line feed or axial advance as opposed to a dynamically variable or programmable line feed or axial advance.

Preferably, the control signals utilized by the line feed or axial advance control circuitry of the present invention, as well as the light source-photocell direction circuitry and platform indexing control circuitry, are provided by signals which are predetermined coventional phototypesetting code signals which have been swung so as to render the system readily interfaceable with a conventional phototypesetting system, such codes preferably being provided from a relay network attachment for a conventional phototypesetting recorder, such as an Alphatype recorder. The previously mentioned discs which are preferably spaced apart by a predetermined amount and coaxially mounted to a common shaft in a fixed axial position thereon for simultaneous rotation therein, are preferably movably mounted on the shaft by disc clamps which include a threaded socket slidable on the shaft and an insertable threadable member having a resilient threadable portion threadably insertable into the socket and a mounted portion for the associated disc with the resilient portion being slidable on the shaft prior to insertion of the threadable portion in the socket and being squeezed to tighten against the shaft as it is threaded into the socket for preventing slidable movement therealong when the member has been threaded into the socket to fix the clamping means at a predetermined axial location with the width of the clamp preferably enabling the desired predetermined axial spacing between adjacent discs to be obtained whereby the clamping of the disc simultaneously enables the predetermined axial spacing as well as the securing of the disc to the shaft in its predetermined axial location.

DETAILED DESCRIPTION OF THE PREFRRED EMBODIMENT

"GENERAL DESCRIPTION"

Figures 8, 9, 10, 16:
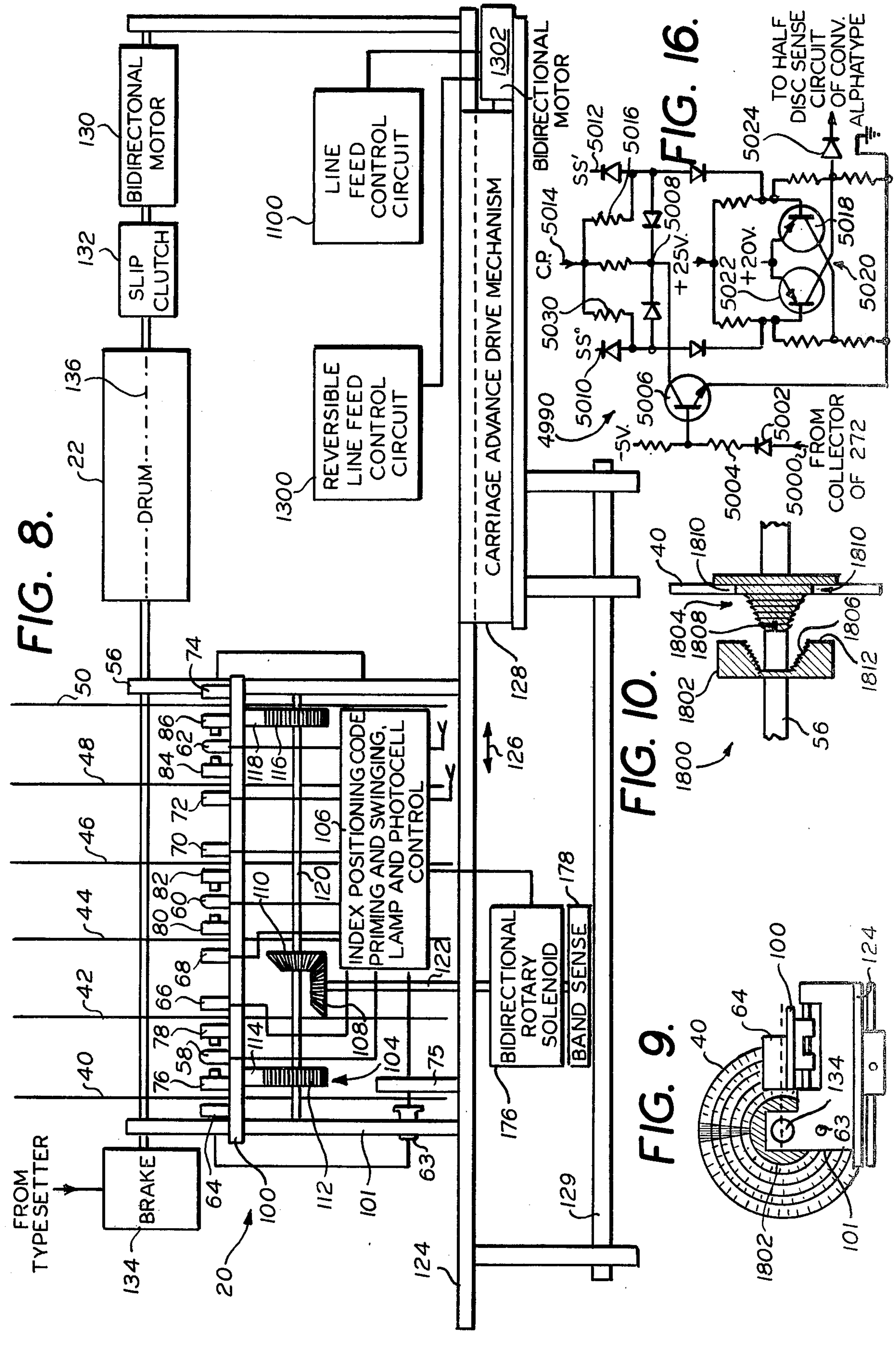
FIG. 8 is a diagrammatic illustration of a photocomposition material carrier lateral spacing system employing the system shown in FIG. 1 and further illustrating the preferred mechanical system employed with the system of FIG. 1.
FIG. 9 is an end view taken from the left side of the system of FIG. 8.
FIG. 10 is a fragmentary sectional view of a preferred disc clamp utilizable with the system of FIG. 8.
FIG. 16 is a schematic diagram of the preferred embodiment of a disc mode control network in accordance with the present invention.

Referring now to the drawings in detail, and initially to FIG. 8 thereof, a diagrammatically illustration of the preferred system, generally referred to by the reference numeral 20, of the present invention for providing control of the line feeding and lateral spacing of a drum 22, such as a conventional drum utilizable in conventional incremental phototypesetting, such as the provided with the Alphatype 5p phototypesetting system, manufactured by Alphatype Corp. of Skokie, Illinois wherein a photosensitive material, such as a photosensitive film, is circumferentially wrapped about the longitudinal axis of the drum 22 for exposure to selected type font faces to produce a printing master. This exposure is accomplished in conventional fashion in the Alphatype by flash lamp exposure, such a conventional system being described, by way of example, in U.S.

Pat No. 2,905,068. In such an arrangement, as will be described in greater detail hereinafter, the drum or cylinder 22 upon which the photosensitive tape or film carrier is selectively positioned for exposure of a image at a predetermined relationship to the previous image, is normally keyed to a common shaft with a spacing disc, such as disc 24 illustrated in FIG. 4. Such a disc 24 represents a composite disc which conventionally contains four circumferential bands, such as bands 26, 28, 52 and 54 illustrated in FIG. 4 with each of the bands being circumferentially divided into a plurality of transparent windows 30 spaced apart by opaque areas 32 which are normally and preferably equal in size to the transparent windows 30. In addition, the composite disc 24 conventionally has an opaque area 34 which conventionally enables proper registration of the disc 24 as well as a right index margin window 36 for proper registration of the disc 24 with the drum 22. As will be described in greater detail hereinafter, the preferred disc of the present invention has the right index margin window 37 preferably located in the position illustrated in FIG. 4.

As is well known, in photocomposition employing phototypesetting, the film carrier or drum 22 is preferably divided into 75 picas, such as in the previously mentioned Alphatype. In such a conventional arrangement, the discs 24 each have different available disc sizes which determine the spacing, that is the lateral movement on the drum in a given line, between adjacent images in a photoexposed line of type. These discs sizes are conventionally established to provide 18 different sizes, or lateral space widths, presently, such as the 9½ disc, a 15 disc, or an 18 disc, by way of example. The appropriate disc size or set size for a given job is dependent on the type font selected for the particular image and the physical appearance desired by the photocomposer. This diss size or set size is conventionally calculated in accordance with the formula 75 picas × 216 (which is a constant) is equivalent to the disc size or set size so that the number of units on a disc is conventionally equivalent to 16,200 divided by the disc size. In addition, it is conventionally recognized that one pica equals 12 points and the number of picas multiplied by 216 provides a quantity, which when divided by the set size, is equivalent to the number of incremental units on a disc, with the number of units on a disc normally be defined as the number of clear areas 30 on a disc 24 those units contained with opaque registration area 34.

The Alphatype, by way of example, conventionally provides a full disc mode and a half disc mode. In the full disc mode, a full disc unit to be counted is defined as an opaque area 32 plus a clear area 30, the number of clear areas being equivalent to the number of windows; whereas in the half disc mode, the opaque areas 32 are also counted so that a half disc unit is equivalent to either an opaque area 32 or a clear area 30. In this arrangement, by way of example, a 15 disc size could be utilized to also provide the equivalent spacing obtainable from a 7½ disc by utilizing the 15 disc in the half mode. These discs 24 are conventionally optically read by a conventional lamp and photocell arrangement to provide information to conventional counting circuitry, such as commonly provided in a conventional Alphatype photocomposing device, such as the Alphatype 4p.

In such a conventional arrangement, each of the discs 24, as previously mentioned, is normally provided with only two zones or bands 26 and 28 of different sizes and, conventionally, 240 different distinctive discs are now presently utilized to provide all of the requisite combinations to provide the normally utilized 18 zones or bands. In such a conventional arrangement, prior to initiating the job, the user physically selects and mates the discs, one on top of the other, which would be required to provide all of the zones required for a given job and then mechanically selects the proper zones or bands to be optically read by position settings on a rotary switch, to be described in greater detail hereinafter. Such an arrangement does not readily allow for flexibility or changes during the course of the job. The preferred arrangement illustrated in FIG. 8, however, utilizes a plurality of fixed optically readable discs 40, 42, 44, 46, 48, and 50, each similar to the type illustrated in FIG. 4, to provide all of the possible combinations of zones or bands to provide all of the presently desired set sizes, with only disc 40 containing the right index margin window 36. In addition, since six discs 40 through 50, inclusive, are utilizes, 24 zones or bands, in the present example, may be selected where, as presently preferred, four bands, such as bands 26, 28; 52 and 54 illustrated in FIG. 4 on disc 24, are provided per disc. Of course, if desired more than four bands may be provided per disc with appropriate obvious modifications in the indexing and positioning circuitry, to be described in greater detail hereinafter, so that the number of zones or bands which may be provided is any desired amount. In addition, although the presently preferred arrangement utilizes six such discs 40 through 50, inclusive, any other plurality of discs may preferably be provided on a common shaft 56 is desired. Thus, all of the discs 40 through 50, inclusive, are preferably keyed to the common shaft 56 which is also common to the drum 22 which rotates therewith so as to provide lateral image spacing for a given line on the drum 22, as will be described in greater detail hereinafter. In addition, as will also be described in greater detail hereinafter, each optically readable disc 40 through 50, inclusive, has a lamp and photocell arrangement associated therewith, with discs 40 and 42 preferably sharing a common lamp or light source 58, discs 44 and 46 preferably sharing a common lamp or light source 60 and discs 48 and 50 preferably sharing a common lamp or light source 62, and with each of the discs 40 through 50, inclusive, having its own respective conventional photocell, 64 for disc 40, 66 for disc 42, 68 for disc 44, 70 for disc 46, 72 for disc 48, and 74 for disc 50, being associated therewith in optical alignment with the respective light source. Thus, photocell 64 is on one side of disc 40 and is preferably optically aligned with light source 58 located on the opposite side thereof a conventional lens arrangement 76, photocell 66 is located on one side of disc 42 and is preferably optically aligned with light source 58 located on the opposite side thereof through another conventional lens arrangement 78, photocell 68 is on one side of disc 44 and is preferably optically aligned with light source 60 located on the opposite side thereof through a conventional lens arrangement 80, photocell 70 is located on one side of disc 46 and is preferably optically aligned with light source 60 located on the opposite side thereof through another conventional lens arrangement 82, photocell 72 is located on one side of disc 48 and is preferably optically aligned with light source 62 located on the opposite side thereof through another conventional lens arrangement 84 and photocell 74 is preferably located on one side of disc 50 and is preferably optically aligned with light source 62 located on the opposite side thereof through another conventional lens arrangement 86. As will be discussed in greater detail hereinafter, the photocells 64 through 74, inclusive, light sources 58 through 62, inclusive, and lens arrangement 76 through 86, inclusive, are all commonly mounted on a movable platform 100 which is preferably bidirectionally movable in the horizontal plane in the example illustrated in FIG. 8 (that is in a direction into and out of the paper) to be indexed to selectively access each of the bands or zones 26, 28, 52 and 54, in the example given, on each of the discs 40 through 50, inclusive, in response to index positioning control signals which are provided from the preferred index positioning circuit (illustrated in FIGS. 5, 6A and 6B and which will be described in greater detail hereinafter with reference thereto). Input codes, such as from an on line computer or a magnetic tape, are preferably provided to the index positioning circuit to control the operation of a bidirectional rotary solenoid 176 which is preferably geared through a conventional rotary-to-linear gearing network for controlling the bidirectional movement of platform 100 upon which information is optically read from the accessed band or zone in accordance with control of the appropriate selected lamp 58 through 62, inclusive, and photocell 54 through 74, inclusive. In addition the preferred right index margin window 37 on disc 40 is optically read by a lamp 63 located in platform 100 support 101 in combination with a photocell 75 optically aligned therewith on the opposite side of disc 40.

All of the above control circuitry for lamp and photocell control and index positioning is generally indicated in FIG. 8 by the block labeled 106 and will be described in greater detail hereinafter with reference to FIGS. 1, 2, 4, 5, 6A, 6B and 7. Suffice it to say that platform 100 is connected to the bidirectional rotary solenoid 176 for linear movement in response to rotation of rotary solenoid 176 through conventional bevel gearing 108–110 and a conventional rack and pinion arrangement 112–114, 116–118, with bevel gear 110 being mounted on a common shaft 120 with gears 112 and 116, and with bevel gear 108 being connected to solenoid 176 via shaft 122. The drive of the disc reading platform 100 in order to accomplish indexing to access the proper zone or band on the appropriate spacing disc 40 through 50, inclusive, as well as the balance of the associated control circuitry for obtaining the lateral image spacing for drum 22, will be described in greater detail hereinafter with reference to FIGS. 1,2,4,5,6A,6B and 7.

In addition to movement of platform 100 in order to accomplish this indexing, platform assembly 100 as well as the drum mechanism 22 and its drive mechanism, to be described in greater detail hereinafter, are connected in common to another movable platform 124, such as one similar to the type or platform conventionally provided in the Alphatype 5 p phototypesetting device. In this instance, the entire platform 100 is longitudinally advanced to accomplish line feed for the drum 22. As will be described in greater detail hereinafter, the presently preferred arrangement will enable bidirectional line feed in the direction of arrows 126 illustrated in FIG. 8, this bidirectional line feed being accomplished, as will be described in greater detail hereinafter, by use of a bidirectional motor 1302 in cooperation with a carriage advance drive mechanism 128, which is otherwise conventional except for the manner of accomplishing this line feed under control of a line feed control circuit 1100 and reversible feed control circuit 1300 which will be described in greater detail hereinafter with reference to FIGS. 11 through 15, and 3 wherein such line feed may be reversible, as well as programmable, and, accordingly preferably controllable in response to an on line computer interface output or magnetic tape output. In accomplishing line feed, platform 124 is advanced by drive mechanism 128 for slidable movement on support shaft 129.

With respect to lateral spacing control on drum 22, suffice it to say at this point that the drum 22, which is selectively positioned for conventional flash exposure of an image at a predetermined relationship to the previous image and which is keyed to common shaft 56, preferably, together with spacing discs 40 through 50, inclusive, is conventionally driven by a conventional bidirectional motor 130-slip clutch 132-brake 134 arrangement in the following manner. As was previously mentioned, the shutter control mechanism for selective image exposure of the photosensitive material carried on drum 22 may be any conventional type, such as utilized in the Alphatype or described in U.S. Pat. No. 2,905,068, by way of example. As will be described in greater detail hereinafter, the drum 22 is linearly movable, in the directions of arrow 126, to accomplish line advance, and rotatably movable about its longitudinal axis 136 which is coexistent with shaft 56, to accomplish lateral image spacing of a given line on the drum 22. Generally, the movement of the drum 22 in order to provide this lateral image spacing in a given line is preferably as follows. Drum 22 is initially commanded to reverse rotation until it senses the starting position (all discs 40 through 50, inclusive, utilizing a common starting position, preferably). Once this position is set, the drum 22 is then commanded to advance in the designated forward direction responsive to receipt of a brake release pulse to brake 134 from the conventional typesetter control circuit (not shown), such as from a conventional Alphatype phototypesetter. Receipt of this pulse, in turn, deenergizes the brake 134 to enable rotation of the drum by bidirectional motor 130 which is preferably, continuously driven in the forward direction, unless reversed with slip clutch 132 conventionally allowing motor 132 to continue to rotate even when brake 134 is energized, thereby respectively disconnecting drum 22 from motor 130 when brake 134 is energized, in conventional fashion. The brake 134 is selectively deenergized and energized in conventional fashion responsive to the receipt of th encoded digital information from the typesetter, such as, for example, set width identity bits and justification bits which are associated with a given lateral space, four bits normally being utilized to provide set width identity to provide 15 possible combinations for the Alphatype code (preferably providing 4 through 18 units as the lateral spacing, the conventional Alphatype code being a ten bit code wherein six bits are utilized for character and function identity with four bits being utilized for set width identity and two of the function codes being utilized for one and two unit set widths, respectively), and the pulse information supplied from the appropriate photocell 64 through 74, inclusive, optical reading of the appropriate disc 40 through 50, inclusive, to start and then stop the drum 22 at the desired lateral spacing. The brake 134 is preferably deenergized upon receipt of this digital information from the typesetter and energized when the pulse information from the appropriate photocell 64 through 74, inclusive, indicates that the drum 22 has rotated about its axis 136 to a point which corresponds to the desired lateral spacing, such as by coincidence in a conventional counter between the information supplied from the appropriate photocell 64 through 74, inclusive, and the digital information selected spacing from the typesetter. Of course, suitable conventional means could be employed to have the drum 22 rotate either unidirectionally or bidirectionally in response to this information with bidirectional rotation preferably being provided for in FIG. 8 with the bidirectional motor 130.

LATERAL SPACING CONTROL

Figure 4:
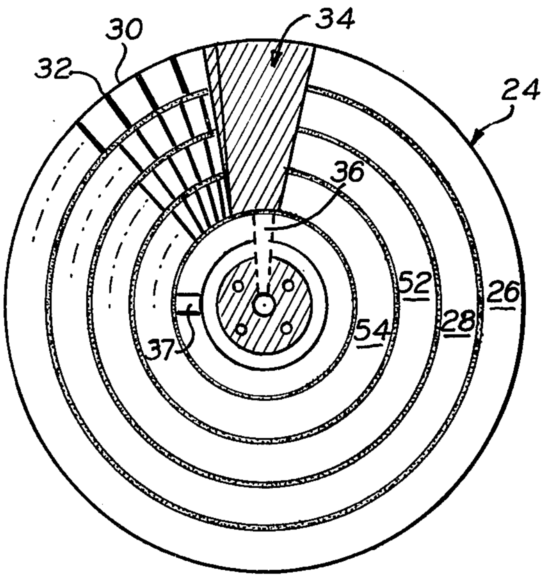
FIG. 4 is a diagrammatic illustration of a typical disc for use with the arrangement of FIG. 8.

Referring now to FIGS. 1, 2, 5, 6A and 6B, the system for providing lateral spacing control for providing the desired lateral image spacing on the drum 22 in a given line thereof shall be described. Initially referring to FIG. 1, a general overall system block diagram of the preferred lateral spacing control circuitry 106 is shown. Before proceeding further, it should be noted that, as used throughout the specification and claims, the terms zone and band are used interchangeably to refer to the optically readable circumferential bands 26, 28, 52 and 54, by way of example, on a disc 24 (FIG. 4). As will be described in greater detail hereinafter, a zone change enable code is provided via path 150 when it is desired to change the zone or band being optically read and/or any one of the selectable discs 40 through 50, inclusive, on which the band is being read, this zone change enable code being provided via path 150 to a code priming and swinging circuit 152, to be described in greater detail hereinafter with reference to FIG. 2 and FIGS. 6A and 6B, which also preferably receives the clock pulse associated with this zone change enable code via path 154, the system preferably being a common strobe system.

As will also be described in greater detail hereinafter, receipt of these signals by code priming and swinging circuit 152 activates a relay 156 (FIG. 2), termed the code swing relay, to latch this relay 156, as will be described in greater detail hereinafter with reference to FIGS. 2, 6A and 6B. In this instance, the next code received via path 150, with its associated clock pulse received via path 154 after this relay 156 has been latched, will provide the zone selection code which, as will be described in greater detail hereinater, contains an index positioning input code portion provided via path 158 to index positioning circuit 160 and a disc selection input code portion provided via path 152 to a lamp and photocell control circuit 164. The disc selection code portion of the zone selection code provided via path 162 preferably actually selects which one of the photocells 64 through 74 is to be enabled which, in turn, also preferably selects the appropriate exciter lamp 58 through 62 which is to be energized. In addition, the index positoning portion of the zone selection code provided via path 158 preferably selects, in the example shown, one of four index positions for the lamp-photocell platform 100, this platform 100 indexing in or out, preferably to be aligned with the appropriate one of the four bands 26, 28, 52 and 54 preferably provided on each of the discs 40 through 50, these discs 40 through 50, inclusive, preferably remaining stationary in their axial position although rotatable in common with shaft 56 about this fixed axial position. In addition, as will also be described in greater detail hereinafter, the enable code provided via path 150 is also supplied to a lamp and photocell cut off circuit 170 to turn off or cut off the photocell and lamp that were previously enabled prior to receipt of the present enable code, as will be described in greater detail hereinafter with reference to FIGS. 6A and 6B. As will also be described in greater detail hereinafter with reference to FIGS. 6A, 6B and 7, at the time of the occurrence of the leading edge of the clock pulse associated with the zone selection code, lamp and photocell selection occurs while at the time of the trailing edge of the clock pulse associated with the zone selection code, the previously latched code swing relay 156 unlatches or unprimes.

The index positioning circuit 160, which will be described in greater detail hereinafter with reference to FIGS. 5, 6A and 6B, preferably continually senses the present position of platform 100 and in response to a zone selection input index positioning code from code priming and swinging circuit 152 provided via path 158, determines the stepping direction to be provided for platform 100 to reach the selected index position in the optimum time (shortest number of steps). As will be described in greater detail hereinater, this direction signal is provided to a bidirectional stepping and position sensing circuit 172 from index positioning circuit 160 via path 174 to advance the bidirection stepping device 176 (FIG. 5), which is preferably the previously referred to rotary solenoid 176, in the appropriate direction, the position sensing porition 178 (FIG. 5) of the bidirectional stepping and position sensing circuit 172 preferably providing position sensing feedback to index positioning circuit 160 via path 178 which stops the bidirectional stepping device 176 when the selected position is reached. This feedback information provided via path 178 also includes the sensed present position of platform 100 which was referred to above. As will be described in greater detail hereinafter with reference to FIGS. 5, 6A and 6B, the position sensing circuit 178 of bidirectional stepping and position sensing network 172 preferably includes one sensor for providing an indication of the present index position for purposes of enabling determination of an optimum direction for the next position code and a separate sensor for providing an indication of when the selected index position has been reached by platform 100.

Figure 1:
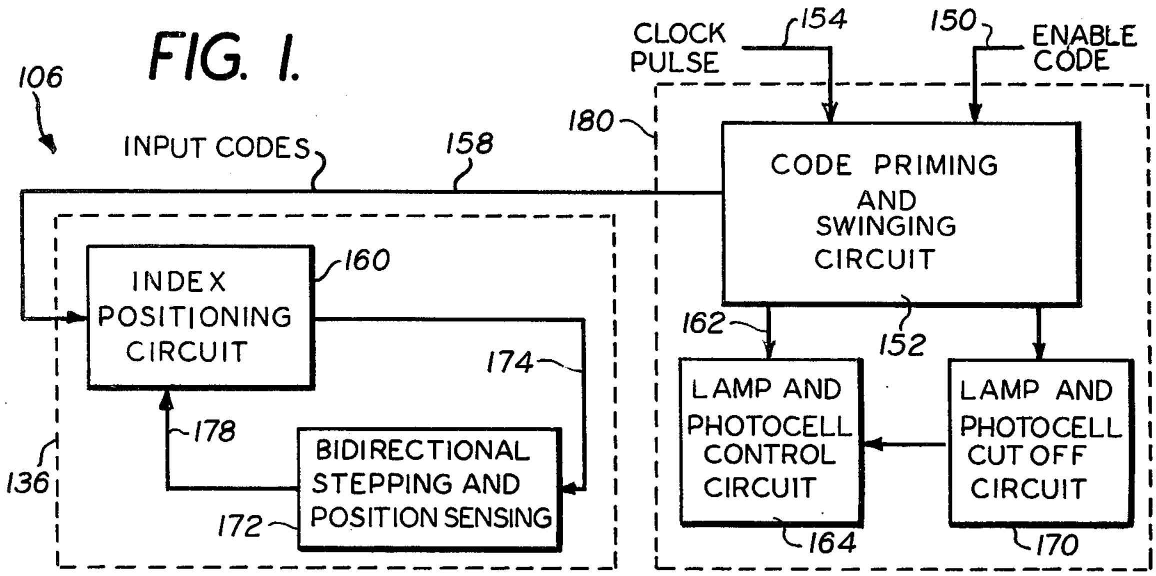
FIG. 1 is a system block diagram of the preferred embodiment of the lateral spacing selection system of the present invention.
Figure 2:
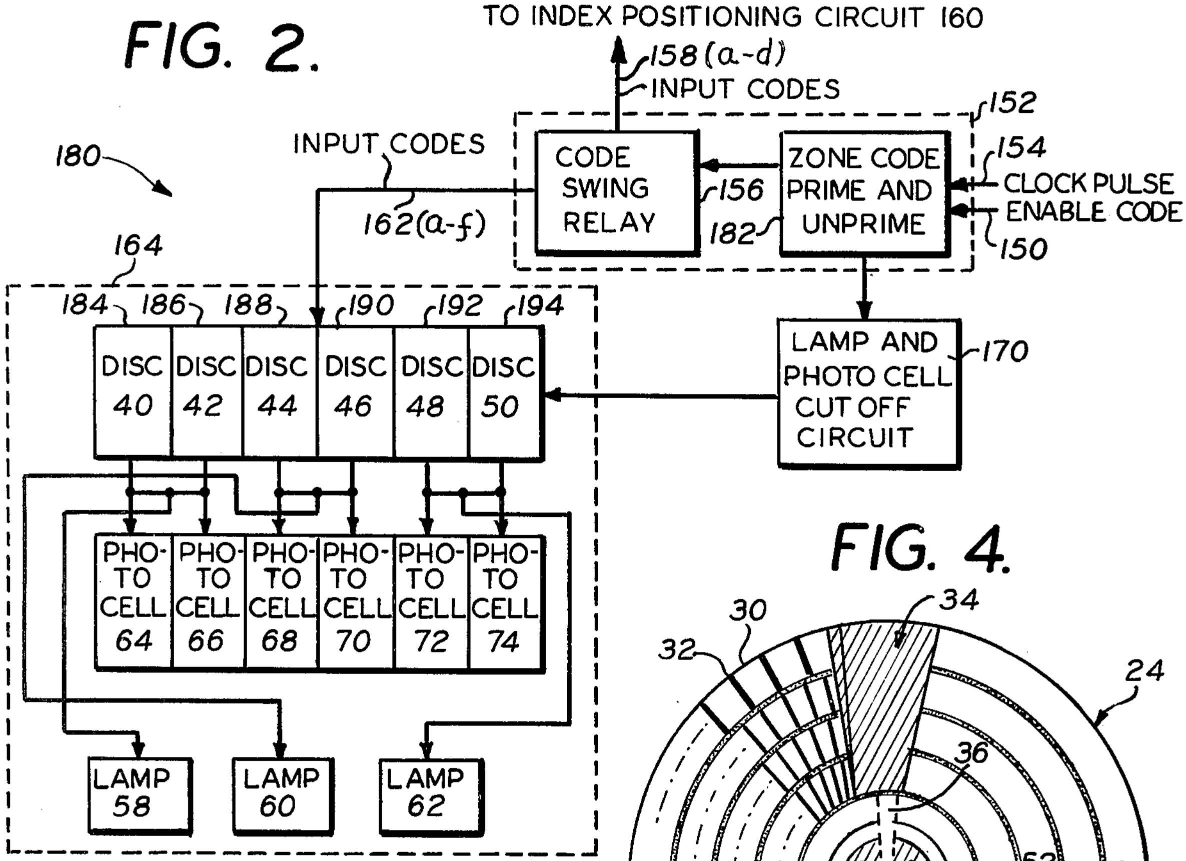
FIG. 2 is a detailed block diagram of the code priming circuit and lamp and photocell control circuitry of the embodiment shown in FIG. 1.

Referring now to FIG. 2, the lamp and photocell control circuitry 164, together with the associated code priming and swinging circuitry 152 and lamp and photocell cut off circuitry 170 will be described in greater detail, the entire arrangement being generally referred to by the reference numeral 180. As was previously mentioned, the zone selection input code disc selection code portion is routed through code swing relay 156 via path 162 to the lamp and photocell control circuitry 164 in the latched position of relay 156. Preferably, for purposes of explanation, the system shall be described as being operable in conjunction with a conventional Alphatype and all codes referred to, for purposes of explanation, shall be conventional Alphatype codes or variations thereof, unless otherwise specified. Of course, as will be readily understood by one of ordinary skill in the art, any other desired codes could be utilized without departing from the spirit and scope of the invention. In accordance with the above, when relay 156 is latched, the normal code indication of, for example, letters A through F in the conventional ten bit Alphatype code and the set width identity bits of this ten bit conventional Alphatype code, are swung and are utilized to provide zone selection information, as will be described in greater detail hereinafter with reference to FIGS. 6A and 6B. The enable code provided via path 150 and its associated clock pulse provided via path 154 are preferably provided to a zone code prime and unprime circuit 182, to be described in greater detail hereinafter with reference to FIGS. 6A and 6B, which circuit forms a portion of the code priming and swinging circuit 152 whose operation was generally previously described above with reference to FIG. 1. The output of the code swing relay 156, in the example given, via path 162 is preferably the Alphatype codes for the letters A through F which have been swung by relay 156 in order to provide selection information for photocell 64 through 74, inclusive, and their appropriate associated exciter lamp 58 through 62. In addition, as was also previously mentioned, relay 156 also preferably swings the set width identity bits obtained in the conventional ten bit Alphatype code to provide index positioning codes, via path 158, to index positioning circuit 160.

For purposes of explanation, paths 162 has been shown as a single path although preferably, in the example given, six parallel paths, one per photocell or disc, are in reality preferably provided. The blocks labeled 184 through 194, inclusive, in FIG. 2 represents the lamp-photocell control circuitry for each of the discs 40 through 50, inclusive, respectively, and will be described in greater detail with reference to FIGS. 6A and 6B. The respective outputs of the lamp and photocell control circuits 184 through 194, inclusive, as illustratively shown in FIG. 2, are respectively provided to the appropriate associated photocell 64 through 74, control circuit 184 being associated with photocell 64, control circuit 186 being associated with photocell 66, control circuit 188 being associated with photocell 68, control circuit 190 being associated with photocell 70, control circuit 192 being associated with photocell 72 and control circuit 194 being associated with photocell 74, with the appropriate control circuit 184 through 194 turning on the selected photocell 64 through 74, associated therewith. The control signal from the appropriate control circuit 194 through 194 also preferably turns on the proper associated excited lamp 58 through 62, inclusive, with the exciter lamp 58 being connected in parallel between photocells 64 and 66 to be turned on when either of these photocells is turned on, exciter lamp 60 being connected in parallel between photocell 68 and 70 to be turned on when either of these photocells are turned on and exciter lamp 62 being connected in parallel between photocells 72 and 74 to be turned on when either of these photocells are turned on. As was previously mentioned, the appropriate control circuit 184 through 194 for discs 40 through 50, inclusive, respectively, is activated in response to th zone selection code provided via the appropriate associated path 162 from relay 156. As shown and preferred in FIG. 2, and as will be described in greater detail hereinafter with reference to FIGS. 6A and 6B, the lamp and photocell cutoff circuit 170 is connected to the control circuit 184 through 194 to turn off the previously energized lamp and photocell that was previously enabled prior to receipt of the presently received enable code.

Figure 5:
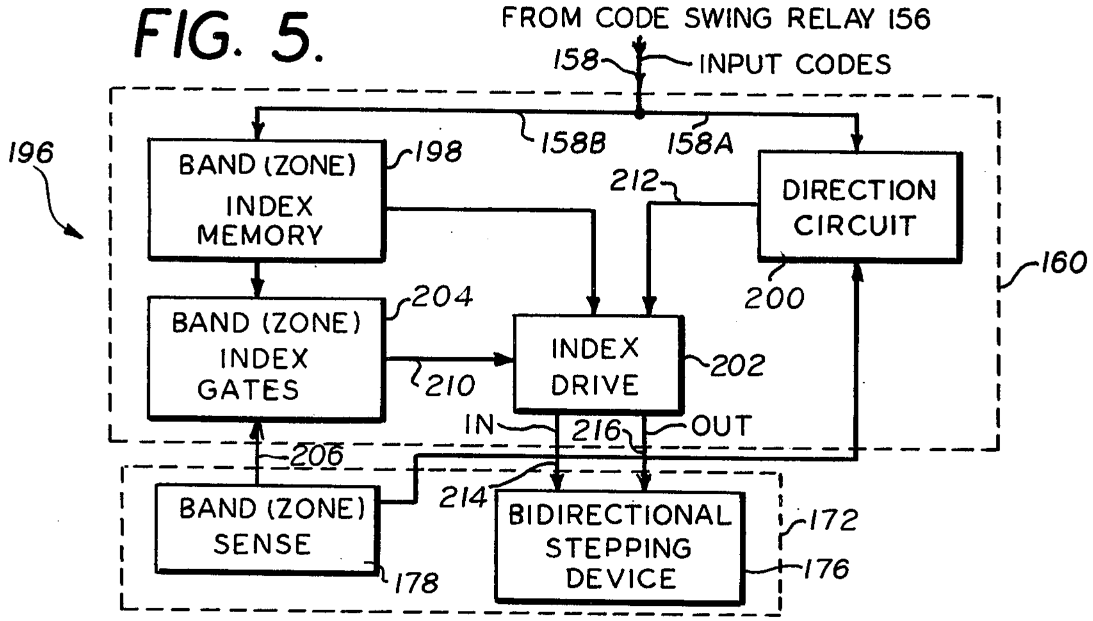
FIG. 5 is a more detailed block diagram of the index positioning circuit portion of the system shown in in FIG. 1.

Referring now to FIG. 5, the index positioning circuit 160 and the bidirectional stepping and position sensing network 172 shall be described in greater detail, with reference to FIG. 1 with both positioning circuit 160 and bidirectional stepping and positioning sensing network 172 being collectively gennerally referred to by reference numeral 196. The index positioning input code provided via path 158 from code swing relay 156 which is, as was previously mentioned, preferably derived from swinging the set width identity bits, is preferably provided in parallel to a band or zone index memory 198, to be described in greater detail hereinafter with reference to FIGS. 6A and 6B, and to a direction circuit 200 which is also to be described in greater detail hereinafter with reference to FIGS. 6A and 6B. In the example given, four bands or zones are preferably provided per disc, zones 26, 28, 52 and 54, for each disc 40 through 50, inclusive, and, accordingly, the memory 198 preferablycomprises 4 conventional flip-flops, one being provided per zone or band in position, with the appropriate flip-flop selected or set, preferably, in response to receipt of the index positioning input code via path 158. Accordingly, the index positioning input code provided via path 158 preferably sets the proper flip-flop in memory 198, resets the flip-flop in memory 198 that was previously set and turns on or activates an index drive mechanism 202, to be described in greater detail hereinafter with reference to FIGS. 6A and 6B. Each flip-flop in memory 198 preferably has its own associated two input AND gate in band or zone index gating network 204, also to be described in greater detail hereinafter with reference to FIGS. 6A and 6B, with one input to this two input AND gate being the flip-flop set output and the other input being provided via path 206 from sensing network 178. For purposes of explanation, only single paths are shown between memory 198 and gating network 204 and between sensing portion 178 and gating network 204, these paths actually being parallel paths with one being provided per gate, preferably. As was previously mentioned, band or zone sensing network 178 preferably comprises two sensing portions, one portion providing a signal via path 206 to gating network 204 when the selected position is reached by platform 100, and the other portion providing a present position sensed signal via path 208 to direction circuit 200. As will be described in greater detail hereinafter, when the appropriate AND gate in gating network 204 receives an input from the appropriate flip-flop of memory 198, and another input via path 206 from sensing network 178, so that both of these inputs are present in the appropriate gate, an output signal is provided to index drive 202 via path 210 which turns off the index drive mechanism 202. The direction circuit 200, as will be described in greater detail hereinafter, which also receives the index positioning input code via path 158 and the present position sensing information via path 208, preferably operates in response to the index positioning input code information via path 158 dependent on the information provided via path 208 from sensing network 178 to provide an output signal to index drive 202 via path 212 which, in turn, provides directional pulses, labeled IN via path 214 or OUT via path 216, to bidirectional stepping device 176 to step platform 100 in towards the center of the discs or out away from the center of the discs and towards the periphery. For purposes of explanation, path 208 has been shown as a single line although preferably actually four parallel paths are provided to direction circuit 200 in which the present position path 208 is enabled to provide the present position information to direction circuit 200 for use in determining the optimum direction.

Figure 6A:
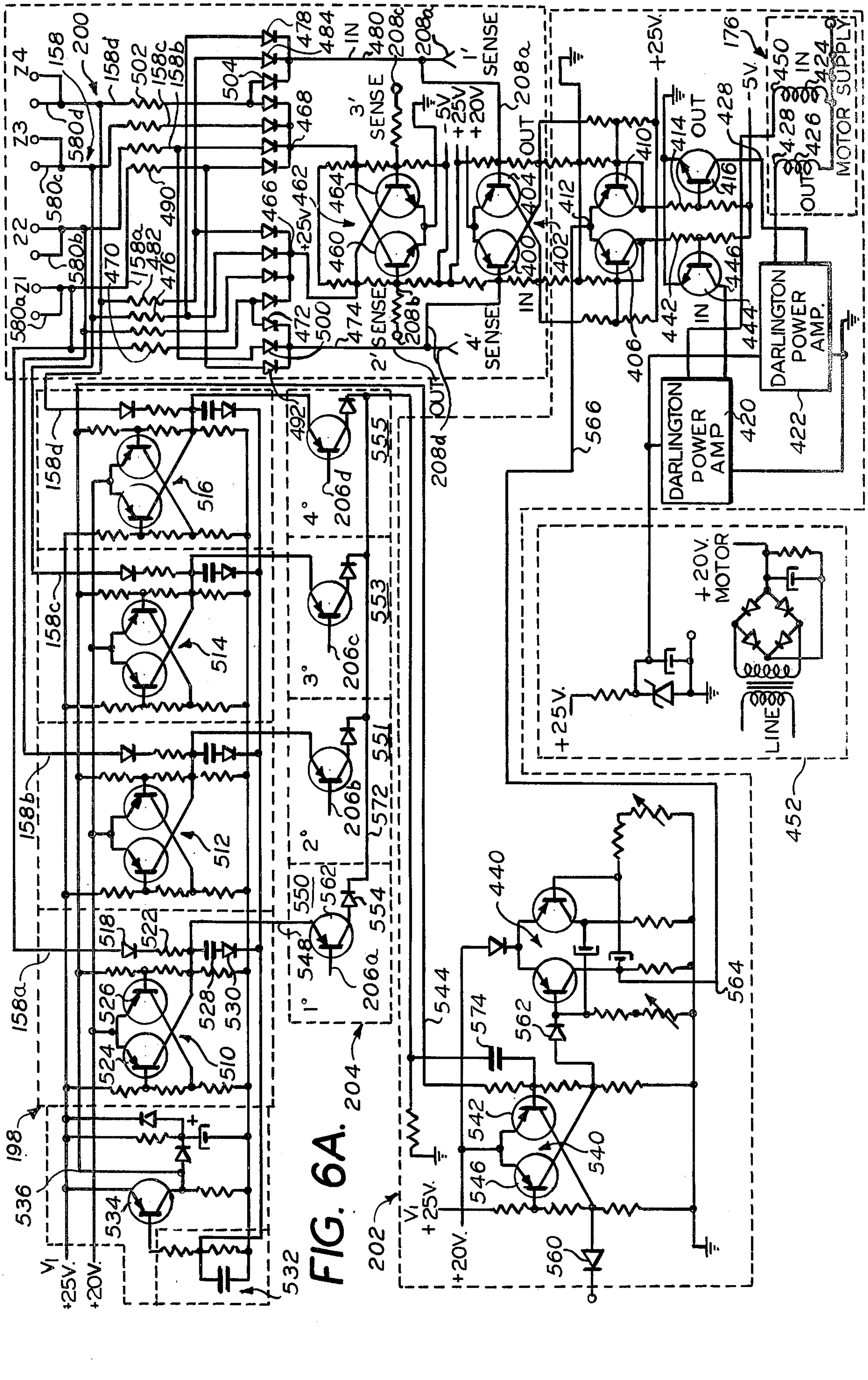
FIGS. 6A and 6B comprise a schematic of the system of FIG. 1.
Figure 6B:
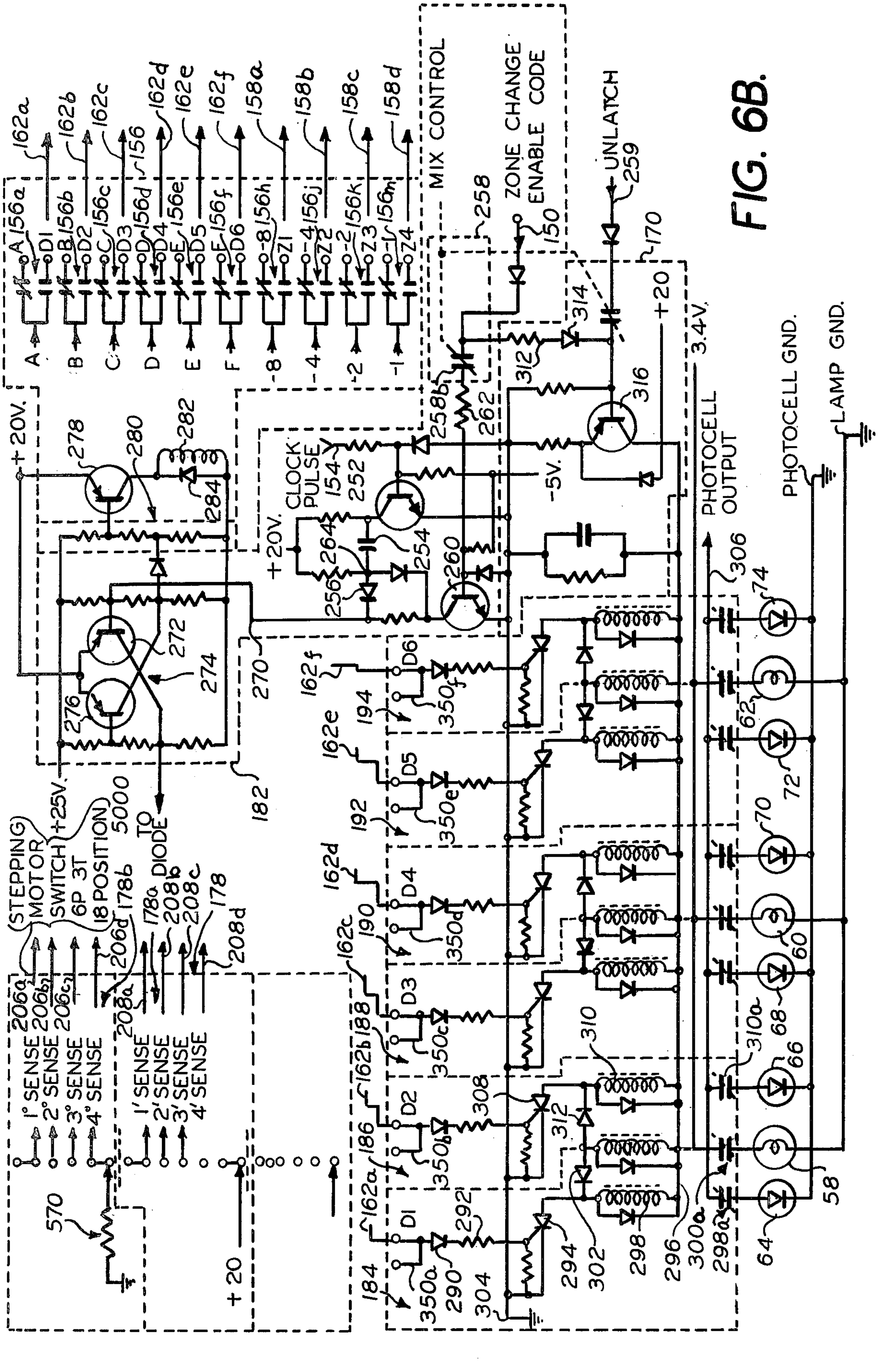

Referring now to FIGS. 6A and 6B, when taken together provide a schematic of the lateral spacing control circuitry generally described above with reference to FIGS. 1, 2 and 5, the structure and operation of the lateral spacing control circuitry 106 (FIG. 8) shall be described in greater detail. As was previously mentioned, the input codes which control the operation of the lateral spacing control circuitry are preferably provided by swinging conventional Alphatype codes, although as previously mentioned any other codes could be utilized, by operation of the code swing relay 156 to provide the index positioning input code for zones or bands 1 through 4, in the example given, via path 158 by swinging the set width identity bits of the conventional Alphatype code and to provide the disc selection input codes via path 162 by way of example, by swinging the conventional A through F Alphatype codes. As shown in FIGS. 6A and 6B, conventional relay notation is utilized in indicating the normally closed and normally open position of the various relays employed including code swing relay 156. As shown in FIG. 6B, in the preferred example of the present invention wherein the Alphatype codes for A through F are swung to provide the disc selection codes via path 162 and the set width identity bits of the Alphatype code normally labeled −8, −4, −2 and −1 are swung to provide the index positioning codes for zones 1 through 4, in the example given, via path 158, relay 156 is shown withcontacts **156*a*, 156*b*, 156*c*, 156*d*, 156*e*, 156*f*, 156*h*, 156*j*, 156*k*, 156*m*, in the normally closed unlatched position of the relay 156 wherein the conventional Alphatype codes for the letters A through F and the set width identity bits −8, −4, −2 and −1, would normally be provided. In order to latch the code swing relay 156, the clock pulse associated with the zone change enable code is preferably provided via path 154 to a transistor 252 which is driven to saturation for the duration of the clock pulse provided via path 154. A capacitor 254 which is preferably connected to the collector of transistor 252, with transistor 252 saturated, or conducting, preferably discharges through transistor 252 to ground. At the completion of the clock pulse provided via path 154, transistor 252 preferably cuts off and capacitor 254 again charges to a predetermined potential value which, in the example shown in FIG. 6B, is plus 20 volts. In this preferred arrangement, when capacitor 254 charges, a diode 256 connected thereto sees a positive going pulse. When a zone change enable code signal is provided via path 150, this signal is passed through a conventional mixer control switch 258 to the base of a transistor 260 (through a resistor 262) which is driven into saturation. Capacitor 254, which is previously described, will preferably only charge when point 264 is not at ground potential. Accordingly, when transistor 260 is saturated due to the signal provided via path 150 through switch 258, this point 264 will be at ground potential so that capacitor 254 will not charge and will not pass a positive spike through diode 256**.

A ground potential is also placed at point 270 in the zone code and unprime circuit 182 when transistor 260 is saturated, with the duration of the saturation of transistor 260 being determined by the width of the zone change enable code pulse present on path 150, this pulse width preferably being identical with that of the associated clock pulse provided via path 154 The ground potential present at point 270 for the duration of the zone change enable code pulse, in turn causes transistor 272 of a conventional flip-flop network 274 to conduct which in turn causes the other transistor 276 of the flip-flop 274 to cut off in conventional fashion. This in turn allows a transistor 278 connected to the output of the flip-flop network 274 to saturate through a conventional voltage divider biasing network connected between the base of transistor 278 and the output of the flip-flop network 274. Preferably, the values of the voltage divider biasing network 280 are chosen so as to forward bias transistor 278 when there is no external voltage provided from transistor stage 276 of the flip-flop 274. When transistor 278 saturates due to the forward bias potential applied through the voltage divider network 280, relay 156 latches due to the current supplied through relay coil 282, which as shown and preferred, has a diode 284 connected thereacross to provide conventional counter EMF protection. In the latched position of relay 156, the normally closed contacts illustrated in FIG. 6B are open and the normally open contacts illustrated in FIGS. 6B are closed so that paths **162*a* through 162*f* and 158*a* through 158*d* are closed. In this manner, when the letter codes A through F or the set width identity bits −8, −4, −2, or −1, are provided from the Alphatype, these codes will be swung by relay 156 and provided via path 162*a* through 162*f* for letter codes A through F and 158*a*** through 158*d* for the set width identity bit codes in the later position of code swing relay 156.

Before describing how the zone change enable code received via path 150 cuts off the previously enabled photocell-lamp arrangement, the selection of the proper disc 40 through 50, inclusive, to be optically read to provide the lateral spacing control information shall be described. As was previously mentioned above, since relay 156 is now latched, the disc selection code to be provided via path 162 will be one of the letters A through F of the Alphatype code which, because they are now swung by the latched relay 156, will in turn be one of the disc selection codes D1 through D6, respectively, provided via paths 162*a* through 162*f,* respectively. For example, if the particular disc to be selected for a particular lateral space is disc 40 which, in the example given, is associated with disc selection code D1 provided via path 162*a,* this signal will be provided to disc control circuit 184 via path 162*a* through diode 290 and resistor 292 at the input of control circuit 184 to the gate of a conventional SCR 294 causing the SCR to conduct. When SCR 294 conducts, a path is provided for the current flow from path 296, to be described in greater detail hereinafter, through a relay coil 298 and a relay coil 300 connected in parallel therewith through a diode 302 connected between coils 298 and 300 and then through SCR 294, which is now conducting, through path 304 to ground thereby latching relay coils 298 and 300 to close normally open contacts 298*a* and 300*a,* respectively. Thus, the latching of relay 298 which closes normally open contact 298*a,* as shown and preferred, connects photocell 64 in the circuit to provide the output thereof to the conventional Alphatype counting circuitry to be described in greater detail hereinafter with reference to FIG. 10, by connecting the anode of photocell 64 to the common photocell output line 306. Similarly, the latching of relay 300 which closes normally open contact 300*a,* turns on exciter lamp 58 by placing the lamp voltage, such as 3.4 volts in the example shown in FIG. 6B, across the exciter lamp 58. Accordingly, as previously mentioned, the photocell and its associated lamp are preferably turned on simultaneously. Preferably, the operation of the balance of the disc selection control circuits 186 through 194, inclusive, is identical with that previously described with reference to disc control circuit 184 with the exception that each of these circuits 186 through 194 is responsive to a different disc selection code provided on the appropriate one of the paths 162*b* through 162*f,* respectively, corresponding to letter codes B through F being swung by the code swing relay 156, these disc selection codes being respectively indicated by the notations D2 through D6, respectively, for disc control circuits 186 through 194, respectively. For example, if either path 162*a* or 162*b* provides a disc selection code signal D1 or D2, respectively, to the associated disc control selection circuit 184 or 186, respectively, the appropriate conducting SCR, SCR 294 in the instance of control circuit 184 and SCR 308 in the instance of control circuit 186, will provide a path through the common coil 300 (with this path with respect to energizing light source 58 and photocell 64 having been previously described with respect to coil 298 and coil 300 for control circuit 184) and, for control circuit 186, with respect to the disc selection code being provided via path 162*b,* coil 310 being latched for providing a path to ground through conducting SCR 308 and coil 300 through diode 312 connected between coils 300 and 310 through SCR 308 to ground. The latching of coil 310 preferably closes normally open contact 310*a* which will place photocell 66 in the circuit to provide an output via path 306 and will, preferably, simultaneously, through the latching of coil 300 turn on exciter lamp 58 which, as shown and preferred in FIG. 8, is shared by photocell 64 and 66 through lenses 76 and 78, respectively, to illuminate either disc 40 or disc 42. As was previously mentioned, similar sharing of light source 60 by photocells 68 and 70 and of light source 62 by photocells 72 and 74 is provided through the use of a common relay coil circuit arrangement identical with that previously described with reference to control circuits 184 and 186. Accordingly, these control circuits 188 and 190, and 192 and 194, respectively, will not be described in greater detail hereinafter.

As was previously mentioned, receipt of the zone change enable code via path 150 cuts off the previously enabled photocell-lamp combination to precondition the disc control selection circuits 184 through 194 and the photocells 64 through 74 and lamps 58 through 62, to be ready to respond to receipt of the appropriate disc selection code provided via paths 162*a* through 162*f* after the code swing relay 156 has been latched in the manner described above in response to receipt of a zone change enable code and its associated clock pulse. This cutting off is accomplished by the lamp and photocell cut off circuit 170 in the following fashion. The zone change enable code pulse signal provided via path 150, which is provided to transistor 260 through switch 258, is also provided in parallel through a resistor 312 and a diode 314 connected to the base of a transistor 316 of the lamp and photocell cut off circuit 170. This signal causes transistor 316 to preferably be reverse biased for the width of the zone change enable code pulse signal provided via path 150 which cuts off transistor 316 for this interval. The cutting off of transistor 316 preferably removes a positive potential which has been present on path 296 which is connected to the collector of transistor 316 thereby unlatching whichever relay coils in the disc control circuits 184 through 194 had previously been energized and, accordingly, returning the closed contacts to their normally open position thereby disconnecting the associated previously energized light source 58 through 62 from its power source and previously energized photocell 64 through 74 from the circuit.

If desired, the operation of code swing relay 156 may be superseded and manually controlled by closing normally open switch contact 258*a* of mixer control switch 258 thus opening normally closed contact 258*b* ganged thereto. In this manner, the unlatch pulse received via path 259 which is produced from the changing of, by way of example, 1 of 10 type font faces, will turn off the previously excited SCR-photo cell-lamp combination, in the manner previously described above, by interrupting current flow in path 296, without latching relay 156 as this latching path is now open due to the opening of contact 258*b.* In this condition, the zone change enable code will preferably be followed by receipt of a manually provided disc selection code via one of paths 350*a* through 350*f* to provide one of the selection codes D1 through D6, preferably from, in this mannual operation, a 24 position manual rotary switch, to be described in greater detail hereinafter with reference to FIG. 15, having positions corresponding to each of the 10 type font faces, in the above example.

Referring now primarily to FIG. 6A as well as to FIG. 6B, the index positioning circuitry 160 and bidirectional stepping and sensing network 172, both generally referred to by the reference numeral 196 in FIGS. 1 and 5, shall now be described in greater detail. Referring initially to FIG. 6B, band or zone sensing network 178 preferably comprises a switch preferably mounted on the bidirectional rotary solenoid 176 to sense both the present position of the platform 100 as well as to sense when a preselected position has been reached. As shown and preferred, by way of example, this switch is preferably a six pole, three throw eighteen position switch comprising two portions designated 178*a* and 178*b* which are utilized with portion 178*a* providing information corresponding to the present position of the platform 100 via paths 208*a* through 208*d*, labeled 1′ sense, 2′ sense, 3′ sense, and 4′ sense, respectively, to direction circuit 200, and with portion 178*b* providing a signal indicative of the preselected desired position via paths 206*a* through 206*d* to gating network 204, the path being labeled respectively 1° sense, 2° sense, 3° sense and 4° sense. Portion 178*a* which provides an indication of the present position of the platform 100 and, hence, the present position of the lamp-photocell arrangement with respect to the band or zone capable of being sensed thereby, to direction circuit 200 via paths 208*a* through 208*d*, as shown and preferred will have a positive potential, such as 20 volts, on the contact of the switch corresponding to the present position 1′ sense through 4′ sense so as to complete a circuit path from this source of positive potential to the appropriate path 208*a* through 208*d*. In the example shown in FIG. *6b*, the platform 100 is at the innermost band (band 54 in FIG. 4) as indicated by the connection between the source of positive potential and path 208*d*. In the example given, path 208*a* corresponds to band 26 of FIG. 4, path 208*b* corresponds to band 28 of FIG. 4, path 208*c* corresponds to band 52 of FIG. 4, and, as previously mentioned, path 208*d* corresponds to band 54 of FIG. 4. Thus, this positive potential is supplied to the appropriate sensing mechanism in direction circuit 200, as will be described in greater detail hereinafter. As previously mentioned, since it is preferred to optimize the movement of the platform 100 to obtain the appropriate selected band on the appropriate disc to be optically read, whenever the present position of the platform 100 is indicated as being the innermost band, which is the 4′ sense position indicated by path 208*d*, than the platform 100 should preferably be moved out to reach any of the other bands to be subsequently optically read; whereas if the present position of the platform 100 is at the outermost band, indicated by the 1′ sense position, corresponding to path 208*a*, then platform 100 should preferably be moved in to reach any of the subsequent bands or zone on the disc to be optically read. Similarly, if the present position of the platform 100 is indicated as being at band 52 which corresponds to the 3′ sense position for path 208*c* and the next band to be sensed or optically read is band 26 corresponding to path 208*a*, then platform 100 would have to preferably be moved in the outward direction. Thus, as will be described in greater detail hereinafter, the present position of the platform 100 as indicated by switch portion 178*a* preferably determines which direction, IN or OUT, the direction circuit 200 will move or drive the platform 100.

As was previously mentioned, all of the photocells 64 through 74 and lamps 58 through 62 and their associated lenses 76 through 86 are mounted in common on platform 100 so as to be simultaneously moved therewith with each of the photocells and associated lens and light sources all preferably being optically aligned along the same optical axis so that they each access the same corresponding band on the respective discs 40 through 50 at a given index location of the platform 100. Thus, for example, if the platform 100 is located so that photocell 64 and light source 58 and the corresponding lens 76 are aligned with the outermost band 26 of the disc 40 so as to optically read this band, each of the photocell and lamp arrangements is simultaneously optically aligned with the outermost band 26 of the corresponding disc 42 through 50 associated therewith. Similarly, if the platform 100 is indexed so as to align the photocell-lens-lamp arrangement 64-76-58 associated with disc 40 with band 52, by way of example, of the associated disc 40, then each of the photocell-lamp-lens arrangements will correspondingly be aligned with band 52 of their respective associated discs 42 through 50. Thus, it is to be understood that when the specification and claims talk about indexing or movement of platform 100 it is in effect talking of aligning the corresponding photocell-lens-lamp arrangements with the respective band on the associated disc to be read.

Referring now to FIG. 6A, for example, if the present position of the platform 100 is such that the photocell-lens-lamp arrangements are optically aligned with the innermost band 54 of the discs 40 through 50, indicated by the 4′ sense position with this potential being provided via path 208*d*, the positive potential is supplied via path 208*d* to the base of a transistor 400 of flip-flop network 402, causing transistor 400 to be cut off which, in flip-flop network 402, correspondingly allows another transistor 404 to be saturated or turned on as in any conventional flip-flop. When transistor 404 is saturated, the potential present at its collector causes transistor 406 whose base is connected thereto to be cut off. As shown and preferred, this condition of flip-flop 402 also allows another transistor 410 to be able to go into saturation while its emitter is positive, transistors 406 and 410 preferably representing two AND gates having a common input at a junction point 412 where there emitters are coupled. When the index drive 202 is activated, it preferably will supply a predetermined pulse train going from ground to predetermined positive potential value to point 412. Since, as described above in the example given, the base of transistor 410 was low, transistor 410 will conduct allowing the pulse train present at point 412, which will be provided in the manner to be described in greater detail hereinafter, to pass through transistor 410, through a resistor 414 connected to the collector output of transistor 410, to the base of another transistor 416. Whenever the pulse train applied to the base of transistor 416 is positive, transistor 416 saturates thereby placing a ground potential at point 418 for the duration of the on time of the positive pulse. As shown and preferred, the index drive circuit 202 preferably includes a pair of Darlington power amplifiers 420 and 422, such as a conventional LMD 5 Darlington power amplifier manufactured by Ledex Inc. These Darlington current amplifiers 420 and 422 are connected, respectively, to the IN winding 424 and OUT winding 426 of the bidirectional rotary solenoid stepping device 176. When point 418 is at ground potential, this preferably causes a ground potential to be present at point 428 thereby allowing the positive potential supplied thereto to conduct through the OUT winding 426, through Darlington current amplifier 422 to ground causing a rotary motion of, preferably, 20 degrees per step in the OUT direction of rotary solenoid 176 which is used to index platform 100 in predetermined linear steps, such as ¼ inch steps depending on the desired band spacing of the disc, to the desired band, the rotary-to-linear conversion being accomplished in conventional fashion as previously described with reference to FIG. 8 with respect to the bevel gearing and rack-and-pinion arrangement for moving platform 100. This movement will continue until the desired band is reached, as will be described in greater detail hereinafter, the above discussion being primarily directed to the operation of the direction circuit 200.

If for example, the present position of the platform 100 is with the lamp-photocell-lens arrangements aligned with the outermost band 26 of the discs 40 through 50, inclusive, which is indicated as the 1' sense position associated with path 208*a,* transistor 404 of flip-flop 402 will be cut off, causing transistor 400 to be saturated, as in any conventional flip-flop, due to the positive potential being provided via path 208*a* to the base of transistor 404. Since transistor 400 is cut off, this will allow transistor 406 to conduct when a pulse train from index drive circuit 202, supplied from a conventional multivibrator 440 to be described in greater detail hereinafter, is present at point 412. Transistor 406 will pass this pulse train through resistor 442 connected to the collector output thereof to the base of another transistor 444 of index drive circuit 202 which, as was previously described with reference to transistor 416, will preferably saturate during the intervals when this pulse train present at point 412 is positive. When transistor 444 saturates, this will preferably cause point 446 to go to ground potential which, in turn, will cause a ground potential to be present at point 450 thereby allowing the positive potential supplied thereto to conduct through the IN winding 424, through the current amplifier 420, to ground causing a rotary motion, preferably, of 20° per step in the IN direction of rotary solenoid 176 to index platform 100 in predetermined linear steps until the desired band or zone is reached, as will be described in greater detail hereinafter. A conventional power supply for the rotary solenoid 176 is indicated by reference numeral 452 in FIG. 6A which includes the power supply for the Darlington current amplifiers 420 and 422 as well as the Power supply for the motor or rotary solenoid 176, and will not be described in greater detail hereinafter since it is preferably conventional.

Now considering, by way of example, when the platform 100 is at a present position corresponding to the alignment of the photocell-lamp-lens arrangements with band 28, indicated as the 2' sense position corresponding to band 208*b,* a predetermined positive potential is supplied to the base of a transistor 460 via path 208*b,* with transistor 460 forming one transistor of a flip-flop transistor pair 462, with the other transistor being transistor 464. This positive potential at the base of transistor 460 causes transistor 460 to saturate thereby making transistor 464 cut off in conventional flip-flop fashion. Because of the condition of transistors 460 and 464, point 466 is at a positive potential whereby point 468 is at ground potential. In this condition, if a positive input appears via path 158 as an input code from path 158*a,* corresponding to a Z1 code, this signal will preferably pass through resistor 470 connected to this input lead, then through a diode 472 connected in parallel thereto, through path 474 and 208*d* to the base of transistor 400 causing transistor 400 to cut off and, in turn, thereby causing transistor 404 to conduct, with the signal being subsequently processed for this condition as previously discussed above with respect to this condition of flip-flop 402 causing OUT coil 426 to be energized. If instead, with the platform 100 in this position, a positive input were received at path 158*c* corresponding to index position code Z3, it would pass through a resistor 476 connected in parallel to this input path, then through diode 478 connected in parallel thereto, thereby placing a positive potential at the base of transistor 404 via path 480 and 208*a* causing transistor 404 to cut off, which, in turn, thereby causes transistor 400 to saturate and the signal is subsequently processed as previously described above for this condition of flip-flop 402 causes IN coil 424 to be energized. Similarly, if instead a positive input were received on path 158*d* assigned to the presence of a Z4 next positioning input code, the signal would pass through resistor 482 connected in parallel to this input lead, then through diode 484 connected in parallel therethrough, through paths 480 and 208*a* with the base of transistor 404 causing it to cut off which, in turn, causes transistor 400 to saturate. The signal is processed as described above for this condition of flip-flop 402 causing IN coil 424 to be energized.

Lastly, considering, by way of example, the condition when the present position of the platform 100 is with the photocell-lamplens arrangement optically aligned with band 52, indicated by the 3' sense position corresponding to path 208*c* in FIG. 6*b,* a predetermined positive potential preferably present at the base of transistor 464 provided via path 208*c,* such as a 20 volt potential illustrated by way of example in FIG. 6B, causes transistor 464 to saturate which, in turn, causes transistor 460 of flip-flop 462 to cut off. Because of this condition of flip-flop 462, point 468 is at a positive potential whereby point 466 is at ground potential. In this condition, if a positive input appears on path 158*a,* it will pass through resistor 490 connected in parallel to path 158*a,* through diode 492, through path 474 and 208*d* to the base of transistor 400 causing transistor 400 to cut off which, in turn, causes transistor 404 to saturate, and the signal is processed as previously described above with respect to this condition of flip-flop 402 causing OUT coil 426 to be energized. If instead, a positive input were received via path 158*b,* corresponding to the Z2 index positioning input code, this signal would pass through resistor 498 connected in parallel to input path 158*b,* then through diode 500, and through paths 474 and 208*d* to the base of transistor 400 causing transistor 400 to cut off and transistor 404 to saturating creating the same condition as mentioned above with respect to the presence of a positive potential on path 158*a,* thereby causing OUT coil 126 to be energized. On the other hand, if a positive input were received at path 158*d* corresponding to the input indexing code Z4, this signal would be passed through resistor 502 connected in parallel to this input path, then through diode 504 and through paths 480 and 208*a* to the base of transistor 404 causing transistor 404 to cut off which, in turn, causes transistor 400 to saturate with the signal being processed as previously described above with respect to this condition of flip-flop 402 causing the IN coil 424 to be energized.

Now that the structure and operation of the direction circuit 200 in conjunction with the index drive circuit 202 has been described, the structure and operation of the band index memory 198 and gating circuit 204 in conjunction with the index drive 202 shall be described. As also shown and preferred in FIG. 6A, the zone or band selection code input signals provided via paths 158*a* through 158*d* are each preferably connected in parallel to respective conventional flip-flops 510, 512, 514, and 516, respectively, which preferably comprise the band index memory 198. These flip-flops are conventional and will not be described in greater detail hereinafter; however, for purposes of explanation of the system of the present invention, the appropriate portions shall be described where applicable. When a positive signal is present on any one of the zone selection code input paths 158*a* through 158*d,* this signal sets the associated flip-flop 510 through 516, respectively. For example, if a positive potential were present on path 158*a,* this signal would preferably flow through diode 518 connected thereto and resistor 520 connected in series therewith, to point 522. This positive potential at point 522 preferably accomplishes placing a positive potential at the collector of transistor 524 comprising one of the two transistors of the flip-flop network 510 which causes transistor 526 which is the other transistor of flip-flop network 510 to cut off which, in turn, causes transistor 524 to be saturated in conventional fashion. This is preferably the set position of flip-flop 510. In addition, the positive potential present at point 522 preferably causes a capacitor 528 connected thereto to charge and discharge through a diode 530 connected in series therewith and voltage divider network 532 to ground, thereby causing transistor 534 whose base is connected to network 532 to be cut off. This removes the $+V_1$ potential from a point 536 to which the base of transistor 526 is connected in parallel, thereby resetting all other flip-flops, 512 through 516 in the example given, by removing the positive potential $V_1$ from the voltage divider biasing networks for the respective transistors. When transistor 534 is cut off, this also provides a reset signal to a flip-flop 540 contained in the index drive circuit 202, to be described in greater detail hereinafter, by removing the bias potential from one transistor 542, via path 544, of the transistor pair 542–546 comprising flip-flop 540, which is preferably a conventional flip-flop. A positive potential present at point 522 preferably provides one input to a conventional two input AND gate 550 of band index gating network 20, with gate 550 preferably comprising transistor 552 and diode 554 connected to the collector thereof, with point 522 being connected to the emitter of transistor 552 via path 548. This makes the emitter of transistor 552 positive. The other input to AND gate, 550 is provided via path 206*a* to the base of transistor 552, as will be described in greater detail hereinafter, when the 1° sense position for outermost band 126, is sensed or reached by platform 100.

Preferably, as a result of the resetting of flip-flop 540 of index drive 202, transistor 542 saturates which, in turn, causes transistor 546 to be cut off. Because transistor 542 is saturated, diode 560, termed the tape clamping diode, which is preferably connected to a tape clamp point normally contained on board 28 of the conventional Alphatype model 5p, conducts causing the processing of further signal input to the typesetting machine (now shown) to be halted until the functions that are now being processed by the system of the present invention are completed. Because transistor 546 is cut off, the clamp voltage is removed from the freerunning multivibrator 440 via diode 562. Similarly, when diode 562 conducts, then free-running multivibrator 440 is turned off. Preferably, during the operation of free-running multivibrator 440, point 564 receives the previously described pulse train provided from multivibrator 440 which, is, in turn, supplied via path 566 to point 412 and passed through either transistor 406 or 410, as previously described, causing either the step-IN coil 424 or the step-OUT coil 426 to be energized.

For example, in the example given above with respect to a positive signal being present on path 158*a* providing a positive potential via path 548 to the emitter of transistor 522 of AND gate 550, the OUT coil 426 will be energized causing, preferably, by way of example, 20° steps of the rotary solenoid stepping device 176, this 20° rotation being conventionally translated, as previously mentioned, into predetermined linear incremental movement. The platform 100 will preferably step until the sensing mechanism 178*b* senses the presence of a predetermined impedance 570, such as a 47,000 ohm resistor, by way of example, at the preselected 1° sence position corresponding to path 206*a* and corresponding to the desired band 26, in the example given. This in turn provides an input to the base for transistor 552 via path 206*a* causing transistor 552 to saturate thereby putting a positive potential on line 572 through diode 554. This positive potential on line or path 572 preferably causes a capacitor 574 connected in series therewith which is, in turn, connected to the base of transistor 542, to charge and discharge to provide a positive spike at the base of transistor 542 causing it to cut off which, in turn, thereby causes transistor 546 to saturate. Preferably, when transistor 542 is cut off, the further processing of input signals is enabled. Since transistor 546 is now saturated and transistor 542 is now cut off, diode 562 conducts and free-running multivibrator 440 is turned off, thereby stopping the stepping operation. The balance of the circuitry in FIGS. 6A and 6B is conventional and will be readily understood by one of ordinary skill in the art and will not be described in greater detail hereinafter. Suffice it to say that, as was previously described with reference to FIG. 6B, if desired, manual control of disc selection may be provided through a rotary switch control network, which will be described in greater detail hereinafter with reference to FIG. 11, which, in addition to providing the disc selection codes via paths 350*a* through 350*f* (FIG. 6B) also preferably provides the zone or band selection codes via paths 580*a* through 580*d* for bands 26, 28, 52 and 54, respectively. In addition, it should be understood that preferably the structure and operation of flip-flop stages 512 through 516 of memory 198 and AND gating stages 551, 553, correspondingly respectively to the 2° sense, 3° sense and 4° sense positions of sensing device 178*b,* of gating network 204 are preferably identical with that previously described above with respect to flip-flop 510 and AND gate 550, by way of example.

Figure 7:
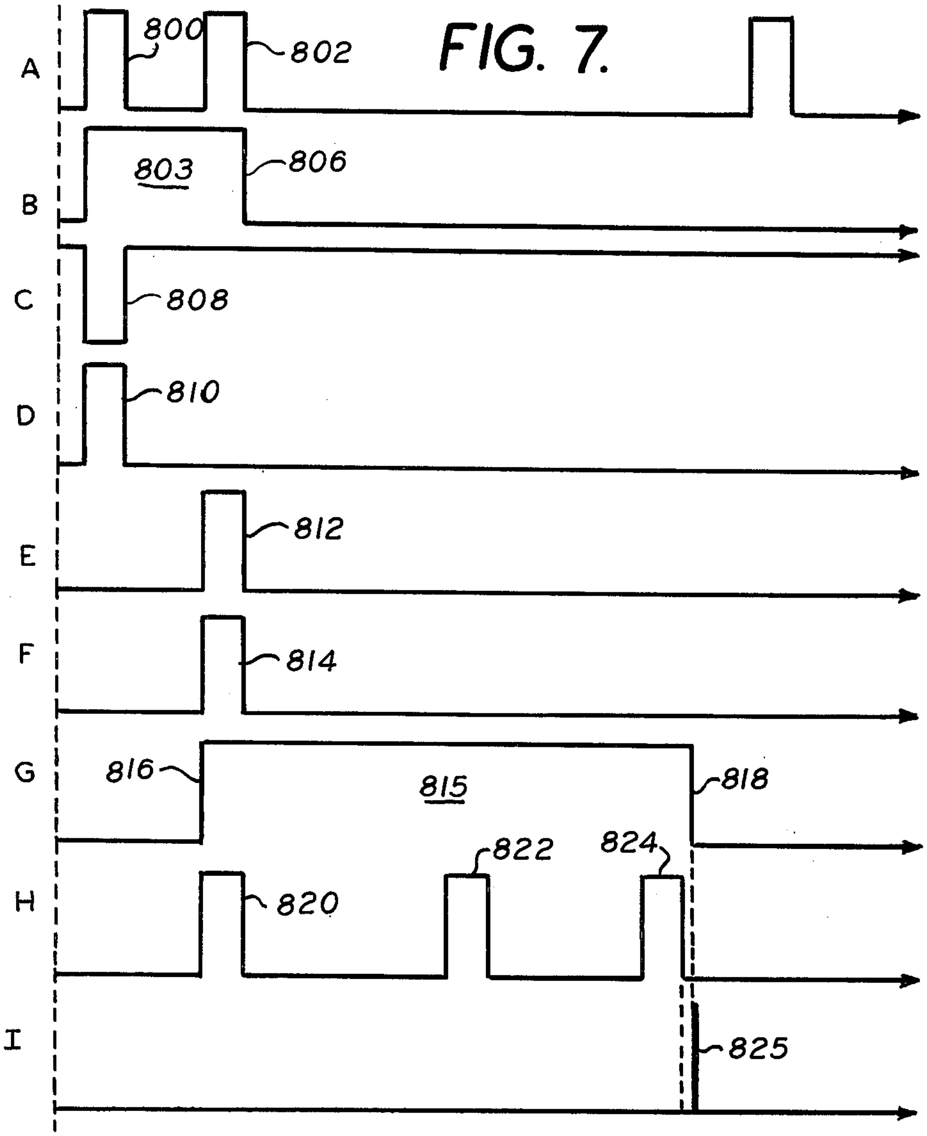
FIG. 7 is a timing diagram illustrative of the operation of the system of FIG. 1.

Referring now to FIG. 7, a timing diagram illustrative of the timing of the various signals present in the preferred lateral spacing control circuitry previously described with reference to FIGS. 6A and 6B is shown by way of example. Graph A of FIG. 7 illustrates the disc or zone change enable code associated clock pulse provided via path 154, illustratively shown as pulse 800 with the disc selection code associated clock pulse, which is illustrated by pulse 802 occuring a predetermined delay time after the occurrence of the zone change enable code clock pulse 800, such as approximately 100 miliseconds thereafter. As graphically illustrated in graph B of FIG. 7, the zone prime latch signal 803 occurs between the leading edge of the zone change enable code pulse 800 and the trailing edge of the disc selection code clock pulse 802 at transistor 278 of FIG. 6B. Preferably, the zone prime latching occurs at point 804 in the signal of graph B and the unlatching of relay 156 occurs at point 806 in the signal illustrated in graph B of FIG. 7. Graph C of FIG. 7 illustrates the photocell and lamp cut off signal present on path 296 of FIG. 6B. Graph D of FIG. 7 illustrates the actual zone change enable code pulse signal present on path 150 as opposed to the associated clock pulse 800 which is utilized to cause the occurrence of the zone prime latch signal 803 of graph B and the photocell-lamp cut off signal 808 of graph C, this signal being indicated by reference numeral 810. Graph E of FIG. 7 illustrates, by way of example, actual codes that are swung by relay 156, with graph E illustrating a typical indexing code which is swung from the Alphatype set width identity bits to accomplish platform indexing and illustrates the associated clock pulse 812 thereof. Graph F illustrates a typical disc selection input code which is swung from the Alphatype codes for the letters A through F for photocell and lamp selection, as indicates by the reference numeral 814 and which may include the SS bit enabling the half disc mode. Graph G of FIG. 7 preferably illustrates the clamping function provided by diode clamp 560, and, as illustrated in FIG. 7, graph G of pulse 815, at the leading edge of the platform indexing pulse 812 indicated by point 816, flip-flop 540 is set, clamping any further input signals from entering and placing the Alphatype, if that is the device utilized with the present invention, in the halt condition until the indexed platform 100 has reached its preselected appropriate position, after which the further processing of codes is enabled as indicated at point 818, by way of example. Normally, as indicated by graph H of FIG. 7, which illustratively shows the stepping pulse 820, 822 and 824 shown by way of example, which cause the rotation of the rotary solenoid 176 and, hence, the linear incremental movement of the platform 100, when the platform 100 is in its final position, that is the predetermined position, and this position is sensed as previously described with reference to switch portion 178*b*, pulse 824, by way of example, being the last stepping pulse required to place the platform 100 in this position. Graph I of FIG. 7 represents the pulse 825 on line 572 (FIG. 6A) when the desired position is sensensed. This pulse 825 causes flip-flop 540 to change state, removing positive potential from diode 560 causing clamping signal 815 represented by graph G to go to zero as indicated at point 818. It should be noted that the zone change enable code, as previously mentioned, could be provided either from a computer from a magnetic tape or internally from a generator when one of the ten type font faces, by way of example, is changed and requires a different disc.

Referring now to FIG. 16, as was previously mentioned, the lateral spacing control provided from selection of the appropriate disc to be read can preferably be provided either in the full disc mode or the half disc mode dependent on the condition of the conventional half disc mode sensing circuitry (not shown) associated with the conventional Alphatype, by way of example, which control is the processing of the information being provided from the selected disc to process this information in the half disc mode in conventional fashion when the conventional half disc mode sensing circuitry is enabled and in the full disc mode when this sensing circuitry is not enabled. As was previously mentioned, the disc selection input code, such as graphically illustrated by Graph F of FIG. 7 may include the SS bit whose presence, when sensed by disc mode control network 4990, will automatically enable the half disc mode sensing circuitry of the conventional Alphatype, as will be described with reference to FIG. 16. The preferred disc mode control network 4990 is preferably connected to the collector of transistor 272 of flip-flop 274 (FIG. 6B), previously described with reference to the zone code prime and unprine network 182 shown in FIG. 6B, via path 5000, through a diode 5002 connected through a resistor 5004 to the base of a transistor 5006. The collector of transistor 5006 is preferably connected to a junction point 5008 which is at ground potential when transistor 5006 is saturated. When transistor 5006 is unsaturated, junction point 5008 is preferably no longer at ground potential and the condition of the "SS bit" flip-flop in the conventinal Alphatype serial-to-parallel convertor, whose outputs on Bd 28k are at points 5010 and 5012 which are, respectively, SS° and SS'. When flip-flop 274 (FIG. 6B) is set, transistor 5006 comes out of saturation, which, as previously mentioned, enables the sensing of the condition of the SS bit flip-flop. If the SS bit is present, in other words the SS bit flip-flop is set, the SS' output line at point 5012 will be high and the SS° output line at point 5010 will be at ground potential. Therfore, the associated clock pulse that is provided to point 5014 from Bd 28k will pass through resistor 5016, transistor 5018 of flip-flop 5020 will cut off and transistor 5022 will saturate passing a positive potential through diode 5024, which potential is provided to the conventinal half disc sense circuit of the conventional Alphatype (specifically to the SW terminal on BD 28k) to place the Alphatype in the half disc mode, the Alphatype remaining on the half disc mode until the next zone change enable code is processed in the manner described above, in which case flip-flop 274 will again be set. If the SS bit, on the other hand, is not present, in other words the SS bit flip-flop is not set, the SS° output line at point 5010 will be high and the SS' output line at point 5012 will be at ground potential. Therefore, the associated clock pulse that is provided to point 5014 will pass through resistor 5030 causing transistor 5022 to cut off and, accordingly transistor 5018 to saturate, thus preventing conduction through diode 5024 and the half disc sense circuit of the conventional Alphatype will not be enabled, the Alphatype, accordingly, being in the full disc mode.

"Alternative embodiment-manual control of disc selection"

Figure 11:
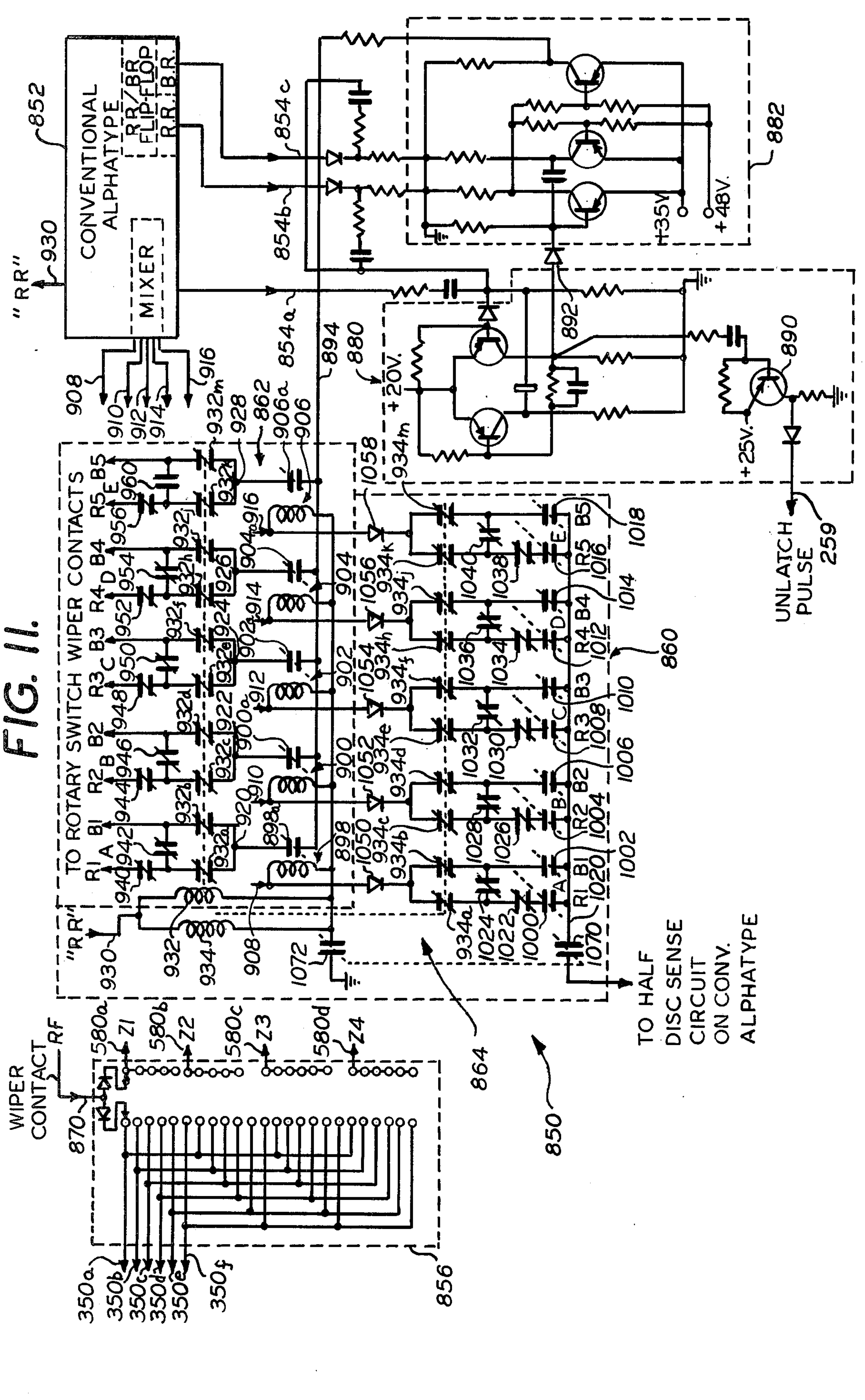
FIG. 11 is a schematic diagram of a preferred rotary switch control arrangement utilizable with the system of FIGS. 6A and 6B in the manual control mode.

Referring now to FIG. 11, a preferred embodiment of a rotary switch control network, generally referred to by the reference numeral 850, for providing manual control of lateral spacing, or disc selection is shown, the rotary switch control network 850 providing the disc selection signals via path 350*a* through 350*f*, as previously mentioned in the discussion of FIG. 6B, and the zone or band selection signals via path 580*a* through 580*d*, as previously mentioned in the discussion of FIG. 6A. Preferably, as will be described in greater detail hereinafter, the preferred rotary switch control netork 850 harnesses the code information provided from a conventional phototypesetting system, such as an Alphatype, to modify these signals so as to render them acceptable to the automatic lateral spacing control circuitry previously described with reference to FIGS. 6A and 6B. For purposes of explanation, the rotary switch control network 850 shall be described as being utilized with a conventional Alphatype which is the presently preferred utilization of the system previously described with reference to FIGS. 6A and 6B although, it would be readily understood to one of ordinary skill in the art, that any other type of code providing system could be utilized to accomplish lateral spacing control in accordance with the present invention.

As is well known, each font conventionally normally has two faces which are conventionally identified by the terms "red register" and "black register" in a conventinal Alphatype. The conventional Alphatype mixer, represented in FIG. 11 by block 852, such as for the Alphatype model 5p, conventionally provides pulse codes directing a specific type font change via path 854*a* which also receives the conventional Alphatype red and black register codes on paths 854*b* and 854*c*, respectively.

In general referring to the rotary switch conrol network 850 in FIG. 11, this arrangement preferably comprises the conventinal 10 rotary switches for the Alphatype, one of which is typically shown by reference numeral 856, each of which is preferably a 24 zone rotary switch capable of providing two output pulses, one corresponding to the zone or band to be selected provided via path 580*a* through 580*d* to the index positioning circuitry of FIGS. 6A and 6B, and the other output being the disc selection signal provided via any one of paths 350*a* through 350*f* to the disc selection control circuitry of FIGS. 6A and 6B. By way of example, rotary switch 856 is shown in the position for selecting the outermost band, band 26 or zone 1, on disc 1, or disc 40 in the example given. Of the ten rotary switches, there are five conventionally provided for the red register zone and five conventionally provided for the black register zone with a red register zone switch and a black register zone switch being provied for each type font, one for each face. By way of example, the Alphatype conventionally has five type fonts, normally labeled A through E in FIG. 11, although any other number of type fonts could be utilized with the system of the present invention. Thus, in the example shown, as previously mentioned, the five type fonts A through E provide ten faces, with each type font having two faces, one face being determined by the red register switch and the other face being determined by the black register switch. Furthermore, for purposes of explanation, the red register switch is conventionally comprises a three position swtich and a 24 positon switch for providing each of the 24 zones and for selecting full disc mode operation, half disc mode operation or a position termed black register which is preferably the position when the zone setting for the red register and black register switches for a given type font are identical. In this instance, as will be explained in greater detail hereinafter, the settings on the red register switch will be ignored and the settings on the black register switch for that type font will control the selection, as will be described in greater detail hereinafter. Furthermore, the black register zone switch preferably conventionally comprises a two position switch and a 24 position switch containing each of the 24 zones and selecting between the full disc mode and the half disc mode operation. As was previously mentioned, in the example of 24 zones, this refers to the full disc mode operation and, accordingly, in the half disc mode operation, as previously described, 48 disc sizes or zones can be provided.

As shown in FIG. 11, the rotary switch control network 850 preferably includes the conventional rotary switches, such as switch 856, as was previously mentioned, and a relay network 860 to be described in greater detail hereinafter. The relay network 860, enables the conventional rotary swiches, such as switch 855 to operate in conjunction with the index positioning and disc selection control circuitry previously described with reference to FIGS. 6A and 6B. As shown and preferred in FIG. 11, relay network 860 includes a portion 862 which enables the selection of up to 24 different zone combinations for ten different faces if desired as well as another portion 864 which enables the selection of the half disc mode for each of the ten faces for providing up to 48 different sizes for each of the ten faces. As previously mentioned, switch 856 represents one of the typical conventional rotary switches, and by way of example, represents the R1 switch which relates to the red register for type font A in the example given, with R1 representing the wiper contact 870 of this switch. Similarly, R2, R3, R4 and R5, respectively, represent Wiper contacts to the red register switches of fonts B, C, D and E, respectively and B1, B2, B3, B4 and B5 represents the wiper contacts for type fonts A through E, respectively, for the black register associated with each of these type fonts. The balance of the conventional rotary switches, which are preferably identical in structure and operation with the rotary switch 856 have been omitted for purposes of clarity.

As was previously mentioned, each of the red register switches R1 through R5, preferably includes a three position switch having one position for half mode disc selection, a second position for full disc mode selection, which is the mode illustrated by way of example in FIG. 11 and a third position which is set when the red register and black register zones to be selected are the same for that given type font. In addition to the relay network 860 to be described in greater detail hereinafter, a conventional single-slot 880 is provided and a conventional clock generator 882 is also provided coupled to the output of the single-shot 880. The structure and operation of the single- shot 880 and the clock pulse generator 882 is conventional and will not be described in greater detail hereinafter except for particular emphasis as it applies to the operation of the rotary switch control network 850. The single-shot 880 may preferably receive one of three inputs in order to provide an unlatch signal via path 259 to switch 258 and therefrom to diode 314 through transistor 316, as previously described with reference to FIG. 6B in the discussion of the manual control mode. These inputs may preferably be the conventional pulse associated with a specific font change code provided via path 854*a* or the positive pulse provided by the red register flip-flop via path 854*b* or the black register flip-flop via path 854*a* in the conventional Alphatype when there is a shift from the red to the black register or vice versa. This positive potential provided via path 854*a*, 854*b* or 854*c* causes the single-shot 880 to provide a positive pulse at the leading edge of the input pulse to the single- shot 880 which is provided from the mixer circuit via path 854*a* from the red or black register flip-flops 854*b* and 854*c* to cause the saturation of transistor 890 and the provision of the unlatch pulse via path 259. When the single-shot 880 turns off, the positive pulse is provided through diode 892 to the conventional clock pulse generator 882 which preferably causes the generation of a clock pulse via path 894 which clock pulse, as will be described in greater detail hereinafter, passes through whichever of the singles contact relays 898 to 906, respectively, of portion 862, has been energized. Thus, the single-slot 880 preferably provides both a delay in the provision of the clock pulse via path 894 to enable whichever of the appropriate relays of network 860 are to be energized to close as well as providing an unlatch pulse via path 259 to the disc selection control circuitry as was previously described.

Preferably, the single relay contact relays 898 through 906, are selectively energized upon receipt of a positive potential from the conventional Alphatype mixer contained in the Alphatype 852 which is normally utilized to light the indicators conventionally provided in the alphatype corresponding to the type font A through E, in the example given, which has been selected, these positive potentials being selectively provided via paths 908 through 916, respectively, from the Alphatype mixer. When the appropriate single contact relay 898 to 906 is selectively energized, this relay will close its normally open contact 898*a* through 906*a*, respectively, to pass the clock pulse provided via path 894 through to the respective associated junction point 920 through 928. When a positive potential from the Alphatype 852 is normally utilized for red register selection is received via path 930 from the Alphatype 852, this will energize relay coils 932 and 934. Relay coil 932 has ganged contacts 932*a* through 932*m,* with contacts 932*a,* 932*c,* 932*e,* 932*h* and 932*k* preferably being normally open and contacts 932*b,* 932*f,* 932*j* and 932*m* being normally closed, the respective positions between normally closed and normally open, being reversed when relay coil 932 is energized along with the gang relay contact being respectively connected in pairs in junction points 920 through 928, 932*a*-932*b* being connected to junction point 920, 932*c*-932*d* being connected to junction point 922, 932*e*-932*f* being connected to junction to 924, 932*h*-932*j* being connected to junction point 926 and 932*k*-932*m* being connected to junction point 928. In addition, switch contacts 940 and 942 of type font A representing clock register selection position for the red register switch which normally has contact 940 closed and contact 942 open when the red register and black register are different and contact 942 being closed and contact 940 being open when the red register and black register zone selections are the same, in which instance, as previously mentioned, the setting on the black register selection switch determines the zone. Similarly, type fonts B through E preferably have switch contents 944–946, 948–950, 952–955, and 956–958 for the black register position on the red register switch with the normally open and normally closed positions preferably being controlled in the same manner as previously mentioned with respect to type font A.

"Half disc mode selection"

Referring once again to FIG. 11, the operation of the rotary switch control network 850 when the half disc mode, previously described above, has been selected shall be described. As previously mentioned, each of the red register and black register switches R1 through R5 and B1 through B5 preferably each has a half disc mode position, this half disc mode position on each of the switches being represented in FIG. 11 by normally open contact 1000 for switch R1, 1002 for switch B1, 1004 for switch R2, 1006 for switch B2, 1008 for switch R3, 1010 for switch B3, 1002 for switch R4, 1014 for switch B4, 1016 for switch R5 and 1018 for switch B5, with switch contents 1000 and 1002, 1004 and 1006, 1008 and 1010, 1012 and 1014, and 1016 and 1018 being connected in parallel to the half disc sense common line 1020 which preferably is connected to the half disc sence circuit of the conventional Alphatype. As with respect to switch contact pairs 940–942, 944–946, 948–950, 952–954, 956–960, which are associated with the red register switches for type fonts A through E, respectively, for selecting the associated black register with setting when the red register and black register zones are the same for a given type font, there are provided ganged switch contact pairs 1022–1024, 1026–1028, 1030–1032, 1034–1036, and 1038–1040 for type fonts A through E, respectively, in relay network portion 864, with contacts 1022, 1026, 1030, 1034, and 1038 being normally closed and switch contacts 1024, 1028, 1032, 1036, and 1040 being normally open. As was discussed with reference to switch contact pairs 940–942 Through 956–960, respectively, with respect to relay network portion 862, the normally closed position of switch contacts 1022, 1026 1030, 1034 and 1038 represents the full disc mode position of the red register selector switch for the respective type fonts A through E, with switch contacts 1024, 1028, 1032, 1038 and 1040 being closed and switch contacts 1022, 1026, 1030, 1034, and 1038 ganged thereto being opened when the red register selector switch for the respective type fonts A through E is placed in the black register position, the position of these switches being as shown in FIG. 11 for both the half disc and the full disc mode as long as the red register zone selection for a given type font differs from the black register zone selection so that the red register switch is not in the black register position. In addition, each of the selector switch pairs for respective type fonts in relay network portion 862 are mechanically ganged, preferably, to the associated black register selection position switch contact pair relay network 864 so that contacts 940–942 are mechanically ganged to contacts 1022–1024, contacts 944–946 are mechanically ganged to contacts 1026–1028, contacts 948–950 are mechanically ganged to contacts 1030–1032, contacts 952–954 are mechanically ganged to contacts 1034–1036 and contacts 956–950 are mechanically ganged to contacts 1038–1040. In addition, relay coil 934 which is preferably energized upon receipt of the positive potential from the Alphatype normally utilized for red register selection (RR) via path 930, has ganged relay contacts 934*a* through 934*m,* with relay contacts 934*b,* 934*d,* 934*f,* 934*j* and 934*m* being normally closed in the unlatched position of relay 934 and relay contacts 934*a,* 934*c,* 934*e,* 934*h* and 934*k* being normally open in this unlatched position, with the states or positions of these contacts being reversed in the latched or energized position of relay 934. The input via path 908 to single contact relay 898 is connected in parallel to relay contacts 934*a*-934*b* through diode 1050, the input via path 910 to single contact relay 900 is connected in parallel to relay contacts 934*c*-934*d* through diode 1052, the input via path 912 to single contact relay 902 is connected in parallel to relay contact 934*e*-934*f* through diode 1054, the input via path 914 to single contact relay 904 is connected in parallel to relay contacts 934*h*-934*j* through diode 1056, and the input via path 916 to single contact relay 906 is connected in parallel to relay contacts 934*k*-934*m* through diode 1058. Thus, as shown and preferred in FIG. 11, the same potential which energizes the associated single contact relay 898, 900, 902, 904, or 906 goes through the associated diode 1050 through 1058, respectively, through the junction point between the associated relay contact pairs 934*a*-932*b* through 934*k*-934*m,* respectively. Thus, if the red register and black register selector switches for each of the type fonts are in the full disc mode, switch contacts 1000 through 1018, respectively, are all opened and and no path is completed to the half disc sense circuit of the conventional Alphatype via path 1020 and the operation is as previously described above with respect to the full disc mode operation of relay portion 862.

If, by way of example, the red register selector switch for type font A is in the half disc mode, then contact 1000 will be closed. Assuming that the red register and black register selector switches for type font A are different, switch contacts 940 and 1022 will be as shown in FIG. 11 which is normally closed, and switch contacts 942 and 1024 will be normally open. Thus, when the positive potential from the conventional Alphatype which is normally utilized for the red register selection is provided via path 930, relay coils 932 and 934 are energized thus closing relay contacts 932*a* and 934*a*, respectively, for type font A and opening relay contacts 932*b* and 932*b* for type font A, with a similar change of state occurring for the other ganged relay contacts for relays 932 and 934, respectively. Accordingly, when the positive potential from the Alphatype mixer normally used to light the indicator corresponding to type font A, in the example given, is received via path 908, it will selectively energize single contact relay 898 by closing relay contact 898*a*. Preferably, at the same time, this positive potential will pass through diode 1050, then through now closed contact 934*a*, through normally closed contact 1022, then through now closed contact 1000 to point R1 on path 1020 and, assuming the system is in the manual control state, wherein switch contacts 1070 and 1072 will be closed, through now closed contact 1070 to the conventional half disc sense circuitry in the conventional Alphatype which will place the conventional Alphatype in the half disc sensing mode in conventional fashion thereafter. Thus, when the clock pulse is received via path 894, it will go through closed contact 898*a* to junction point 920, then through now closed contact 932*a* and through normally closed contact 940 to the R1 red register wiper contact 870, with the conventional Alphatype circuitry processing the output of this switch in the half disc sensing mode in conventional fashion thereafter. As previously mentioned, once the proper rotary switch, in this example the R1 rotary switch is enabled, it provides the appropriate disc selection input signal via any one of paths 350*a* through 350*f* which has been preset manually, and zone or band selection signal via any one of paths 580*a* through 580*d* which has also preferably been preset manually, to the circuitry of FIGS. 6A and 6B and therefrom to the conventional Alphatype sensing circuitry where it is processed in the half disc mode in conventional fashion thereafter.

Similarly, if instead the black register, for example B1, were in the half disc mode, relays 932 and 934 would not be energized and their contacts would in the state shown in FIG. 11, and, utilizing type font A by way of example, half disc mode selector 1002 would be closed. Thus, in this instance, when the positive potential from the conventional Alphatype mixer normally utilized to light the indicator corresponding to type font A, by way of example, is received via path 908, in the black register condition, single contact relay 898 would be energized and contact 898*a* closed. Preferably, at the same time, the potential which energizes relay 898 will pass through diode 1050, through normally closed contact 934*b*, and through now closed switch contact 1002 to the B1 contact position on path 1020 and therefrom through now closed switch 1070, the system is in the assuming manual control state, to the conventional half disc sensing circuitry in the conventional Alphatype which will place it in the half disc sensing mode in conventional fashion thereafter. Preferably, at the same time, when a clock pulse isprovided via path 894, it will flow through now closed contact 898*a*, through normally closed contact 932*b* to the wiper contact of the black register selector switch B1 of type font A in this example. Similarly, this information will be provided to the disc selection control circuitry of FIGS. 6A and 6B through one of the paths 350*a* through 350*f* and to the manually preselected appropriate band or zone index positioning circuitry via one of the paths 580*a* through 580*d*, with this information being subsequently processed in conventional fashion in the half disc mode by the conventional Alphatype circuitry.

Lastly, if in the example given for type font A, the red register selector and the black register selector are the same, then normally closed contacts 940 and 1022 are opened with normally opened contacts 942 and 1024 closed. In this condition, in the half disc mode, the potential provided through diode 1050 through either contact 934*a* or 934*b* depending on whether the red register selection signal via path 930 is received to energize relays 932 and 934, will be directed through switch contact 1002 in both instances with relay contacts 934*a* and 934*b* now being connected in parallel to switch contact 1002. Similarly, in this instance, relay contacts 932*a* and 932*b* will be connected in parallel to the wiper contact of the B1 black register rotary selector switch of type font A, in the example given. The balance of the operation with respect to type font A will preferably be as previously described above with respect to the full disc mode and half disc mode. Similarly, the operation of the relays and switches associated with type fonts B through E, respectively, is preferably identical with that previously described by way of example with reference to type font A and will not be described in greater detail hereinafter except to say that any of the above described arrangements could be independently established for each of the type fonts A through E for any given desired set of conditions. Thus, once the proper rotary switch R1 through R5 and B1 through B5, respectively, is enabled through relay control network 850 by providing a signal to its associated wiper contact, the associated rotary switch will provide the appropriate preset disc selection input signal via one of paths 350*a* through 350*f* and the appropriate preset zone or band selection signal to the index positioning circuitry via one of paths 580*a* through 580*d* of FIGS. 6A and 6B with the operation thereafter being preferably as described above with respect to the automatic programmble or computer controlled operation of the lateral spacing control network 106.

"Programmable Line Feed"

The construction and operation of the preferred system 20 of the present invention has been described above with respect to the preferred system for controlling lateral spacing in a given line on the surface of the drum 22. The balance of the description will now primarily be directed to the preferred improved system for controlling line feed with respect to the surface of the drum 22 by control of the carriage advance drive mechanism 128 and bidirectional motor 1302 through the preferred line feed control circuit 1100. Normally, in a conventional phototypesetting machine, such as an Alphatype manufactured by Alphatype/Filmotype of Skokie, Illinois the line feed of the drum 22 is preset for a given job by means of rotary switches which are then accessed in response to codes provided from the magnetic tape input from the Alphatype recorder through conventional processing circuitry, such as the type illustrated in FIG. 13 which is a schematic drawing of Board 26 of the conventional line or paragraph feed counter of the conventional Alphatype model 4p or 5p, with all designations thereon being the conventional designations used in the conventional Alphatype schematic, except where otherwise indicated. Thus, the conventional phototypesetting device, such as the Alphatype, is preset for a given job and may not readily be changed during the job, such as through control of a computer.

Figure 12A:
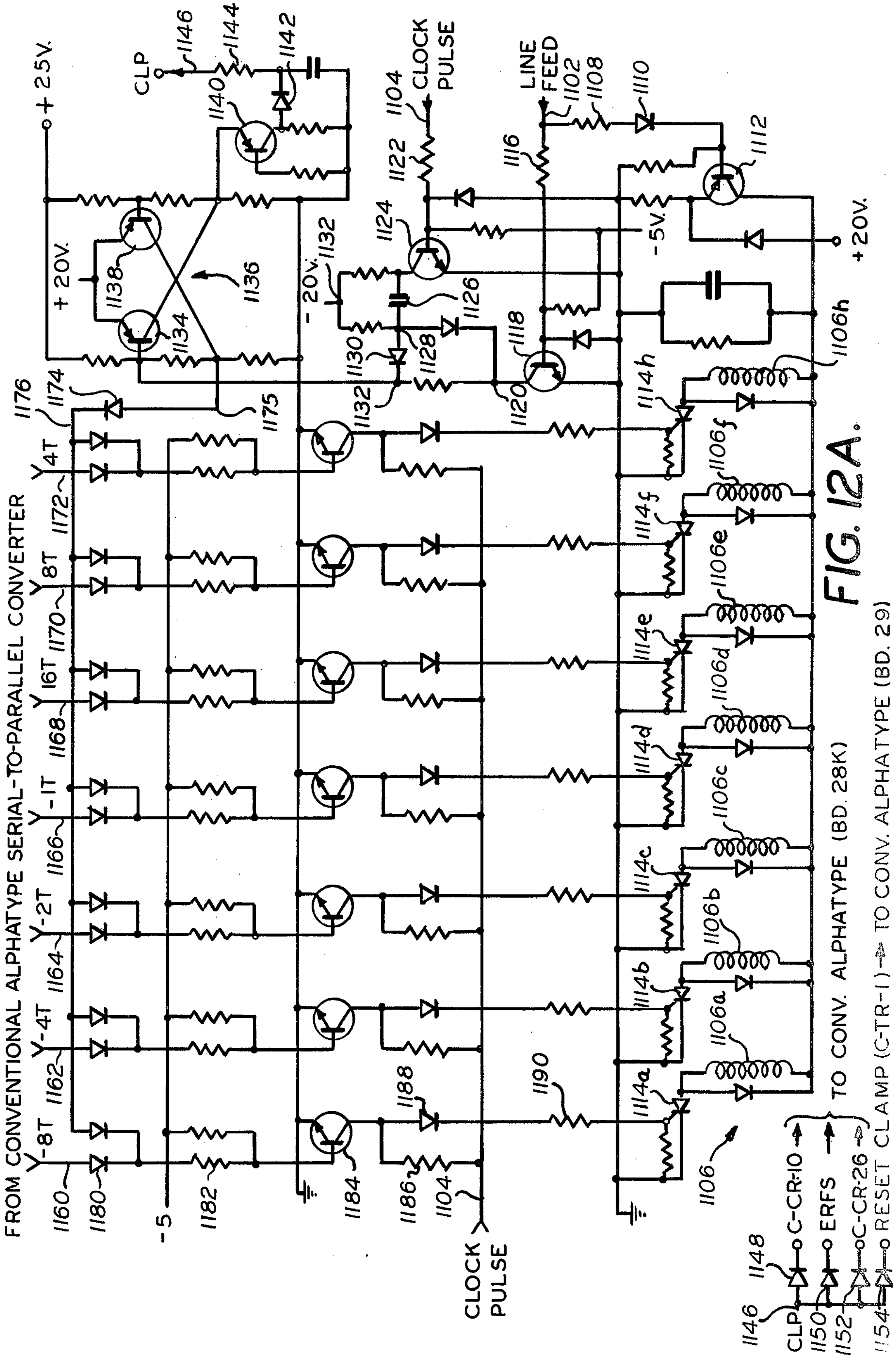
FIGS. 12A and 12B comprise a schematic diagram of a preferred programmable line feed control circuit utilizable with a conventional line feed counter of the type shown in FIG. 13 for controlling the line feed of the system illustrated in FIG. 8.
Figure 12B:
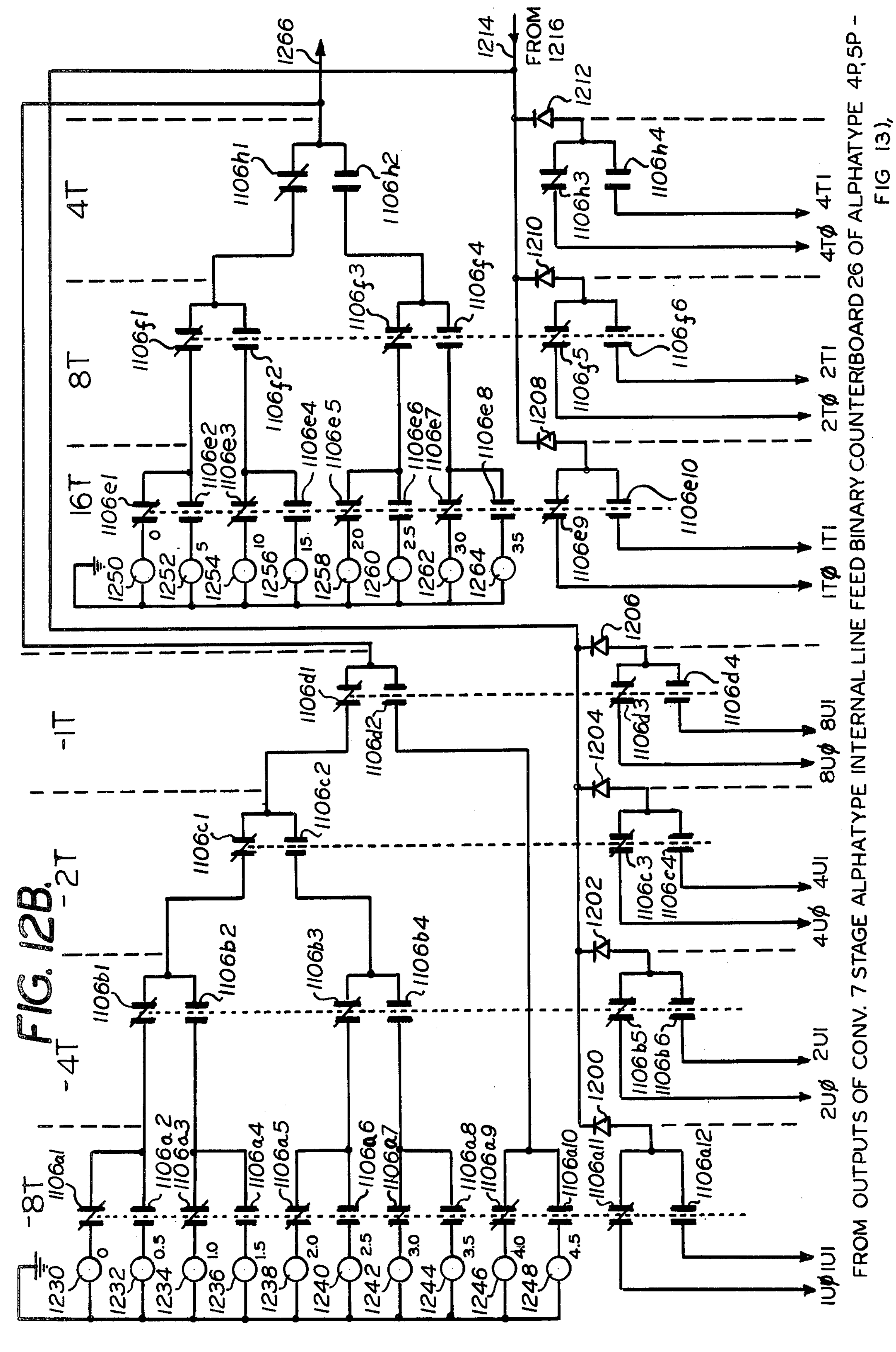
Figure 13A:
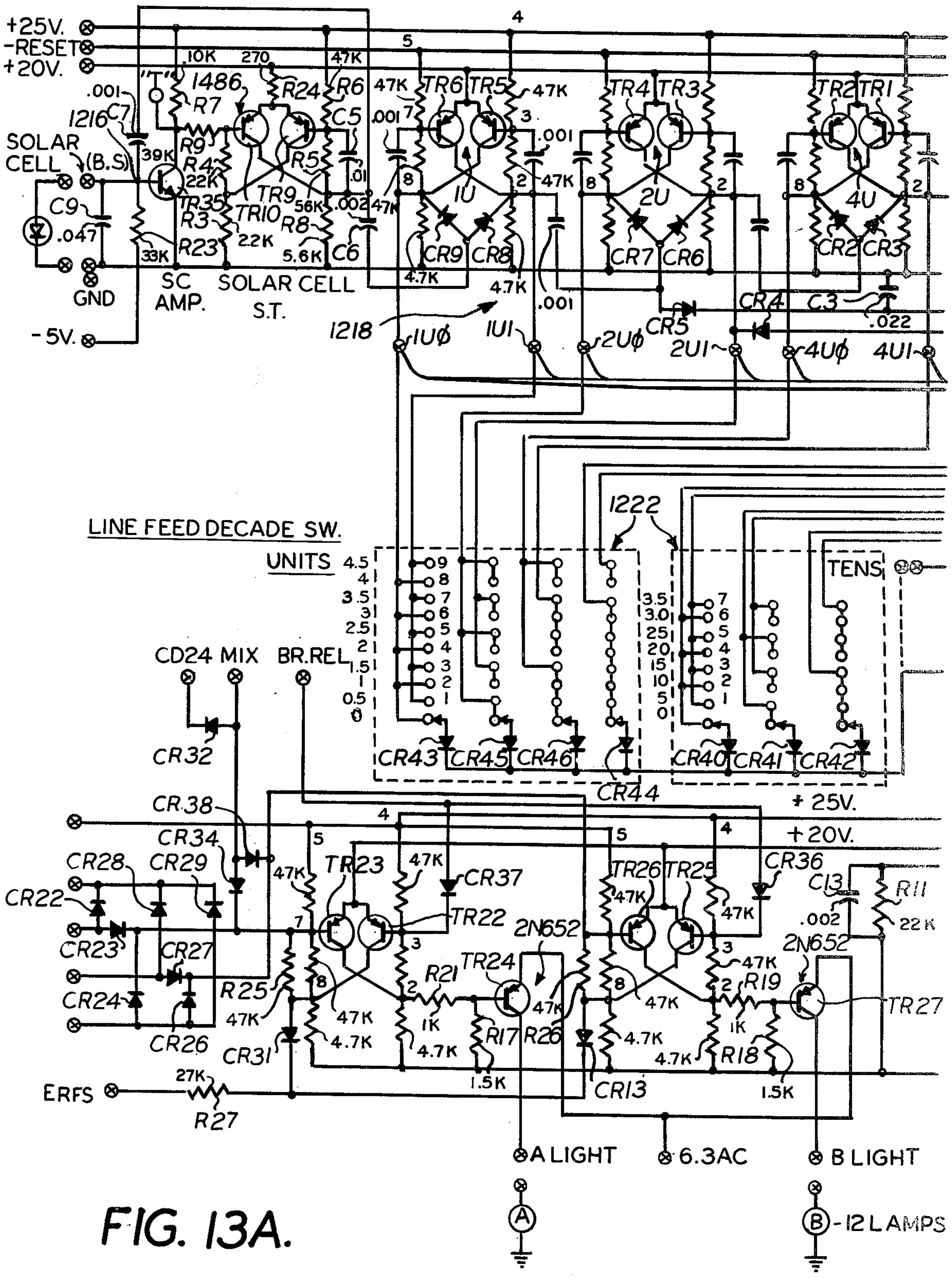
FIGS. 13A and 13B when taken together as FIG. 13 is a schematic diagram partially in block of a typical conventional line feed counter.
Figure 13B:
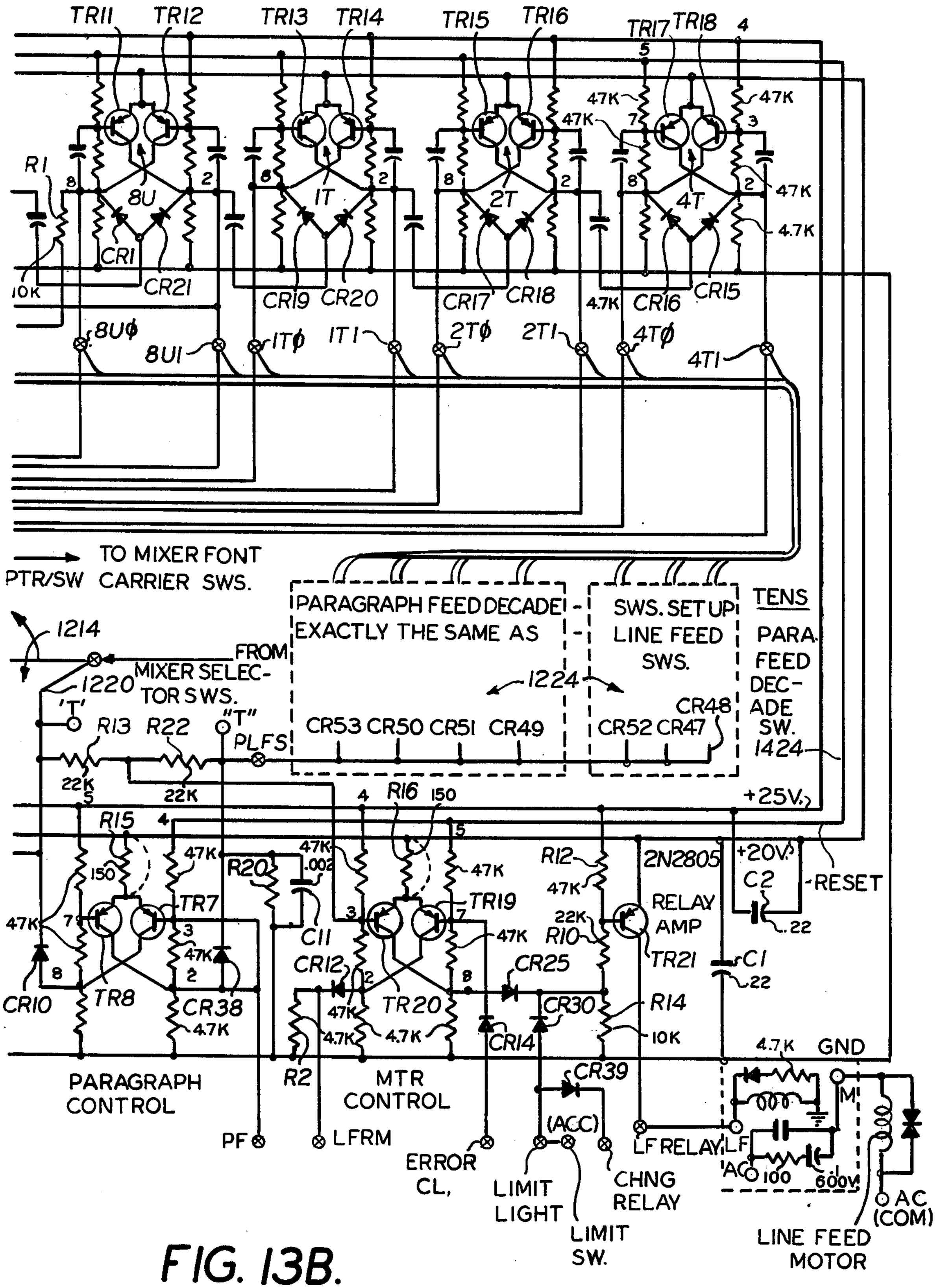

Referring now to FIGS. 12A, 12B and FIG. 13, the preferred system for enabling the programmability of such line feed will now be described. The conventional line feed enable code from either a computer interface or from a conventional Alphatype magnetic tape is preferably provided to point 1102 (FIG. 12A) with its associated clock pulse being provided to point 1104. This line feed enable code pulse provided at point 1102 is a positive pulse which preferably has two functions in the network illustrated in FIG. 12A. One such function is the interrupting of current flow through relay network 1106 which, as will be described in greater detail hereinafter, determines which stages of the conventional Alphatype seven stage binary counter (FIG. 13) are to be sensed, as would normally be accomplished by a conventional rotary switch connection to these stages. The other condition, as will be described in greater detail, is to clamp whatever function that normally would occur in the Alphatype phototypesetting system and enable the sensing of the condition of the conventional Alphatype seven stage binary counter 1218, by way of example, which is illustrated in FIG. 13, for the Alphatype model 5p. With respect to the first mentioned function of the line feed enable code positive pulse, this signal is preferably provided through a resistor 1108 and a diode 1110 to the base of a transistor 1112 causing this transistor to cut off for the duration of the input pulse present at point 1104 which is equal in duration to the line feed code enable pulse present at point 1102, thereby interrupting current flow through relay network 1106, which preferably comprises relay coils ***1106a*, *1106b*, *1106c*, *1106d*, *1106e*, *1106f* and *1106h*, one relay preferably being provided for each stage of the conventional seven stage Alphatype binary counter 128. As will be described in greater detail hereinafter, this interruption of current flow through relays *1106a* through *1106h* will result in the unlatching of whichever of these relays has previously been latched. As shown and preferred in FIG. 12A each of the relay coils *1106a* through *1106h* is respectively connected to an SCR *1114a* through *1114h*, respectively, which, as will be described in greater detail hereinafter, when gated causes the latching of relay coils *1106a* through *1106h*, respectively, of relay network 1106 and, consequently, when cut off, causes the unlatching of whichever of these relay coils *1106a* through *1106h***, respectively, have previously been latched.

With respect to the second mentioned function of the line feed enable code pulse, this positive pulse provided at point 1102 is provided in parallel, through a resistor 1116, to the base of another transistor 1118, causing this transistor 1118 to saturate which, in turn, as shown and preferred, places ground potential at point 1120 in the circuit of FIG. 12A. The associated clock pulse for the line feed enable code provided at point 1104, at the same time, flows through resistor 1122 to the base of another transistor 1124 which, similarly, causes this transistor 1124 to saturate. A capacitor 1126 is preferably connected to the collector of transistor 1124 and is preferably discharged when transistor 1124 saturates, thereby removing any positive potential present on point 1128 and, consequently, removing any positive potential through diode 1130 that was previously present at point 1132, thereby causing point 1132 to go to ground potential. Point 1132 is preferably connected to the collector of a transistor 1134 of a conventional flip-flop 1136 which also includes another transistor 1138. When point 1132 goes to near ground potential, this causes transistor 1134 to saturate which, in turn, conventionally causes transistor 1138 of flip-flop 1136 to cut off. With transistor 1134 of flip-flop 1136 saturated, another transistor 1140, whose emitter is connected in parallel to the collector of transistor 1134 and to the base of transistor 1138, is allowed to saturate, thereby placing a positive potential across diode 1142 connected to the collector of transistor 1140, which positive potential is subsequently supplied through a resistor 1144 to point 1146 which, as shown and preferredin FIG. 12A, thereby supplies a positive DC level potential which is utilized to clamp whatever functions, to be enumerated hereinafter, that normally would occur in the Alphatype phototypesetting. This clamp signal at point 1146 is supplied in parallel to diodes 1148, 1150, 1152 and 1154 with, for example, diode 1148 being connected to the conventional Alphatype circuit which controls "split-shift" to prevent its occurrence, diode 1150 being connected to the conventional Alphatype circuit which controls "lamp flashing" to prevent its occurrence, diode 1152 being connected to the conventional Alphatype circuit which controls "error condition" in the Alphatype so as to simulate this condition, and diode 1154 being preferably connected, by way of example, to the conventional Alphatype circuit which controls "reset" to prevent its occurrence. As was previously mentioned, and as will be described in greater detail hereinafter, the particular relay combination of relays *1106a* through *1106h* which is activated determines which stages of the conventional Alphatype seven stage binary counter 1218 (FIG. 13) are to be sensed as with the conventional Alphatype prior art rotary switch connections to these stages (FIG. 13).

In the preferred improved system of FIG. 12A, the Alphatype bits which are utilized to control the operation of relays *1106a* through *1106h*, respectively, are preferably the conventional Alphatype bits labeled −8, −4, −2, '1, 16, 8, and 4, these binary bits being obtained convnetionally from the conventional Alphatype serial-to-parallel converter such as provided on board *20k* (not shown) of the conventional Alphatype model 4p or 5p which contains ten flip-flops, one output of which goes low when the flip-flop set the other output of which goes high. As shown and preferred in FIGS. 12A and 12B, the preferred network which is preferably connected to these flip-flop four bits −8, −4, −2, −1, 16, 8 and 4 at points 1160, 1162, 1164, 1166, 1168, 1170 and 1172, respectively, preferably senses the low output condition of the respective seven flip-flops of the conventional Alphatype serial-to-parallel converter associated with these bits in the set state thereof. This sensing is preferably normally ignored since transistor 1138 of flip-flop 1136 is preferably normally saturated thereby placing a positive potential through a diode 1174 on line 1176 connected to the collector of transistor 1138. As previously mentioned, the line feed enable code and its associated clock pulse provided at points 1102 and 1104, respectively, cause transistor 1134 to saturate and transistor 1138 to cut off thereby removing the positive potential on line 1176. This enables the sensing of the above described conditions of the seven flip-flops associated with the bits −8, −4, −2, −1, 16, 8 and 4, such as provided from board 20*k* of the conventional Alphatype, to provide 127 possible combinations. During conventional or normal operation of the Alphatype, in which 78 possible combinations are available, 63 combinations being available from bits SS, 16, 8, 2, 1 and 15 combinations being available from bits −8, −4, −2, −1, the serial-to-parallel convertor of board 20*k*, after the ten flip-flops associated therewith are set or reset, generates a clock pulse output. This clock pulse output is a clock pulse that is normally associated with any code provided in the conventional Alphatype. This associated clock pulse, as previously mentioned, is provided at point 1104 in the circuit of FIG. 12A. Before describing in greater detail the preferred programmable line feed operation of the improved circuit of FIGS. 12A and 12B, it should be noted that preferably the processing of the conventional Alphatype bits −8, −4, −2, −1, 16, 8 and 4 for use as an indication of the selected line feed quantity and, as will be described in greater detail hereinafter, the use of the conventional Alphatype 2 bit to be used for providing a reverse feed mode, is auxiliary to the normal processing of this information in the conventional Alphatype and does not in any way interfere with this normal processing. Thus, the circuit of FIGS. 12A and 12B is auxiliary to the normal Alphatype processing circuitry and, because of the previously described clamp signal provided at point 1146, these normal functions can be ignored.

By way of example, it is assumed that it is desired to program a half point (0.5) line feed, the operation with respect to different value points of line feed being preferably identical with the various combinations required being evident from the illustrative example of FIG. 12B and a subsequently described relay truth table pertaining thereto. If the network of FIG. 12A were to sense that the −8 bit input provided via patch 1160 were low due to the −8 flip-flop in the conventional Alphatype serial-to-parallel convertor on board 20*k* (not shown), this would allow, through diode 1180 and resistor 1182 connected to the base if a transistor 1184, this transistor 1184 to cut off or come out of saturation. Thus, when a clock pulse is sensed at point 1104, it will flow through resistor 1186 and diode 1188 connected in parallel thereto the collector of now cut off transistor 1184, and, therefrom, through resistor 1190 to the gate of SCR 1114*a*, thereby allowing current flow from the collector of transistor 1112, through relay coil 1106*a* of relay network 1106, through SCR 1114*a* to ground thereby latching relay 1106*a*. Because of the preferred normaly biasing of transistor 1112, the collector will be at a predetermined positive potential, such as +20 volts in the example shown in FIG. 12A. The trailing edge of the clock pulse provided at point 1104 which is associated with the line feed quantity code pulse, also preferably causes transistor 1124 to cut off due to the positive potential normally provided at point 1192. As transistor 1124 cuts off, capacitor 1126 preferably charges, passing a positive potential through diode 1128 to place a positive potential at point 1132. This causes transistor 1134 of flip-flop 1136 to cut off and, thereby, causes transistor 1138 to saturate. Thus, when transistor 1138 has returned to this normally saturated condition, a positive potential is once again placed on line 1176 through diode 1174 and the condition of the flip-flops of the Alphatype serial-to-parallel converter provided via paths 1160 to 1172, respectively, is no longer sensed. In addition, the clamp signal previously provided to point 1146 is cut off thereby allowing the normal processing of codes by the conventional Alphatype in its normal typesetting process. Accordingly, the circuit of FIG. 12A provides a means of controlling which combination of the seven relays 1106*a* to 1106*h* of relay network 1106 will be utilized to sense both sides of the conventional flip-flops in the conventional seven stage binary counter 1218 of the Alphatype, by way of example, illustrated in FIG. 13 (FIGS. 13A and 13B taken together), through the conventional contacts of this binary counter illustrated in FIG. 12B, these contacts being conventionally numbered by Alphatype as 1Uφ, 1U1, 2Uφ, 2U1, 4Uφ, 4U1, 8Uφ, 8U1, 1Tφ, 1T1, 2Tφ, 2T1, 4Tφ and 4T1, with contacts 1Uφand 1U1 preferably, for the −8 flip-flop, 2Uφ and 2U1 for the −4 flip-flop, 4Uφ and 4U1 for the −2 flip-flop, 8Uφ and 8U1 for the −1 flip-flop, 1Tφ and 1T1 to the 16 flip-flop, 2Tφ and 2T1 for the 8 flip-flop and 4T0 and 4T1 for the 4 flip-flop, this controlled sensing being accomplished through associated diodes 1200, 1202, 1204, 1206, 1208, 1210, 1212, respectively, whose cathodes are respectively connected in parallel to point 1214, thereby sensing a predetermined condition of the seven stage binary counter 1218 of the conventional Alphatye which stops the line feed.

The conventional Alphatype circuitry line feed counter 1218 illustrated in FIG. 13, is "told" when to initiate line feed by a "-reset command signal". This command signal enables the line feed that has previously been programmed at the same time that the conventional seven stage Alphatype binary counter 1218 is reset. Thereafter, line feed occurs thereby feeding pulses into point 1216 (FIG. 13) in conventional fashion which, in turn, drives the conventional seven stage counter 1218 until the counter 1218 reaches the predetermined count that reflects a low potential at point 1214. This potential, when coupled to point 1220 (FIG. 13) causes the line feed to stop. The connection of point 1220 to point 1214 preferably disconnects the normally provided conventional rotary switch bank illustrated in FIG. 13 as well as the normal conventionally provided five additional rotary switch banks of the conventional Alphatype which are not illustrated in FIG. 13, so that sensing occurs solely through the circuitry of FIGS. 12A and 12B. Suitable means, if desired, can be utilized to enable sensing from both the conventional rotary switches provided in the conventional Alphatype and/or the arrangement illustrated in FIGS. 12A and 12B in any desired combination to provide both conventional manual control and the aforementioned programmable control with or without preference to one of the normally ten available type faces provided from the normally available five type fonts, by way of example, in the Alphatype. Normally, the conventional Alphatype is able to sense line feed for the ten normally available faces from one of six typical rotary switches, one such typical switch 1222 being shown by way of example in FIG. 13, or from another rotary switch bank 1224 being illustrated by way of example in FIG. 13. With the arrangement previously described with reference to FIGS. 12A and 12B, rotary switch bank 1224 can be sensed when the conventional Alphatype normally would conventionally sense it or this sensing can be ignored and only the programmable line feed provided with the arrangement of FIGS. 12A and 12B could be sensed. Furthermore, it should be noted that preferably the programmable line feed provided by the preferred arrangement of FIGS. 12A and 12B can be continuously varied throughout the job, if desired, whereas the conventional line feed provided by the rotary switch bank of the conventional Alphatype is fixed for the job unless the job is halted and the switches manually changed.

If desired, as shown and preferred in FIG. 12B, relays 1106*a* through 1106*h*, respectively, can be connected in various combinations to light displays, such as conventional light emitting diodes 1230 through 1264, respectively, or incandescent lamps to provide a visual display of the selected programmable line feed by these lamps 1230 through 1264, these lamps 1230 through 1264, respectively, being connected in common to a power source (not shown) through point 1266, with a positive potential provided at point 1266 going through whichever associated relay contacts are closed to apply a positive potential to the appropriate lamp display provided from the combination of lamps 1230 through 1264, with relay contacts 116*a*1 through 1106*a*12 being associated with relay coil 1106*a*, relay contacts 1106*b*1 through 1106*b*6 being associated with relay coil 1106*b*, relay contacts 1106*c*1 through 1106*c*4 being associated with relay coil 1106*c*, relay contacts 1106*d*1 through 1106*d*4 being associated with relay coil 1106*d*, relay contacts 1106*e*1 through 1106*e*10 being associated with relay coil 1106*e*, relay contacts 1106*f*1 through 1106*f*6 being associated with relay coil 1106*f* and relay contacts 1106*h*1 through 1106*h*4 being associated with relay coil 1106*h*. Each of the respective relay contacts associated with relay coils 1106*a* through 1106*h*, respectively, as shown and preferred, are ganged with relay contacts 1106*a*1, 1106*a*3, 1106*a*5, 1106*a*7, 1106*a*9 and 1106*a*11, being normally closed in the unlatched condition of relay 1106*a* and contacts 1106*a*2, 1106*a*4, 1106*a*6, 1106*a*8, 1106*a*10 and 1108*a*12 being normally open in the unlatched condition of relay 1106*a* with these conditions being reversed when relay 1106*a* is latched. As shown and preferred, relay contact 1106*a*11 being is connected to point 1U$\phi$ and relay contact 1106212 being connected to point 1U1. Similarly, contacts 1106*b*1, 1106*b*3, and 1106*b*5 of relay 1106*b*, are normally closed in the unlatched condition of relay 1106*b* and contacts 1106*b*2, 1106*b*4, 1106*b*6 are normally open in the unlatched condition of relay 1106*b* with these conditions being reversed when relay 1106*b* is latched. In addition, contact 1106*b*5 is preferably connected to point 2U$\phi$ and contact 1106*c*6 is connected to point 2U1. Similarly, contacts 1106*c*1 and 1106*c*3 of relay 1106*c* are normally closed in the unlatched condition of relay 1106*c* and contacts 1106*c*2 and 1106*c*4 are normally open in the unlatched condition of relay 1106*c* with these conditions being reversed when relay 1106*c* is latched. Contact 1106*c*3 is preferably connected to point 4U$\phi$ and contact 1106*c*4 is preferably connected to point 4U1. Similarly, with respect to relay 1106*d*, contacts 1106*d*1 and 1106*d*3 are normally closed and contacts 1106*d*2 and 1106*d*4 are normally open in the unlatched condition of relay 1106*d* with these conditions being reversed when relay 1106*d* is latched. Contact 1106*b*3 preferably is connected to point 8U$\phi$ and contact 1106*d*4 is preferably connected to point 8U1. Similarly, with respect to relay 1106*e*, contacts 1106*e*1, 1106*e*3, 1106*e*5, 1106*e*7, 1106*e*9 are normally closed and contacts 1106*e*2, 1106*e*4, 1106*e*6, 1106*e*8 and 1106*e*10 are normally open in the unlatched condition of relay 1106*e* with these conditions being reversed when relay 1106*e* is latched. Contact 1106*e*9 preferably is connected to point 1T$\phi$ and contact 1106*e*10 preferably is connected to point 1T1. Similarly, with respect to relay 1106*f*, contacts 1106*f*1, 1106*f*3 and 1106*f*5 are normally closed and contacts 1106*f*2, 1106*f*4, 1106*f*6 are normally open in the unlatched condition of relay 1106*f* with these conditions being reversed when relay 1106*f* is latched. Contact 1106*f*5 preferably is connected to point 4T$\phi$ and contact 1106*f*6 preferably is connected to point 2T1. Lastly, with respect to relay 1106*h*, contacts 1106*h*1 and 1106*h*3 are normally closed and contacts 1106*h*2, 1106*h*4 are normally open in the unlatched condition of relay 1106*h* with these conditions being reversed in the latched condition of relay 1106*h*. Contact 1106*h*3 preferably is connected to point 4T$\phi$ and contact 1106*h*4 preferably is connected to contact 4H1. Thus, as described above, after the line feed enable code has been received, the seven aforementioned conventional Alphatype binary bits provided from the serial-to-parallel converter of, by way of example, board 20*k* of the conventional Alphatype, are sensed to provide the programming of the line feed quantity which determines the spacing between the lines, which, by way of example, as shown and preferred in FIGS. 12A and 12B, can be anywhere between 0 and 39 $\frac{1}{2}$ points, with a point being conventionally defined as approximately 1/72 of an inch, in $\frac{1}{2}$ point increments. If desired, the conventional Alphatype circuit shown in FIG. 13, can readily be modified to count from 0 to 39 $\frac{3}{4}$ points in $\frac{1}{4}$ point increments. Furthermore, conventional mechanical modifications can readily be employed so that any unit of measurement, such as millimeters, can be utilized to provide the line feed quantity which may be programmed in accordance with the circuitry of FIGS. 12A and 12B, the appropriate flip-flop of the conventional serial-to-parallel convertor of the Alphatype, by way of example, which is low being sensed while the others are high, such as in the example previously given with respect to programming a half point line feed, which would be visually indicated by the lighting of lamp 1232 (FIG. 12B).

The operation of the relay network 1106 comprises relays 1106*a* through 1106*h* with the circuit of FIGS. 12A and 12B is preferably in accordance with the following truth table for providing the desired line feed quantity value between 0 and 39 $\frac{1}{2}$, with the presently illustrated arrangement of FIG. 13, where a 1 condition indicates the respective relay 1106*a* to1106*h* is latched and a 0 condition indicates that the respective relay 1106*a* through 1106*h* is unlatched. The counter stages on counter 1218 to which the relays 1106*a* through 1106*h* are connected are also included in the table. Line feed is shown in terms of points by way of example and any combination can be closed to obtain any value between 0 and 39 $\frac{1}{2}$ in accordance with the following truth table, by way of example.

TRUTH TABLE (FIG. 13)

| | BINARY BITS | | | |
|---|---|---|---|---|
| | −8 | −4 | −2 | −1 |
| Line | Counter Stage | | | |
| Feed | 1u | 2u | 4u | 8u |
| 4.5 | 1 | 0 | 0 | 1 |
| 4.0 | 0 | 0 | 0 | 1 |
| 3.5 | 1 | 1 | 1 | 0 |
| 3.0 | 0 | 1 | 1 | 0 |
| 2.5 | 1 | 0 | 1 | 0 |
| 2.0 | 0 | 0 | 1 | 0 |
| 1.5 | 1 | 1 | 0 | 0 |
| 1.0 | 0 | 1 | 0 | 0 |
| .5 | 1 | 0 | 0 | 0 |
| 0 | 0 | 0 | 0 | 0 |

FIG. 13

| | BINARY BITS | | |
|---|---|---|---|
| | 16 | 8 | 4 |
| Line | Counter Stage | | |
| Feed | 1t | 2t | 4t |
| 35 | 1 | 1 | 1 |
| 30 | 0 | 1 | 1 |
| 25 | 1 | 0 | 1 |
| 20 | 0 | 0 | 1 |
| 15 | 1 | 1 | 0 |
| 10 | 0 | 1 | 0 |
| 5 | 1 | 0 | 0 |
| 0 | 0 | 0 | 0 |

"REVERSIBLE LINE FEED"

Figure 14:
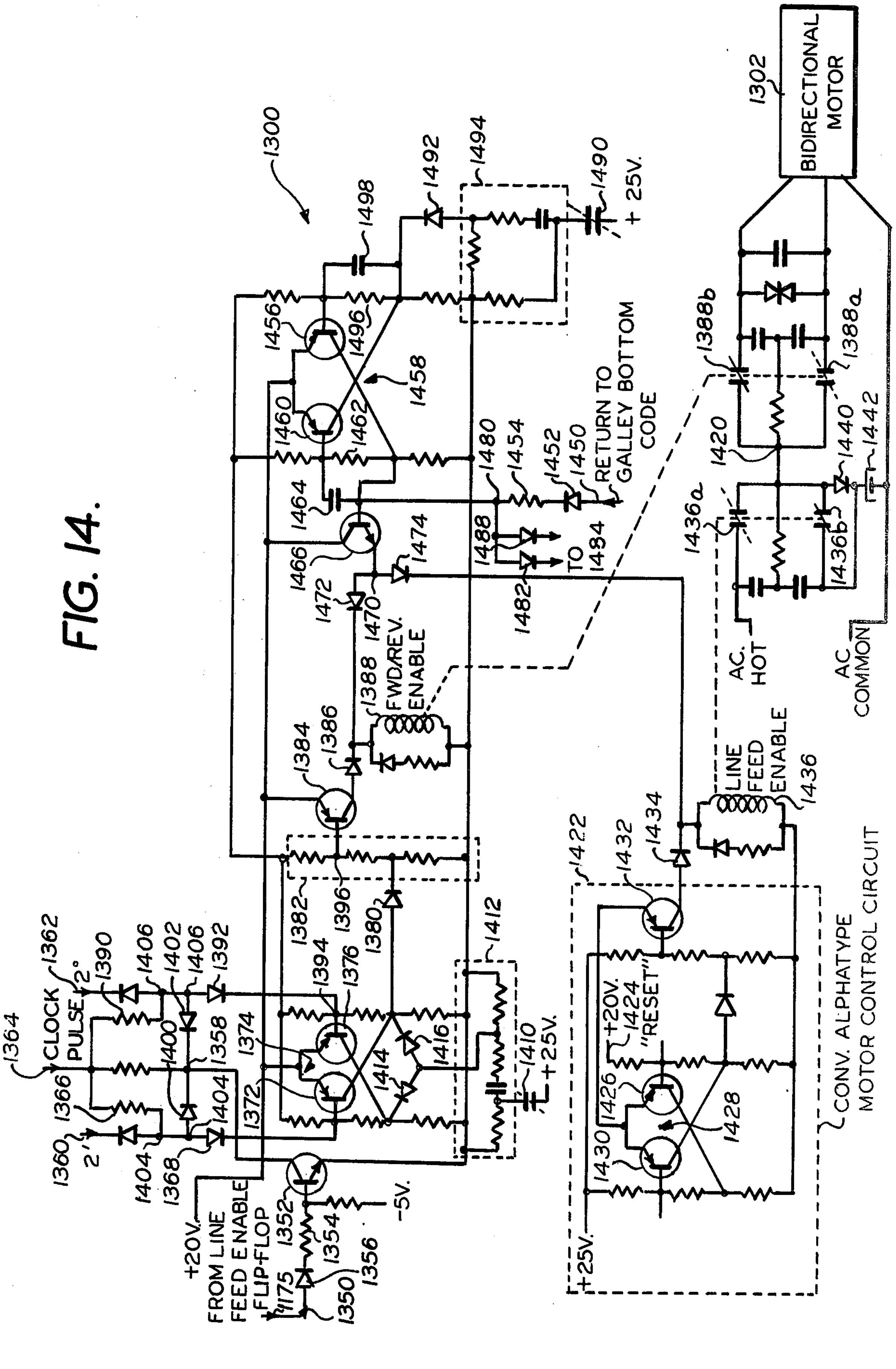
FIG. 14 is a schematic diagram of the preferred embodiment of a reversable line feed control circuit utilizable with the programmable line feed of FIG. 12 and the manual line feed of FIG. 13 for the phototype setting system arrangement illustrated in FIG. 8.

As was previously mentioned, preferably if the line feed quantity code provided from the magnetic tape or from the computer, includes the "2 bit", the preferred reversible line feed control circuit 1300 of FIG. 14 will be enabled, the 2 bit reverse code preferably being part of the line feed quantity code provided to the line feed control circuitry 1100 which controls the carriage advance drive mechanism 128. Accordingly, in the preferred system of the present invention shown in FIGS. 12A and 12B with respect to the programmable line feed quantity control circuit 1100, and with respect to FIG. 14 with respect to the reversible line feed control circuitry 1300 the line feed quantity may be programmably changed or not changed, as desired, while enabling the reverse mode operation of the carriage advance drive mechanism 128. Thus, the reversible line feed control circuit 1300 has been separately illustrated in block diagram in FIG. 8 for controlling bidirectional motor 1302 associated with the carriage advance drive mechanism 128.

Figure 15:
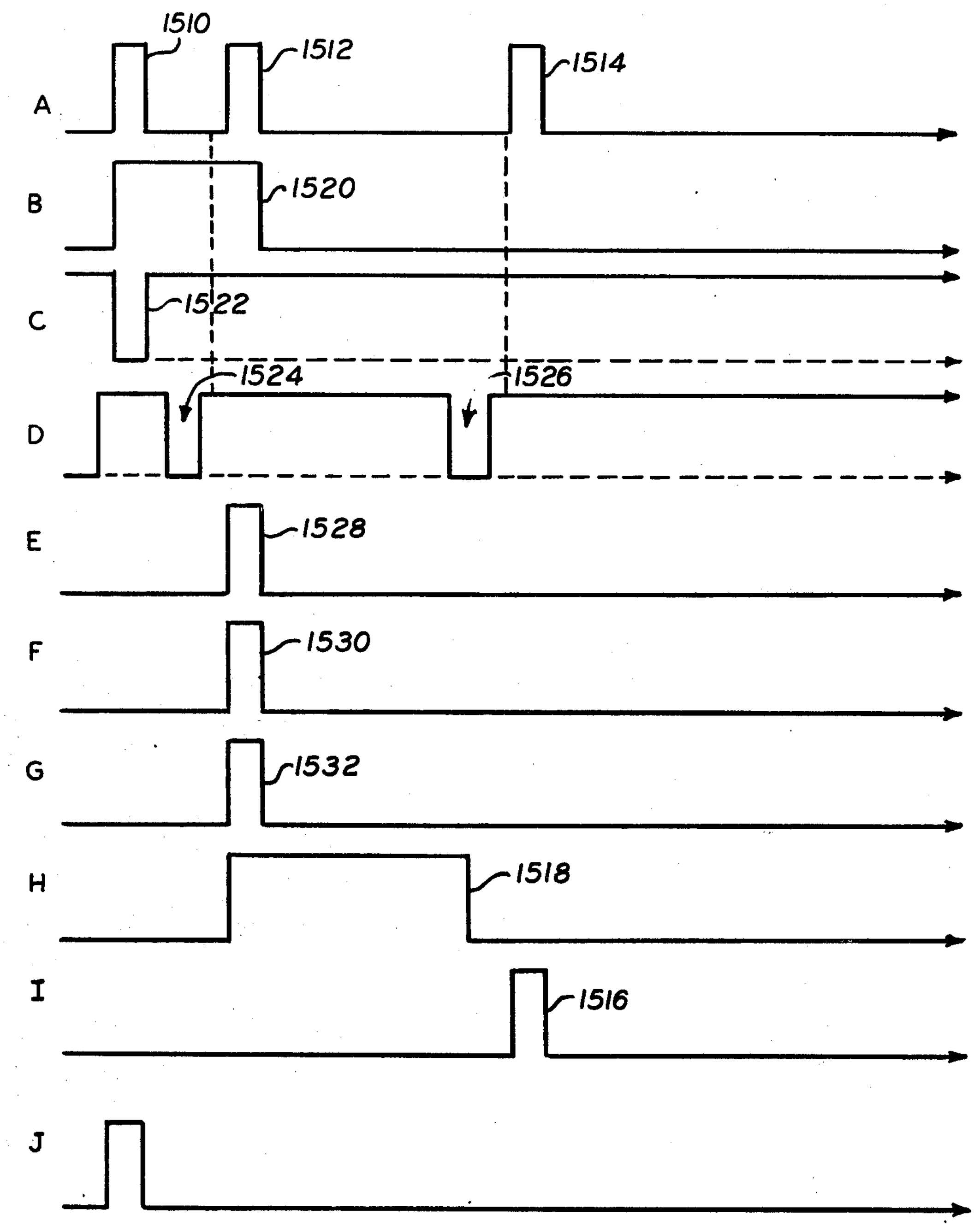
FIG. 15 is a timing diagram illustrative of the operation of the reversable line feed circuit illustrated in FIG. 14.

Referring now to FIGS. 14 and 15, the construction and operation of the reversible line feed control circuit 1300 shall be described in greater detail with reference to its operation, by way of example, in a phototypesetting system. Accordingly, a separate function preferably commands the reverse line feed until a predetermined position of the galley is sensed, this position usually being the bottom of the galley which is normally equivalent to the bottom of the cylinder or drum 22 although, if the bottom of the galley is not equivalent to the bottom of the cylinder or drum 22, this bottom of galley position can still be sensed by presetting the sensing mechanism for this position. Preferably, at the time that this predetermined position of the galley is sensed, the reversing stops and the system 1300 returns to the forward mode if previously in that mode at which time the line feed is now programmed for the desired quantity and/or direction in the manner previously described with reference to the operation of the circuit of FIGS. 12A and 12B. Preferably, the reverse line feed mode is accomplished in response to the line feed enable code being followed by the swung conventional Alphatype code 1A as illustrated in the timing diagram A and H of FIG. 15. It should be noted that preferably no other bits can be included with this Alphatype code 1A as this would preferably not be a desirable condition for the system. In the conventional Alphatype, line feed occurs as a result of reset. Another conventional function of reset is to cause the drum cylinder 22 to conventionally return to its right margin which represents the extreme right hand portion of the job being typeset, if this cylinder were not already at the right margin because of a previous reset or the starting of a job. If desired, a separate code can preferably be provided to prepare to provide interline advance in either direction, with appropriate processing of this code, without the return of the cylinder 22 to the right margin. Of course, the direction in amount of interline advance would be determined by the previous line feed enable code.

The line feed enable code provided through point 1175 (FIG. 12A) peferably removes the positive clamp from point 1350 which is connected to point 1175 thereby unsaturating a transistor 1352 whose base is connected through a resistor 1354 and a diode 1356 to point 1350. Transistor 1352 is preferably normally saturated when a positive clamp is present at point 1350 through diode 1356 and resistor 1354 to the base of transistor 1352. The collector of transistor 1352 is preferably connected to junction point 1358 which is at ground potential when transistor 1352 is saturated. When transistor 1352 is unsaturated, junction point 1358 is preferably no longer at ground potential and the condition of the 2 bit flip-flop in the conventional Alphatype serial-to-parallel converter, such as on board **20*k*, whose outputs are at points 1360 and 1362, which are, respectively, 2′ and 2°, with point 1360 connected to 2′ side of this flip-flop. Accordingly, preferably when the 2 bit stage on conventional Alphatype board 20*k* is set, in the example given, the 2° line at point 1362 is low and the 2′ line at point 1360 is high. Therefore, the associated clock pulse that is provided to point 1364 will pass through resistor 1366, then through diode 1368 to junction point 1370 connected to the base of a transistor 1372 of a conventional flip-flop 1374 whose other transistor is 1376. This will preferably cause transistor 1372 of flip-flop 1374 to cut off thereby conventionally causing transistor 1376 to saturate. When transistor 1372 is cut off, this will remove any positive potential that was previously passed through a diode 1380 to a voltage divider network 1382 whose resistor values are preferably chosen to forward bias another transistor 1384 whose base is connected to voltage divider network 1382. Thus, when transistor 1372 is cut off, transistor 1384 becomes saturated allowing diode 1386 connected to the collector thereof to preferably supply a positive potential to a forward/reverse enable relay coil 1388 to open normally closed contact 1388*a* and close normally open contact 1388*b* of this relay 1388 to preferably place bidirectional motor 1302 in the reverse mode. On the other hand, if the line feed enable code does not include the 2 bit, bit, point preferably 1360 would be low and point 1362 would be high thereby allowing the associated clock pulse provided to point 1364 to pass through resistor 1390, then through diode 1392 to junction point 1394 connected to the base of transistor 1376, thereby causing transistor 1394 to cut off. This, in turn, causes transistor 1372 to saturate causing a positive potential to pass through diode 1380 to the voltage divider network 1382 which, in turn, causes point 1396 to have a reverse bias potential for transistor 1384 whose base is connected thereto and, accordingly, thereby preferably cutting off transistor 1384. The cutting off of transistor 1384 preferably unlatches relay 1388 thereby placing contact 1388***a* in the normally open position and contact 1388*b* in the normally closed position, which will place the system 1300 and bidirectional motor 1302 in the forward line feed mode.

Preferably, the only time that the reversible line feed control circuit 1300 will sense the 2° and 2′ bit of the Alphatype 2 bit flip-flop which indicates the reverse line feed mode, is when junction point 1358 is not at ground potential. This condition, preferably, only occurs when the positive clamp is removed from point 1350. When this positive clamp is present at point 1350, as was previously mentioned, transistor 1352 is saturated, thereby applying gound potential to junction point 1358 and, through diodes 1400 and 1402, respectively, to junction points 1404 and 1406, respectively, thereby clamping all clock pulses occurring at point 1364 from passing through diodes 1368 or 1392, respectively, regardless of the state present at points 1360 and 1362.

If manual operation of the reversible line feed control circuit 1300 is desired, normally open switch 1410 may be closed which will then, preferably, pass a positive potential through network 1412, then through diodes 1414 and 1416 connected to flip-flop 1374, thereby causing transistors 1372 and 1376 to preferably switch to the opposite states from their previous condition, thereby enabling a manual latching and unlatching of the forward/reverse relay 1388. Relay contact 1388*b* shown in its normally closed condition, connects the forward winding of bidirectional motor 1302 to junction point 1420. When relay contact 1388*a*, shown in its normally open condition is closed when relay 1388 is latched, it connects the reverse winding of motor 1302 to junction point 1420.

In the conventional motor control circuitry, such as in the Alphatype, such as represented by motor control circuit 1422 in FIG. 14, the "-reset pulse" provided to point 1424 causes transistor 1426 of a conventional flip-flop 1428, whose other transistor is transistor 1430, to saturate which, conventionally, causes transistor 1430 to cut off. This, in turn, causes a normally cut off transistor 1432, whose emitter is tied to the emitters of transistors 1430 and 1426 and whose base is connected to the base of transistor 1430, to saturate, transistor 1432 normally being cut off. When transistor 1432 is saturated, it passes a positive potential through a diode 1434 connected to the collector thereof to energize a line feed enable relay 1436 which, in the conventional Alphatype, supplies AC hot to the conventional unidirectional motor used in the Alphatype. Diode 1434 preferably isolates transistor 1432 from the "return to the bottom of galley" control circuit 1438 to be described in greater detail hereinafter. As shown and preferred in FIG. 14, relay 1436 has associated contacts 1436*a* and 1436*b*, with relay contact 1436*a* being normally open and relay contact 1436*b* being nomally closed. Preferably, relay contact 1436*a* supplies AC hot to junction point 1420 allowing the bidirectional motor 1302 to run in either the forward or reverse direction depending on the position of relay contacts 1388*b* and 1388*a*. The AC at point 1420 is preferably rectified in conventional fashion by a diode 1440 charging a capacitor 1432. When the line feed has been completed, relay 1436 preferably unlatches causing contact 1436*a* to open and, accordingly, contact 1436*b* to close. This, in turn, shorts out diode 1440 which then connects the positive terminal of the now charged capacitor 1442 to point 1420 thereby allowing discharge of capacitor 1442 through either contacts 1388*b* or 1388*a* through the appropriate motor winding causing the immediate braking of bidirectional motor 1302 to. thus, preferably providing a dynamic braking for motor 1302. Thus, preferably, the dynamic braking potential capacitor 1442 is preferably only charged during line feed, this potential only being applied after a line feed to brake the motor 1302.

Now the "return to the bottom of the galley" control circuit 1438 shall be described with reference to FIG. 14. As previously mentioned above, the "return to galley bottom" code, provided to point 1450, preferably inititates line feed in the reverse direction until the bottom of the galley is sensed. This sensed position can be adjusted to any point along the axis of the galley, the axis of the galley preferably being identical with the axis of the drum of cylinder 22. The "return to galley bottom" code, which is preferably a positive clock pulse, is provided to point 1450 and passes through diode 1452 and resistor 1454 to the collector of a transistor 1456 of a conventional flip-flop 1458, whose other transistor is transistor 1460, causing the collector of transistor 1456 to be positive while the base of transistor 1460 is made positive because of an R-C network 1462–1464. This causes transistor 1460 to cut off which, in turn, conventionally causes transistor 1456 to saturate. This, in turn, causes another transistor 1466 whose base is connected to the collector of transistor 1456 to also saturate, thereby placing a positive potential at point 1470 connected to the emitter of transistor 1466. This positive potential at point 1470 passes through diode 1472 and diode 1474 which causes the latching of relays 1388 (if not previously latched) and 1436, respectively. As was previously described, diode 1434 isolates this latching potential provided through diode 1474 from transistor 1432. Similarly, diode 1386 isolates this latching potential provided through diode 1472 from transistor 1384. This preferably will initiate reverse line feed in the manner previously described above with referance to the reversible line feed control circuit 1300.

Thus, in the return to galley bottom mode, the line feed is preferably independent of the normal counting and switching circuitry, whether the conventional circuitry the Alphatype or the programmable line feed circuitry described with reference to FIGS. 12A and 12B is utilized. Preferably, while reverse line feed is activated, the positive potential provided to point 1480 passes through diode 1482 to provide a counter clamp signal in order to prevent the driving of the conventional Alphatype counter 1218 (FIG. 13) by clamping the collector of transistor 1486 (FIG. 13) of the conventional Alphatype counter circuitry illustrated in FIG. 13 and represented by board 26 of the conventional Alphatype. In addition, the positive potential at point 1480 is also preferably passed in parallel through diode 1488 to the line feed right margin control point (LFRM terminal) on conventional Alphatype board 28 (not shown) which preferably prevents the further processing of typesetting until the return to galley bottom mode is completed. The completion of this return to galley bottom mode is sensed when a switch 1490, which is normally open, is closed, such as a normal contact switch operation, thereby passing a positive potential through diode 1492 due to network 1494 thereby resetting flip-flop 1458 by applying a positive potential to the collector of transistor 1460, while the base of transistor 1456 which is made positive because of the R-C network 1496–1498 associated therewith. This causes transistor 1456 to cut off which, in turn, conventionally causes transistors 1460 to saturate. This, in turn, causes transistor 1466 to cut off, thereby removing the positive potential at point 1470, thereby unlatching relays 1388 and 1436. It should be noted that if transistor 1384 had previously been saturated, relay 1388 would preferably not unlatch in this condition.

Referring now to FIG. 15, the timing of the various signals present in the reversible line feed control circuit 1300 shall be described by way of example. In Graph A of FIG. 15, the line feed enable code associated clock pulse is represented by pulse 1510 and the line feed quantity or amount code associated clock pulse is represented by pulse 1512. This pulse 1512 could also graphically represent the return to galley bottom code associated clock pulse. In addition, in Graph A, pulse 1514 represents an interline feed code associated in clock pulse. As shown and preferred in FIG. 15, apart form Graph I wherein pulse 1516 represents the interline feed code, with its associated clock pulse being represented by pulse 1514, which can occur at any time and does not have to be associated with a line feed enable code in order to create a line advance without a return to the right margin, all other pulse represented in Graphs A through H of FIG. 15 are preferably dependent on the line feed enable code pulse 1510. Normal processing in the typesetting system preferably occurs a slight time after the end of the hold-off pulse 1518 whicch holds off the normal typesetting process, as shown in graph H of FIG. 15. Pulses 1510, 1512, and 1514 preferably occur at a normal typesetting rate. Graph B of FIG. 15 represents the enable window for the line feed amount code, the reverse code or the return to galley bottom code and is graphically represented by pulse 1520. The pulses graphically represented in Graph C of FIG. 15 represent the cut off of the previous relays, as represented by 1522. Pulses 1524 and 1526 in Graph D of FIG. 15 graphically represent the period of time during the flip-flops on board 20K of the conventional Alphatype, which comprise the conventional serial-to-parallel converter, are either set or reset. Pulse 1528 in Graph E of FIG. 15 graphically represents the latch pulse for required relays 1*u*, 2*u*, 4*u*, 8*u*, 1*t*, 2*t* and 4*t* of counter 1218 (FIG. 13) corresponding, respectively, to the −8, −4, −2, −1, 16, 8 and 4 bits of the conventional Alphatype code. Pulse 1530 graphically illustrated in Graph F of FIG. 15 represents the clock pulse associated when the 2 bit is present during the enable window represented by pulse 1520, which pulse 1530 will command reverse line feed. Pulse 1532 graphically illustrated in Graph G of FIG. 15 represents the Alphatype code 1A pulse which is associated with the line feed enable code and, if present without any other bits during the enable window of pulse 1520, will enable reverse line feed to the galley bottom. As was previously mentioned, pulse 1518 of Graph H of FIG. 15 graphically represents the hold-off period for reverse line feed and pulse 1516 of Graph I, of FIG. 15 represents the interline feed code. Graph J of FIG. 15 graphically represents the line feed enable code 1533 corresponding to its associated clock pulse 1510. It should be noted that when the code 1A pulse 1532 is present, the line feed amount code or 2 bit code pulse 1512 or 1530, respectively, preferably cannot be present.

"Recorder Attachment for Converting Standard Key Strokes to Control Codes."

Figure 3:
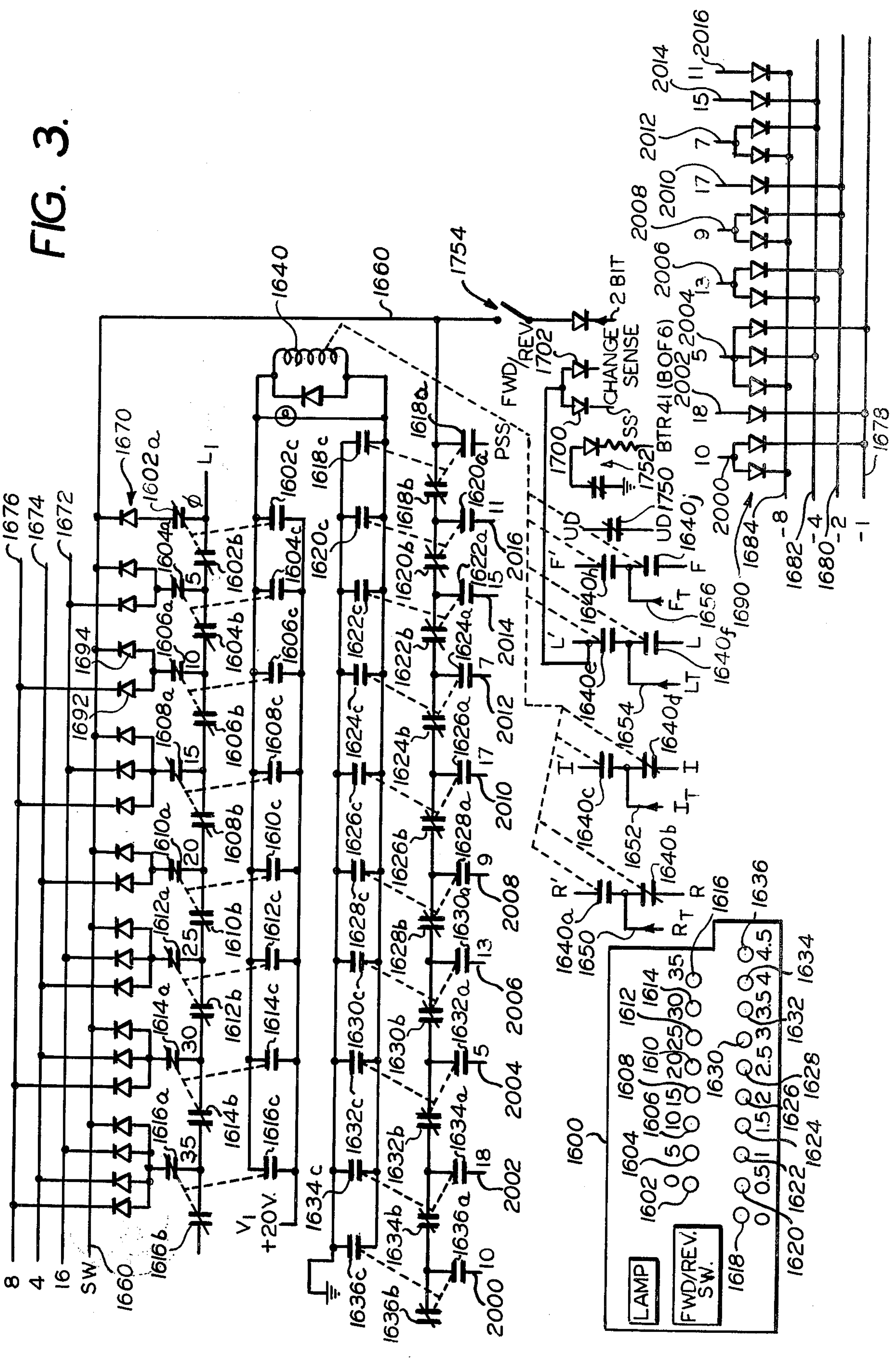
FIG. 3 is a schematic diagram of a conversion circuit for use with a conventional phototype setting code recorder for converting standard key strokes to those utilizable with the reversable line feed control circuit of FIG. 14.

Referring now to FIG. 3, the preferred arrangement for an attachment for a conventional phototype system recorder, such as a conventional Alphatype magnetic recorder for provided control tapes for the Alphatype phototypesetting system is shown with this recorder attachment generally being referred to by the reference numeral 1600. Preferably, the recorder attachment 1600 converts the standard key strokes for the letters L, F, R, and I, so that, by way of example, the letter F produces the line feed enable code utilized in the above described circuitry, the letter L produces the line feed amount or quantity code utilized in the above described circuitry, the letter R produces the "return to galley bottom" code utilized in the above described circuitry and the letter I produces the interline feed code previously referred to. A key board 1600, which is preferably auxiliary to the conventionally provided keyboard for such a recorder (not shown), is preferably provided and preferably contains conventional push button switches 1602 through 1636 labeled 0,5,10,15,20,25,30,35,0,0.5,1,1.5,2,2.5, 3,3.5,4, and ,4.5, respectively. Switches 1602 through 1616 are preferably in one row and switches 1618 to 1636 are preferably in a second row. Preferably, one switch must be held down in each row with the switches 1602 through 1616 in the top row preferably applying a positive potential $V_1$, such as +20 volts by way of example, to the top of a relay 1640 when one of the top row switches 1602 through 1616 is closed or depressed, each switch 1602 through 1616 preferably having associated ganged contacts *a*, *b*, and *c*, with contacts *a* and *c* being normally open and contact *b* being normally closed with this condition reversed when the appropriate switch 1602 through 1616 is depressed. When one of the bottom row switches 1618 through 1636, respectively, is closed or depressed, this will preferably apply ground potential to the bottom of relay 1640, thereby energizing relay 1640. Bottom row switches 1618 and 1636, respectively each comprise three ganged contacts *a*, *b* and *c*, with contacts *a* and *c* being normally open and contact *b* being normally closed with the condition thereof being reversed when the appropriate bottom switch 1618 to 1636, respectively, is depressed. Relay 1640 has associated relay contacts 1640*a*, 1640*b*, 1640*c*, 1640*d*, 1640*e*, 1640*f*, 1640*h* and 1640*j*, with contacts 1640*a*, 1640*c*, 1640 and 1640*h*, being normally open and contacts 1640*b*, 1640*d*, 1640*f* and 1640*j* being normally closed. When relay 1640 is latched, the condition of these contacts is reversed. Contacts 1640*a* and 1640*b* are associated with the letter R, contacts 1640*c* and 1640*d* are associated with the letter I, contacts 1640*e* and 1640*f* are associated with the letter L and contacts 1640*h* and 1640 *j* are associated with the letter F. Thus, when relay 1640 is energized, the conventional letter codes for R,I,L, and F are swung, as the normally shown condition of the associated contacts in FIG. 3 is reversed, the letters L,F,R and I being swung from their conventional typesetting function to produce the above referred to codes from the letter code input to letters R,I,L and F from the conventional typewriter recorder provided via paths 1650, 1652, 1654 and 1656, respectively. Thus, when the swung letter L goes to L' with contact 1640*e* being closed, then whichever switch or switches 1602 through 1616 is closed will open the normally closed switch ganged to path 1660 to isolate the balance of the circuit and connect the L′ output pulse through the associated diode network 1670 to the appropriate bit lines 1672 through 1676 for switches 1602 through 1616 pertaining to the codes needed to be programmed for the proper relays to be latched and to path 1660 which connects to the bottom of switches 1618 and 1636 which, in turn, connect through the appropriate closed ganged switches 1618 through 1636 to isolate the balance of the circuit and connect the L′ pulse through the associated diode network 1690 to the appropriate bit lines 1678 through 1684 for the bottom row switches 1618 through 1636 to provide the combination codes indicated in the truth table previously described by way of example with reference to FIGS. 12A and 12B. For example, to provide 11½ (11.5) points as the encoded programmed line feed, switch **1606*a* is closed to connect to path 1660 and path 1676 through diodes 1692 and 1694 of diode network 1670, contact 1606*b* opening while contacts 1606*a* and 1606*c* are closed. Path 1660 is then connected through now closed switch 1624*a* of the bottom row, which represents 1.5 together with the previously closed switch 1606*a* representing 10, which taken together represents 11½ points, with contact 1624*b* now being opened. Switch 1624*a* preferably connects to point 2012 which connects the L′ output to paths 1684 and 1682 representing the −8, −4 bit lines to provide a code of 8, −8,−4, by way of example, for a programmed line feed of 11.5 points. Preferably, at the same time that the above condition occurs, relay 1640 contacts 1640*a* through 1640*j*** are simultaneously closed.

In order to put a line feed enable code on the tape which is preferably represented, by way of example, by the letter F being swung, when relay 1640 is latched, the F′ signal goes through now closed contact **1640*h* and diodes 1700 through 1702 to record the line feed enable code on the tape. Similarly, the "return to galley bottom" code and the interline feed code are recorded on the tape by swung letters R and I through their appropriate now closed contacts 1640*a* and 1640*c* and their associated diode pair networks (not shown). The network comprising switch 1750 and resistor diode network 1752 preferably permits normal operation of the recorder while the letters L,F, R and I, by way of example, are utilized in their additional capacity. A conventional switch 1754 is preferably provided for selection between the forward and reverse mode by enabling recording to the 2 bit on the tape when switch 1754** is closed indicating the reverse mode, as previously described.

DISC CLAMP

Referring now to FIG. 10, an improved disc clamp, generally referred to by the reference numeral 1800, for holding the various discs 40 through 50 in place on the shaft as well as providing spacing between these discs and enabling removal of these discs is shown. Preferably, the clamp 1800 consists of a threaded socket 1802 and a threaded insertable member 1804 which is threadably mateable within the socket 1802. The threads in the socket 1802 are preferably symmetrically tapered to create a threaded tapered receptacle 1806 with the tapering preferably being outwardly away from the shaft 56. Similarly, the threads on insertable portion 1804 are also congruently tapered so as to be threadably mateable within the receptacle 1806 of socket 1802. Preferably the tapered insertable portion 1804 has a plurality of spaced apart, such as four spaced 90° apart, circumferential horizontal slits 1808 (only one being shown in FIG. 10) which permit insertable portion 1804 to be easily slid along shaft 56 when it is removed from the socket portion 1802 and to clamp tightly to the shaft 56 when portion 1804 is threaded into receptacle 1806 of socket 1802 which closes the slit so as to clamp insertable portion 1804 about shaft 56. Preferably, the disc clamp 1800 is made of a resilient material which will return to its original position upon relaxation of pressure, such as rubber or plastic, so as to allow a squeezing or pressure applying action as threadable portion 1804 is threaded into socket 1802. Insertable portion 1804 is also preferably provided with a shoulder portion 1810 about the periphery thereof so as to act as a stop for the disc, a typical disc 40 being shown by way of example in FIG. 10. In utilizing the clamp 1800 of FIG. 10, the socket portion 1802 is removed from shaft 56, the disc 40, by way of example, is then inserted onto the shaft 56 through the opening therein and placed over insertable portion 1804 to rest against the shoulders 1810 and, thereafter, socket 1802 is again placed on the shaft and threaded onto insertable portion 1804 so as to have front shoulder portion 1812 of socket 1802 up against the other side of the disc 40 and sandwich it between the shoulder portion of insertable portion 1804 and the shoulder portion 1812 of socket 1802. This threading of socket portion 1802 onto insertable portion 1804 tightens portion 1804 on this shaft so as to clamp the two portions of the clamp 1800 to each other as well as to the shaft and hold the disc 40 in place. Preferably, the width of the clamp 1800, and, preferably, primarily the width of the socket 1802 is chosen as to enable the provision of the desired spacing between adjacent discs 42 and 44, by way of example, when each of the clamps 1800 is mounted on the shaft 56, one such clamp being preferably provided for each disc.

The balance of the circuitry and structure omitted from the above detailed description of the system 20 of the present invention is preferably conventional such as readily available in a conventional Alphatype phototypesetting system and, accordingly, will not be described in any greater detail hereinafter as it will be readily understood to one of ordinary skill in the art.

It is to be understood that the above described embodiments of the invention are merely illustrative of the principles thereof and that numerous modifications and embodiments of the invention may be derived within the spirit and scope thereof.

What is claimed is:

1. A drum control system for providing a predetermined incremental lateral spacing on a drum surface to be accessed in response to a request signal therefor, said system comprising means for rotatably driving said drum about the longitudinal axis thereof; means operatively connected to said drum rotatable driving means for controlling the degree of rotation of said drum in response to said request signal to provide said predetermined incremental lateral spacing, said rotation control means comprising a plurality of optically readable encoded discs, each of said discs having at least a first circumferentially extending band comprising a plurality of optically readable sense marks, said plurality of discs being coaxially rotatably mounted for simultaneous incremental rotation with said drum in response to said request signal, each of said sense marks is a given band corresponding to a predetermined uniform proportionate degree of incremental rotation of said drum, each of said disc circumferential bands being encoded to correspond to a different uniform proportionate degree of incremental rotation of said drum, said plurality of discs comprising at least a pair of said coaxially mounted discs spaced apart from each other with said first bands optically aligned with each other; said rotation control means further comprising a first light source means mounted so as to be optically common to both discs of said pair and optically alignable for illumination of said first bands when energized, a pair of optical reader means optically aligned with said first common light source and associated therewith, each one of said optical reader means being associated with a different one of said discs of said pair and being optically alignable with said first band associated with said associated disc, each of said optical reader means being selectively energizable and being responsive to said sense marks on said associated first band when said optical reader is selectively energized and said first light source illuminates said first band for providing an output signal indicative of the proportionate degree of incremental rotation of said disc, and means for substantially simultaneously selectively energizing said optical reader associated with the disc band corresponding to the requested incremental lateral spacing and said first common light souce in response to said request signal; said system further comprising braking means operatively connected to said drum rotatable drive means for halting the rotatable drive of said drum in response to a braking signal, and comparator means operatively connected to said braking means and to receive said request signal and said selectively energized optical reader output signal for providing said braking signal to said braking means when said selectively energized optical reader output signal corresponds to said requested incremental lateral spacing, whereby the proportionate degree of rotation of said drum corresponds to said requested incremental lateral spacing.

2. A drum control system in accordance with claim 1 wherein said plurality of optically readable encoded discs comprises at least one other of said coaxially mounted discs with each of said plurality of discs being spaced apart from each other and with said first bands being optically aligned with each other; and said rotation control means further comprises a second light source means mounted so as to be common to said one other disc and optically alignable for illumination of said first band on said one other disc when energized; an additional optical reader means optically aligned with said second light source and associated therewith and being optically alignable with said first band associated with said one other disc, said pair of optical reader means and said additional optical reader means being selectively energizable and being responsive to said sense marks on said associated first band when said associated one of said optical readers is selectively energized and said associated optically alignable light source illuminates said associated first band for providing said output signal indicative of the proportionate degree of incremental rotation of said disc, said optical reader selective energizing means being capable of selectively energizing any one of said optical reader means and substantially simultaneously energizing the light source associated with said selectively energized optical reader means in response to said request signal.

3. A drum control system in accordance with claim 2 wherein each of said discs further comprises at least a second one of said circumferentially extending bands radially spaced apart from said first band and comprising a plurality of optically readable sense marks, each of said second bands being optically alignable with each other; said system further comprising a first common incrementally movable platform means, said first and second light source means and said associated optical reader means being mounted on said first common incrementally movable platform means so as to be simultaneously movable therewith, said first platform means having at least a first incremental index position in which said first and second light source means and said associated optical reader means are commonly optically aligned with said associated first bands and a second incremental index position in which said first and second light source means and said associated optical reader means are common optically aligned with said associated second bands, and means for incrementally moving said first common platform to a predetermined incremental index position corresponding to the band to be optically read in response to said request signal for optically aligning said associated light source and optical reader means with the band capable of providing the requested incremental lateral spacing for said drum, said selective energization means being enabled when said incremental indexed platform has been positioned for providing said capable band to be read.

4. A drum control system in accordance with claim 3 further comprising a second incrementally movable common platform means, said drum and said first incrementally movable common platform means being mounted on said second common platform means for simultaneous movement therewith, said second common platform being axially movable in the direction of the longitudinal axis of the drum, and means for incrementally axially moving said second common platform in response to said request signal to a different predetermined axial position on said drum surface relative to a fixed access location, said rotation control means providing said predetermined lateral spacing at said fixed access location by rotation of said drum about said longitudinal axis at said different predetermined relative axial position, said rotation control means being enabled when said predetermined axial position has been obtained, whereby a predetermined lateral spacing at a predetermined axial position of said drum may be provided by axial and rotational movement thereof in response to said request signal.

5. A drum control system in accordance with claim 4 wherein said second common platform axial moving means further comprises bidirectional means for bidirectionally incrementally axially moving said second platform in a forward direction along said drum longitudinal axis in a first state and in the opposite reverse direction along said drum longitudinal axis in a second state, and means for controlling the state of said bidirectional means in response to said request signal.

6. A drum control system in accordance with claim 4 wherein said second platform incrementally axially movable means comprises carriage advance means operatively connected to said second platform for axially incrementally moving said second platform in a predetermined axial direction, motor drive means for driving said carriage advance means in said predetermined direction, and control means capable of dynamically incrementally varying the quantity of incremental axial movement of said second platform operatively connected to said motor drive means for controlling the operation thereof in response to a dynamically variable request signal for a different predetermined axial position of said drum relative to said fixed access location, whereby line feed for the drum may be dynamically varied in accordance with a dynamic variation in said axial position request signal.

7. A drum control system in accordance with claim 6 wherein said control means comprises comparator means operatively connected to said motor drive means and to receive said axial position request signal and a reference signal corresponding to said request axial position for providing a braking signal to halt said motor drive means when said requested predetermined axial position is reached by said drum.

8. A drum control system in accordance with claim 7 wherein said control means further comprises flip-flop means for providing said reference signal in response to said axial position request signal.

9. A drum control system in accordance with claim 6 wherein said motor drive means comprises a bidirectional motor drive means for incrementally axially moving said second platform in a forward direction along said drum longitudinal axis in a first state and in the opposite reverse direction along said drum longitudinal axis in a second state, said axial position request signal comprising a state control signal portion, said control means comprising means for selecting the state of said bidirectional motor means in response to said state control signal for axially advancing the said platform in the direction provided by said selected state.

10. A drum control system in accordance with claim 9 wherein said state selection means comprises means for sensing a predetermined axial position of said drum when in the second state and selecting the first state when said predetermined position is sensed, said second platform being incrementally axially advanced in said forward direction in said first state.

11. A drum control system in accordance with claim 9 wherein said control means further comprises comparator means operatively connected to said motor drive means and to receive said predetermined axial position request signal and a reference signal corresponding to said requested axial position for providing an output signal when said drum has been advanced to said request axial position, said bidirectional motor drive means having a first winding which is energized in said first state for energizing said motor drive means in said forward direction and a second winding which is energized in said second state for energizing said motor drive means in said reverse direction, said control means further comprising dynamic braking means operatively connected to said comparator means for providing a braking signal of predetermined duration to said second winding in response to said output signal when said motor drive means has previously been in said first state and said first winding has been substantially simultaneously deenergized to dynamically brake said motor drive means to a halt.

12. A drum control system in accordance with claim 11 wherein said braking signal providing means comprises a capacitor means for providing said braking signal, said capacitor means being charged only during axial advance of said drum when said motor drive means is in said first state and only discharging to provide said braking signal of predetermined duration dependent on the discharge time constant in response to said output signal.

13. A drum control system in accordance with claim 3 wherein said first common platform incremental moving means comprises a rotary solenoid means incrementally driven in response to said request signal, gearing means operatively connected to said first common platform means, and rotary-to-linear conversion means operatively connected to said rotary solenoid means for driving said gearing means for linearly incrementally moving said first common platform in response to said drive of said rotary solenoid means.

14. A drum control system in accordance with claim 3 wherein said first common platform incremental moving means comprises bidirectional drive means for incrementally moving said first common platform in a first direction toward the center of the discs in response to a first optimum direction control signal and in the opposite direction away from the center of the discs in response to a second optimum direction signal, means for sensing a present position of said platform and for providing an output signal indicative thereof; direction control signal providing means operatively connected to said first platform present position sensing means for receiving said indicative output signal therefrom and to receive said request signal and responsive thereto for providing either said first or said second direction control signal to said bidirectional drive means dependent on the optimum shortest incremental movement of said first common platform from said initial position required to reach a final position of said first common platform associated with the radially located disc band and corresponding to the requested lateral spacing; means for dynamically sensing a current incremental position of said first common platform and providing an output signal indicative thereof, each incremental first platform position corresponding to a different common radially spaced band on the discs; and condition responsive means operatively connected to receive said current position indicative signal and said request signal for providing a braking signal to said bidirectional drive means for halting the incremental movement of said platform when said first platform current position corresponds to said final position associated with the radially located disc band corresponding to the requested lateral spacing.

15. A drum control system in accordance with claim 14 wherein said bidirectional drive means comprises a rotary solenoid means incrementally driven in response to said request signal, gearing means operatively connected to said first common platform means and rotary-to-linear conversion means operatively connected to said rotary solenoid means for driving said gearing means for linearly incrementally moving said first common platform from said initial position to said final position in response to said drive of said rotary solenoid means in response to said provided optimum direction control signal.

16. A drum control system in accordance with claim 14 wherein said incremental moving means further comprises memory means for temporarily storing at least the portion of the request signal corresponding to the radially spaced band requested, said memory means being operatively connected to said condition responsive means for providing said temporarily stored request signal portion thereto until said memory means is cleared of said stored position.

17. A drum control system in accordance with claim 14 wherein each of said discs further comprises at least a third one of said circumferentially extending bands radially spaced apart from said first and second bands and comprising a plurality of optically readable sense marks, each of said third bands being optically alignable with each other, said first common platform means further having at least a third incremental index position in which said first and second light source means and said associated optical reader means are commonly optically aligned with said associated third bands.

18. A drum control system in accordance with claim 3 wherein said first common platform incremental moving means comprises drive means for incrementally moving said first common platform from an initial position to a final position associated with the radially located disc band corresponding to the requested lateral spacing, and means for dynamically sensing a current incremental position of said first common platform and providing an output signal indicative thereof, each incremental first platform position corresponding to a different common radially spaced band on the discs; and condition responsive means operatively connected to receive said current position indicative signal and said request signal for providing a braking signal to said driven means for halting the incremental movement of said platform when said first platform current position corresponds to said final position associated with the radially located disc band corresponding to the requested lateral spacing.

19. A drum control system in accordance with claim 2 wherein each of said light source means includes a light focusing means associated with each of said associated optical reader means for focusing said associated light source at a predetermined location on said first band in optical alignment with said associated optical reader means.

20. A drum control system in accordance with claim 2 wherein said selective energizing means comprises means for deenergizing the previously selectively energized light source and associated optical reader means in response to a band change code signal prior to selectively energizing the light source and associated optical reader means corresponding to the disc band capable of providing the requested incremental lateral spacing for the drum in accordance with said request signal.

21. A drum control system in accordance with claim 20 wherein said selective energizing means comprises gating means and an associated relay coil means operatively connected to said gating means for control thereby associated with each of said discs, each of said optical reader means and said light source means having an associated relay coil means for energizing said optical reader means and light source means respectively associated therewith when energized, each of said relay coil means associated with the respective light source means optically aligned with said associated optical reader means and said associated optical reader means associated relay coil means being operatively connected together, said gating means being responsive to said request signal to substantially simultaneously energize the relay coil means associated with the optical reader means corresponding to the disc band capable of providing the requested incremental lateral spacing for thd drum and the relay coil means associated with energizing said associated light source means in response to said request signal, said gating means further being responsive to said band change code signal to deenergize any of said relay coil means previously energized.

22. A drum control system in accordance with claim 2 wherein said selective energizing means comprises gating means and an associated relay coil means operatively connected to said gating means for control thereby associated with each of said discs, each of said optical reader means and said light source means having an associated relay coil means for energizing said optical reader means and light source means respectively associated therewith when energized, each of said relay coil means associated with respective light source means optically aligned with said associated optical reader means and said associated optical reader means associated relay coil means being operatively connected together, said gating means being responsive to said request signal to substantially simultaneously energize the relay coil means associated with the optical reader means corresponding to the disc band capable of providing the requested incremental lateral spacing for the drum and the relay coil means associated with enegizing said associated light source means in responsive to said request signal.

23. A drum control system in accordance with claim 2 further comprising a plurality of clamping means for removably coaxially clamping each of said discs on a common shaft at predetermined axial location therealong spaced apart by a predetermined axial distance determined by the longitudinal axial length of said clamping means, one of said clamping means being provided for each of said discs.

24. A drum control system in accordance with claim 23 wherein said clamping means comprises a threaded socket slidable on said shaft and an insertable threadable member having a resilient threadable portion threadably insertable into said socket and a mounting portion for said associated disc, said resilient portion being slidable on said shaft prior to said threadable insertion in said socket and being squeezed to tighten against said shaft for preventing slidable movement therealong when said member has been threaded into said socket to fix said clamping means at one of said predetermined axial locations.

25. A drum control system in accordance with claim 1 wherein said first light source means includes a light focusing means associated with each of said associated optical reader means for focusing said associated light source at a predetermined location on said first band in optical alignment with said associated optical reader means.

26. A drum control system in accordance with claim 1 wherein each of said optical reader means comprises photocell means.

27. A drum control system in accordance with claim 1 wherein said selective energizing means comprises means for deenergizing the previously selectively energized light source and associated optical reader means in response to a band change code signal prior to selectively energizing the light source and associated optical reader means corresponding to the disc band capable of providing the requested incremental lateral spacing for the drum in accordance with said request signal.

28. A drum control system in accordance with claim 27 wherein said selective energizing means comprises gating means and an associated relay network means operatively connected to said gating means for control thereby, each of said optical reader means and said first common light source means having an associated relay coil means for energizing said optical reader means and light source means respectively associated therewith when energized, said relay network means comprising a parallel connection of said associated relay coil means with said first light source means associated relay coil being connected in common to both of said optical reader means associated relay coil means, said gating means being responsive to said request signal to substantially simultaneously energize the relay coil means associated with the optical reader means corresponding to the disc band capable of providing the requested incremental lateral spacing for the drum and the relay coil means associated with enegizing said associated light source means in response to said request signal, said, gating means further being responsive to said band change code signal to deenergize any of said relay coil means previously energized.

29. A drum control system in accordance with claim 1 wherein said selective energizing means comprises gating means and an associated relay network means operatively connected to said gating means for control thereby, each of said optical reader means and said first common light source means having an associated relay coil means for energizing said optical reader means and light source means respectively associated therewith when energized, said relay network means comprising a parallel connection of said associated relay coil means with said first light source means associated relay coil being connected in common to both of said optical reader means associated relay coil means, said gating means being responsive to said request signal to substantially simultaneously energize the relay coil means associated with the optical reader means corresponding to the disc band capable of providing the requested incremental lateral spacing for the drum and the relay coil means associated with energizing said associated light source means in response to said request signal.

30. A drum control system in accordance with claim 1 further comprising a plurality of clamping means for removably coaxially clamping each of said discs on a common shaft at predetermined axial locations therealong spaced apart by a predetermined axial distance determined by the longitudinal axial length of said clamping means, one of said clamping means being provided for each of said discs.

31. A drum control system in accordance with claim 30 wherein said clamping means comprises a threaded socket slidable on said shaft and an insertable threadable member having a resilient threadable portion threadably insertable in said socket and a mounting portion for said associated disc, said resilient portion being slidable on said shaft prior to said threadable insertion in said socket and being squeezed to tighten against said shaft by being threaded into said socket for preventing slidable movement therealong when said member has been threaded into said socket to fix said clamping means at one of said predetermined axial locations.

32. A drum control system for providing a predetermined incremental lateral spacing on a drum surface to be accessed in response to a request signal therefor, said system comprising means for rotatably driving said drum about the longitudinal axis thereof; means operatively connected to said drum rotatable driving means for controlling the degree of rotation of said drum in response to said request signal to provide said predetermined incremental lateral spacing, said rotation control means comprising a plurality of optically readable encoded discs, each of said discs having at least a first circumferentially extending band comprising a plurality of optically readable sense marks, said plurality of discs being coaxially rotatably mounted for simultaneous incremental rotation with said drum in response to said request signal, each of said sense marks in a given band corresponding to a predetermined uniform proportionate degree of incremental rotation of said drum, each of said disc circumferential bands being encoded to correspond to a different uniform proportionate degree of incremental rotation of said drum, said plurality of discs comprising at least first and second coaxially mounted discs spaced apart from each other with said first bands optically aligned with each other; said rotation control means further comprising a first light source means mounted so as to be optically common to at least said first disc and optically alignable for illumination of said first band thereon when energized, and a second light source means mounted so as to be optically common to said second disc and optically alignable for illumination of said first band thereon when energized, a first optical reader means optically aligned with said first light source and associated therewith and a second optical reader means optically aligned with said second light source and associated therewith, said first and second optical reader means being associated with said first and second discs respectively and being optically alignable with said first band associated with said associated disc, each of said optical reader means being selectively energizable and being responsive to said sense marks on said associated first band when said associated one of said optical readers is selectively energized and said associated optically alignable light source illuminates said associated first band for providing an output signal indicative of the proportionate degree of incremental rotation of said disc, and means for substantially simultaneously selectively energizing said optical reader associated with the disc band corresponding to the requested incremental lateral spacing and said associated optically alignable light source in response to said request signal; said system further comprising braking means operatively connected to said drum rotatable drive means for halting the rotatable drive of said drum in response to a braking signal, and comparator means operatively connected to said braking means and to receive said request signal and said selectively energized optical reader output signal for providing said braking signal to said braking means when said selectively energized optical reader output signal corresponds to said requested incremental lateral spacing, whereby the proportionate degree of rotation of said drum corresponds to said requested incremental lateral spacing.

33. A drum control system in accordance with claim 32 wherein each of said discs further comprises at least a second one of said circumferentially extending bands radially spaced apart from said first band and comprising a plurality of optically readable sense marks, each of said second bands being optically alignable with each other; said system further comprising a first common incrementally movable platform means, said first and second light source means and said associated optical reader means being mounted on said first common incrementally movable platform means so as to be simultaneously movable therewith, said first platform means having at least a first incremental index position in which said first and second light source means and said associated optical reader means are commonly optically aligned with said associated first bands and a second incremental index position in which said first and second light source means and said associated optical reader means are common optically aligned with said associated second bands, and means for incrementally moving said first common platform to a predetermined incremental index position corresponding to the band to be optically read in response to said request signal for optically aligning said associated light source and optical reader means with the band capable of providing the requested incremental lateral spacing for said drum, said selective energization means being enabled when said incremental indexed platform has been positioned for providing said capable band to be read.

34. A drum control system in accordance with claim 33 further comprising a second incrementally movable common platform means, said drum and said first incrementally movable common platform means being mounted on said second common platform means for simultaneous movement therewith, said second common platform being axially movable in the direction of the longitudinal axis of the drum, and means for incrementally axially moving said second common platform in response to said request signal to a different predetermined axial position on said drum surface relative to a fixed access location, said rotation control means providing said predetermined lateral spacing at said fixed access location by rotation of said drum about said longitudinal axis at said different predetermined relative axial position, said rotation control means being enabled when said predetermined axial position has been obtained, whereby a predetermined lateral spacing at a predetermined axial position of said drum may be provided by axial and rotational movement thereof in response to said request signal.

35. A drum control system in accordance with claim 34 wherein said second common platform axial moving means further comprises bidirectional means for bidirectionally incrementally axially moving said second platform in a forward direction along said drum longitudinal axis in a first state and in the opposite reverse direction along said drum longitudinal axis in a second state, and means for controlling the state of said bidirectional means in response to said request signal.

36. A drum control system in accordance with claim 34 wherein said second platform incrementally axially movable means comprises carriage advance means operatively connected to said second platform for axially incrementally moving said second platform in a predetermined axial direction, motor drive means for driving said carriage advance means in said predetermined direction, and control means capable of dynamically incrementally varying the quantity of incremental axial movement of said second platform operatively connected to said motor drive means for controlling the operation thereof in response to a dynamically variable request signal for a different predetermined axial position of said drum relative to said fixed access location, whereby line feed for the drum may be dynamically varied in accordance with a dynamic variation in said axial position request signal.

37. A drum control system in accordance with claim 36 wherein said control means comprises comparator means operatively connected to said motor drive means and to receive said predetermined axial position request signal and a reference signal corresponding to said requested axial position for providing a braking signal to halt said motor drive means when said requested predetermined axial position is reached by said drum.

38. A drum control system in accordance with claim 37 wherein said control means further comprises flip-flop means for providing said reference signal in response to said axial position request signal.

39. A drum control system in accordance with claim 36 wherein said motor drive means comprises a bidirectional motor drive means for incrementally axially moving said second platform in a forward direction along said drum longitudinal axis in a first state and in the opposite reverse direction along said drum longitudinal axis in a second state, said axial position request signal comprising a state control signal portion, said control means comprising means for selecting the state of said bidirectional motor drive means in response to said state control signal for axially advancing the second platform in the direction provided by said selected state.

40. A drum control system in accordance with claim 39 wherein said state selection means comprises means for sensing a predetermined axial position of said drum when in the second state and selecting the first state when said predetermined position is sensed, said second platform being incrementally axially advanced in said forward direction in said first state.

41. A drum control system in accordance with claim 39 wherein said control means further comprises comparator means operatively connected to said motor drive means and to receive said predetermined axial position request signal and a reference signal corresponding to said requested axial position for providing an output signal when said drum has been advanced to said requested axial position, said bidirectional motor drive means having a first winding which is energized in said first state for energizing said motor drive means in said forward direction and a second winding which is energized in said second state for energizing said motor drive means in said reverse direction, said control means further comprising dynamic braking means operatively connected to said comparator means for providing a braking signal of predetermined duration to said second winding in response to said output signal when said motor drive means has previously been in said first state and said first winding has been substantially simultaneously deenergized to dynamically brake said motor drive means to a halt.

42. A drum control system in accordance with claim 41 wherein said braking signal providing means comprises a capacitor means for providing said braking signal, said capacitor means being charged only during axial advance of said drum when said motor drive means is in said first state and only discharging to provide said braking signal of predetermined duration dependent on the discharge time constant in response to said output signal.

43. A drum control system in accordance with claim 33 wherein said first common platform incremental moving means comprises a rotary solenoid means incrementally driven in response to said request signal, gearing means operatively connected to said first common platform means, and rotary-to-linear conversion means operatively connected to said rotary solenoid means for driving said gearing means for linearly incrementally moving said first common platform in response to said drive of said rotary solenoid means.

44. A drum control system in accordance with claim 33 wherein said first common platform incremental moving means comprises bidirectional drive means for incrementally moving said first common platform in a first direction toward the center of the discs in response to a first optimum direction control signal and in the opposite direction away from the center of the discs in response to a second optimum direction signal, means for sensing a present position of said platform and for providing an output signal indicative thereof; direction control signal providing means operatively connected to said first platform present position sensing means for receiving said indicating output signal therefrom and to receive said request signal and responsive thereto for providing either said first or said second direction control signal to said bidirectional drive means dependent on the optimum shortest incremental movement of said first common platform from said initial position required to reach a final position of said first common platform associated with the radially located disc band corresponding to the requested lateral spacing; means for dynamically sensing a current incremental position of said first common platform and providing an output signal indicative thereof, each incremental first platform position corresponding to a different common radially spaced band on the discs; and condition responsive means operatively connected to receive said current position indicative signal and said request signal for providing a braking signal to said bidirectional drive means for halting the incremental movement of said platform when said first platform current position corresponds to said final position associated with the radially located disc band corresponding to the requested lateral spacing.

45. A drum control system in accordance with claim 44 wherein said incremental moving means further comprises memory means for temporarily storing at least the portion of the request signal corresponding to the radially spaced band requested, said memory means being operatively connected to said condition responsive means for providing said temporarily stored request signal portion thereto until said memory means is cleared of said stored portion.

46. A drum control system in accordance with claim 44 wherein said bidirectional drive means comprises a rotary solenoid means incrementally driven in response to said request signal, gearing means operatively connected to said first common platform means and rotary-to-linear conversion means operatively connected to said rotary solenoid means for driving said gearing means for linearly incrementally moving said first common platform from said initial position to said final position in response to said drive of said rotary solenoid means in response to said provided optimum direction control signal.

47. A drum control system in accordance with claim 44 wherein each of said discs further comprises at least a third one of said circumferentially extending bands radially spaced apart from said first and second bands and comprising a plurality of optically readable sense marks, each of said third bands being optically alignable with each other, said first common platform means further having at least a third incremental index position in which said first and second light source means and said associated optical reader means are commonly optically aligned with said associated third bands.

48. A drum control system in accordance with claim 33 wherein said first common platform incremental moving means comprises drive means for incrementally moving said first common platform from an initial position to a final position associated with the radially located disc band corresponding to the requested lateral spacing, and means for dynamically sensing a current incremental position of said first common platform and providing an output signal indicative thereof, each incremental first platform position corresponding to a different common radially spaced band on the discs; and condition responsive means operatively connected to receive said current position indicative signal and said request signal for providing a braking signal to said drive means for halting the incremental movement of said platform when said first platform current position corresponds to said final position associated with the radially located disc band corresponding to the requested lateral spacing.

49. A drum control system in accordance with claim 32 wherein each of said light source means includes a light focusing means associated with each of said associated optical reader means for focusing said associated light source at a predetermined location on said first band in optical alignment with said associated optical reader means.

50. A drum control system in accordance with claim 32 wherein said selective energizing means comprises means for deenergizing the previously selectively energized light source and associated optical reader means in response to a band change code signal prior to selectively energizing the light source and associated optical reader means corresponding to the disc band capable of providing the requested incremental lateral spacing for the drum in accordance with said request signal.

51. A drum control system in accordance with claim 50 wherein said selective energizing means comprises gating means and as associated relay coil means operatively connected to said gating means for control thereby associated with each of said discs, each of said optical reader means and said light source means having an associated relay coil means for energizing said optical reader means and light source means respectively associated therewith when energized, each of said relay coil means associated with the respective light source means optically aligned with said associated optical reader means and said associated optical reader means associated relay coil means being operatively connected together, said gating means being responsive to said request signal to substantially simultaneously energize the relay coil means associated with the optical reader means corresponding to the disc band capable of providing the requested incremental lateral spacing for the drum and the relay coil means associated with energizing said associated light source means in response to said request signal, said gating means further being responsive to said band change code signal to deenergize any of said relay coil means previously energized.

52. A drum control system in accordance with claim 32 wherein said selective energizing means comprises gating means and an associated relay coil means operatively connected to said gating means for control thereby associated with each of said discs, each of said optical reader means and said light source means having an associated relay coil means for energizing said optical reader means and light source means respectively associated therewith when energized, each of said relay coil means associated with the respective light source means optically aligned with said associated optical reader means and said associated optical reader means associated relay coil means being operatively connected together, said gating means being responsive to said request signal to substantially simultaneously energize the relay coil means associated with the optical reader means corresponding to the disc band capable of providing the requested incremental lateral spacing for the drum and the relay coil means associated with energizing said associated light source means in response to said request signal.

53. A drum control system in accordance with claim 32 further comprising a plurality of clamping means for removably coaxially clamping each of said discs on a common shaft at predetermined axial locations therealong spaced apart by a predetermined axial distance determined by the longitudinal axial length of said clamping means, one of said clamping means being provided for each of said discs.

54. A drum control system in accordance with claim 53 wherein said clamping means comprises a threaded socket slidable on said shaft and an insertable threadable member having a resilient threadable portion threadably insertable into said socket and a mounting portion for said associated disc, said resilient portion being slidable on said shaft prior to said threadable insertion in said socket and being squeezed to tighten against said shaft by being threaded into said socket for preventing slidable movement therealong when said member has been threaded into said socket to fix said clamping means at one of said predetermined axial locations.

* * * * *